(12) United States Patent
Mochizuki et al.

(10) Patent No.: US 12,215,836 B2
(45) Date of Patent: Feb. 4, 2025

(54) VEHICULAR HEADLIGHT

(71) Applicant: KOITO MANUFACTURING CO., LTD., Tokyo (JP)

(72) Inventors: Kazuma Mochizuki, Shizuoka (JP); Atsushi Sugimoto, Shizuoka (JP); Tomoyuki Ohno, Shizuoka (JP); Takashi Terayama, Shizuoka (JP); Toshiyuki Tsuchiya, Shizuoka (JP); Atsushi Uesugi, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 18/267,296

(22) PCT Filed: Dec. 9, 2021

(86) PCT No.: PCT/JP2021/045420
§ 371 (c)(1),
(2) Date: Jun. 14, 2023

(87) PCT Pub. No.: WO2022/131139
PCT Pub. Date: Jun. 23, 2022

(65) Prior Publication Data
US 2024/0035639 A1 Feb. 1, 2024

(30) Foreign Application Priority Data

Dec. 15, 2020 (JP) .................. 2020-207980
Jan. 22, 2021 (JP) .................. 2021-008999
Nov. 15, 2021 (JP) .................. 2021-185996

(51) Int. Cl.
*F21S 41/663* (2018.01)
*F21S 45/40* (2018.01)
(Continued)

(52) U.S. Cl.
CPC ............. *F21S 41/663* (2018.01); *F21S 45/40* (2018.01); *F21W 2102/13* (2018.01); *F21W 2102/20* (2018.01)

(58) Field of Classification Search
CPC .............. H05B 45/18; F21W 2102/13; F21W 2102/20; F21S 45/40; F21S 41/663; F21S 43/26; F21S 43/255; F21S 43/31
See application file for complete search history.

(56) References Cited

U.S. PATENT DOCUMENTS 11,644,176 B2 * 5/2023 Park .................. F21S 45/47
362/459
2007/0018586 A1 1/2007 Yagi et al.
(Continued)

FOREIGN PATENT DOCUMENTS

DE 10 2011 083 025 A1 3/2013
EP 2 077 697 A2 7/2009
(Continued)

OTHER PUBLICATIONS

Partial Supplementary European Search Report issued Dec. 1, 2023 in European Application No. 21906502.6.
(Continued)

*Primary Examiner* — Matthew J. Peerce
(74) *Attorney, Agent, or Firm* — Sughrue Mion, PLLC

(57) ABSTRACT

A vehicular headlight (20) includes a first light source unit (41), a second light source unit (61), a temperature sensor (47), and a control unit (110). When the temperature derating is performed on the first light source unit (41) based on the temperature in a state where the light distribution pattern (910) of a low-beam is formed, the control unit (110) controls the power to be supplied to each of a plurality of light-emitting elements (43) so that the light amount of at least a part of the first light with which at least a region (911) of a first light distribution pattern (400) is irradiated
(Continued)

decreases as compared with that before the temperature derating.

9 Claims, 20 Drawing Sheets

(51) Int. Cl.
 *F21W 102/13* (2018.01)
 *F21W 102/20* (2018.01)

(56) References Cited

U.S. PATENT DOCUMENTS

| | | |
|---|---|---|
| 2009/0167187 A1 | 7/2009 | Kitagawa et al. |
| 2015/0009693 A1* | 1/2015 | Sekiguchi ............ F21S 41/663 |
| | | 362/465 |
| 2017/0305328 A1* | 10/2017 | Kato ...................... H05B 45/56 |
| 2019/0152380 A1 | 5/2019 | Jung et al. |
| 2023/0225025 A1* | 7/2023 | Taleb ..................... H05B 45/28 |
| | | 315/309 |

FOREIGN PATENT DOCUMENTS

| | | |
|---|---|---|
| JP | 2007-022420 A | 2/2007 |
| JP | 2009-154748 A | 7/2009 |
| JP | 2012-022980 A | 2/2012 |
| JP | 2012-043700 A | 3/2012 |
| JP | 2015-015104 A | 1/2015 |
| JP | 2016-091730 A | 5/2016 |
| JP | 2017-199520 A | 11/2017 |
| JP | 2020-013642 A | 1/2020 |
| WO | 2020/109215 A1 | 6/2020 |

OTHER PUBLICATIONS

International Search Report of PCT/JP2021/045420 dated Feb. 15, 2022 [PCT/ISA/210].
Extended European Search Report issued Jan. 24, 2024 in Application No. 21906502.6.

* cited by examiner

VEHICULAR HEADLIGHT

CROSS REFERENCE TO RELATED APPLICATIONS

This application is a National Stage of International Application No. PCT/JP2021/045420 filed on Dec. 9, 2021, claiming priority based on Japanese Patent Application No. 2021-008999 filed on Jan. 22, 2021, Japanese Patent Application No. 2020-207980 filed on Dec. 15, 2020, and Japanese Patent Application No. 2021-185996 filed on Nov. 15, 2021.

TECHNICAL FIELD

The present invention relates to a vehicular headlight.

BACKGROUND ART

A vehicular headlight including a light source unit including a light-emitting element such as a light emitting diode (LED) or a laser diode (LD) and a circuit board on which the light-emitting element is mounted, and a temperature sensor such as a thermistor mounted on the circuit board is known. In such a light source unit, as the power supplied to the light-emitting element increases, the light emission amount and the heat generation amount of the light-emitting element increase, and the temperature of the light-emitting element increases. The heat from the light-emitting element is transferred to the circuit board, and the temperature of the circuit board is estimated by the temperature sensor. When the estimated temperature is a predetermined value or more, a control unit of the vehicular headlight may perform temperature derating for reducing the power supplied to the light-emitting element according to the temperature. By the temperature derating, the light source unit is protected from heat and reliability of the light source unit is secured.

Meanwhile, in a case where the light source unit and the temperature sensor are accommodated in housings having different shapes from each other, when the light-emitting elements of the light source units are turned on with the same power, the estimated temperature may be different in each housing. Therefore, in the vehicular headlight described in Patent Literature 1 below, the power supplied according to the temperature is set based on software such as any function or table, and temperature derating suitable for the light source unit is performed by changing the software.

[Patent Literature 1] JP 2016-91730 A

SUMMARY OF INVENTION

Examples of the light source unit include a configuration in which a plurality of light-emitting elements are arranged, and examples of such a light source unit include an LED array and a microLED array. In such a light source unit, light of a light distribution pattern is projected in front of a vehicle by light emitted from each light-emitting element. When the temperature derating is performed on such a light source unit, even if only some light-emitting elements reduce the supplied power, the light distribution pattern becomes dark, and the visibility in front may be reduced.

Therefore, an object of the present invention is to provide a vehicular headlight that can suppress a decrease in visibility in front when temperature derating is performed.

In order to achieve the above object, a vehicular headlight according to a first aspect of the present invention includes: a first light source unit including a plurality of light-emitting elements, the plurality of light-emitting elements being arranged such that irradiation regions of first light emitted forward from the plurality of light-emitting elements are arranged in a matrix shape; a second light source unit that emits second light; and a control unit, in which a light distribution pattern of a low-beam is formed by a first light distribution pattern formed by at least a part of the first light and a second light distribution pattern formed by the second light, and the light distribution pattern of the low-beam includes a first region in which a part of the first light distribution pattern overlaps a part of the second light distribution pattern, and a second region in which another part of the first light distribution pattern does not overlap the second light distribution pattern and which is continuous with the first region and located above the first region, and when temperature derating is performed on the first light source unit based on a temperature of the first light source unit in a state in which the light distribution pattern of the low-beam is formed, the control unit is characterized by controlling power supplied to each of the plurality of light-emitting elements so that the light amount of at least a part of the first light with which at least the first region is irradiated in the first light distribution pattern decreases as compared with that before the temperature derating.

In the vehicular headlight according to the first aspect, in the light distribution pattern of the low-beam, the first region is irradiated with the first light and the second light. Therefore, when the temperature derating is performed, in the first region, even if the light amount of the first light decreases as described above, a decrease in brightness of the light distribution pattern of the low-beam can be reduced and a decrease in visibility in front can be reduced as compared with a case where the first region is not irradiated with the second light.

Further, in the vehicular headlight according to the first aspect, in a case where the temperature derating is performed on the first light source unit in a state where the light distribution pattern of the low-beam is formed, the control unit may control the power supplied to each of the plurality of light-emitting elements such that a light amount of at least a part of the first light with which the first region is irradiated decreases as compared with a light amount before the temperature derating, and such that the light amount of the at least a part of the first light with which the first region is irradiated decreases more than a light amount of at least a part of the first light with which the second region is irradiated.

For example, the upper edge of the second region may form a part of the cutoff line of the light distribution pattern of the low-beam. According to the above configuration, as compared with a case where the light amount of the first light with which the second region is irradiated decreases more than the light amount of the first light with which the first region is irradiated, a decrease in brightness on the cutoff line side can be reduced and a decrease in visibility in front can be reduced. Further, when the first region is larger than the second region, according to the above configuration, the temperature rise of the first light source unit can be reduced as compared with the case where the first region is smaller than the second region.

Further, in the vehicular headlight according to the first aspect, in a case where the temperature derating is performed on the first light source unit in a state where the light distribution pattern of the low-beam is formed, the control unit may control the power supplied to each of the plurality of light-emitting elements such that a light amount of at least a part of the first light with which the second region is irradiated decreases as compared with that before the temperature derating, and such that the light amount of the at least a part of the first light with which the second region is irradiated decreases after a light amount of at least a part of the first light with which the first region is irradiated.

For example, the upper edge of the second region may form a part of the cutoff line of the light distribution pattern of the low-beam. According to the above configuration, as compared with a case where the light amount of the first light with which the second region is irradiated decreases before the light amount of the first light with which the first region is irradiated, the start of the decrease in brightness on the cutoff line side may be delayed. Therefore, the start of the decrease in the visibility of the cutoff line can be delayed.

In the vehicular headlight according to the first aspect, when the temperature derating is performed on the first light source unit in a state in which the light distribution pattern of the low-beam is formed, the control unit may control the power supplied to each of the plurality of light-emitting elements such that the light amount in the first light distribution pattern decreases from an upper edge side of the first light distribution pattern included in the second region toward a lower edge side of the first light distribution pattern included in the first region.

For example, the upper edge of the second region may form a part of the cutoff line of the light distribution pattern of the low-beam. According to the above configuration, as compared with the case where the light amount decreases from the lower edge side of the first light distribution pattern toward the upper edge side of the first light distribution pattern, a decrease in brightness on the cutoff line side of the light distribution pattern of the low-beam can be reduced. Therefore, the decrease in the visibility of the cutoff line may be delayed and reduced.

In the vehicular headlight according to the first aspect, when the temperature derating is performed on the first light source unit in a state in which the light distribution pattern of the low-beam is formed, the control unit may control the power to be supplied to each of the plurality of light-emitting elements so that the light amount in the first light distribution pattern decreases from a hot zone of the light distribution pattern of the low-beam toward a peripheral edge side of the first light distribution pattern.

The line of sight of a driver of the vehicle tends to concentrate on the hot zone side rather than the peripheral edge side of the first light distribution pattern. According to the above configuration, as compared with the case where the light amount decreases from the peripheral edge side of the first light distribution pattern toward the hot zone, a decrease in brightness on the hot zone side where the line of sight of the driver is concentrated can be reduced.

In addition, the vehicular headlight according to the first aspect further includes a third light source unit that emits third light, in which a light distribution pattern of a high-beam is formed by the first light distribution pattern, the second light distribution pattern, and a third light distribution pattern formed by the third light, in the light distribution pattern of the high-beam, at least a part of the second region overlaps a part of the third light distribution pattern, and when the temperature derating is performed on the first light source unit in a state where the light distribution pattern of a high-beam is formed, the control unit may control the power supplied to each of the plurality of light-emitting elements such that a light amount of at least a part of the first light with which at least one of a third region overlapping a part of the third light distribution pattern in the second region and the first region is irradiated decreases as compared to that before the temperature derating.

In the light distribution pattern of the high-beam, the first region is irradiated with the first light and the second light, and the third region is irradiated with the first light and the third light. According to the above configuration, when the temperature derating is performed, even if the light amount of the first light decreases, a decrease in brightness of the light distribution pattern of a high-beam can be reduced as compared with a case where the first region is not irradiated with the second light and a case where the third region is not irradiated with the third light. Therefore, a decrease in visibility of the front can be reduced.

Further, in the vehicular headlight according to the first aspect, in a case where the temperature derating is performed on the first light source unit in a state where the light distribution pattern of the high-beam is formed, the control unit may control the power supplied to each of the plurality of light-emitting elements such that a light amount of at least a part of the first light with which the first region is irradiated decreases more than a light amount of at least a part of the first light with which the third region is irradiated.

Since the third region is located above the first region, the line of sight of the driver tends to concentrate on the third region rather than the first region. According to the above configuration, as compared with a case where the light amount of the first region decreases less than the light amount of the third region, a decrease in brightness of the third region in which the line of sight of the driver is concentrated in the light distribution pattern of the high-beam is reduced and a decrease in visibility in front can be reduced.

Further, in the vehicular headlight according to the first aspect, in a case where the temperature derating is performed on the first light source unit in a state where the light distribution pattern of the high-beam is formed, the control unit may control the power supplied to each of the plurality of light-emitting elements such that a light amount of at least a part of the first light with which the third region is irradiated is reduced after a light amount of at least a part of the first light with which the first region is irradiated.

When the light distribution pattern of the high-beam in which the third region is larger than the first region is formed, the line of sight of the driver tends to concentrate on the third region rather than the first region. In a case where the third region is larger than the first region, according to the above configuration, as compared with a case where the light amount of the third region decreases before the light amount of the first region, the start of the decrease in the brightness of the third region where the line of sight of the driver concentrates is delayed, and the decrease in the visibility in the third region can be delayed.

In the vehicular headlight according to the first aspect, when the temperature derating is performed on the first light source unit in a state in which the light distribution pattern of the high-beam is formed, the control unit may control the power to be supplied to each of the plurality of light-emitting elements so that the light amount in the first light distribution pattern decreases from an upper edge side of the first light distribution pattern included in the third region toward a lower edge side of the first light distribution pattern included in the first region.

When the light distribution pattern of the high-beam is formed, the line of sight of the driver tends to concentrate on the third region rather than the first region. According to the above configuration, as compared with the case where the light amount decreases from the lower edge side toward the upper edge side of the first light distribution pattern, it is possible to reduce a decrease in brightness of the third region where the line of sight of the driver concentrates in the light distribution pattern of the high-beam, and to reduce a decrease in visibility in the third region.

In the vehicular headlight according to the first aspect, when the temperature derating is performed on the first light source unit in a state in which the light distribution pattern of the high-beam is formed, the control unit may control the power to be supplied to each of the plurality of light-emitting elements so that the light amount in the first light distribution pattern decreases from a hot zone of the light distribution pattern of the high-beam toward a peripheral edge side of the first light distribution pattern.

The line of sight of the driver tends to concentrate on the hot zone side rather than the peripheral edge side of the first light distribution pattern. According to the above configuration, as compared with the case where the light amount decreases from the peripheral edge side of the first light distribution pattern toward the hot zone, a decrease in brightness on the hot zone side where the line of sight of the driver is concentrated can be reduced.

In order to achieve the above object, a vehicular headlight according to a second aspect of the present invention includes: a light source unit including a plurality of light-emitting elements; and a control unit that controls the power supplied to each of the light-emitting elements, and when temperature derating is performed on the light source unit based on a temperature of the light source unit, the control unit lowers the power supplied to at least a part of the light-emitting elements driven with second power larger than first power from the second power to the first power or less, and increases the power supplied to at least a part of the light-emitting elements driven with third power equal to or less than the first power.

According to the above configuration, when the control unit performs the temperature derating on the light source unit, the power of the at least a part of light-emitting elements driven by the second power decreases from the second power to the first power or less. Therefore, the light source unit is protected from heat from the light-emitting element, but the light distribution pattern formed by the light emitted from the light source unit tends to be dark. Therefore, in the above configuration, when temperature derating is performed on the light source unit, the control unit increases the power supplied to the at least a part of the light-emitting elements driven with the third power. As the power increases, the light distribution pattern can be brighter. Therefore, a decrease in visibility of the front can be reduced.

Further, in the vehicular headlight according to the second aspect, when the temperature derating is performed on the light source unit, the control unit may increase the power supplied to the at least a part of the light-emitting elements driven with the third power to the first power.

According to the above configuration, the light distribution pattern becomes brighter than a case where the power does not rise to the first power, and a decrease in the visibility in front can be reduced.

Alternatively, in the vehicular headlight according to the second aspect, when the temperature derating is performed on the light source unit, the control unit may increase the power supplied to the at least a part of the light-emitting elements driven with the third power to be higher than the first power.

According to the above configuration, as compared with the case where the power is not higher than the first power, the light distribution pattern becomes further brighter, and a decrease in visibility in front can be further reduced.

In addition, in the vehicular headlight according to the second aspect, the control unit may lower the power supplied to the at least a part of the light-emitting elements driven with the third power to the first power or less after a certain period of time elapses since the power supplied to the light-emitting elements increases to be higher than the first power.

If the power remains higher than the first power, the temperature of the light source unit increases. According to the above configuration, since the power decreases to the first power or less when a certain period of time elapses, the temperature of the light source unit decreases, and the temperature rise of the light source unit can be reduced.

Alternatively, in the vehicular headlight according to the second aspect, when the temperature derating is performed on the light source unit, the control unit may increase the power supplied to at least a part of the light-emitting elements driven with the third power to fourth power higher than the third power and smaller than the first power.

Alternatively, in the vehicular headlight according to the second aspect, when the temperature derating is performed on the light source unit, the control unit may increase an increase amount of the power supplied to the at least a part of the light-emitting elements driven with the third power as a decrease amount of the power supplied to the at least a part of the light-emitting elements driven with the second power is larger.

According to the above configuration, the light distribution pattern can be brighter as compared to a case in which the increase amount of the power is smaller as the decrease amount of the power is larger.

Further, in the vehicular headlight according to the second aspect, when the temperature derating is performed on the light source unit, the control unit may increase the power supplied to the at least a part of the light-emitting elements driven with the third power before lowering the power supplied to the at least a part of the light-emitting elements driven with the second power from the second power to the first power or less.

According to the above configuration, before the light distribution pattern becomes dark due to the power lowering from the second power to the first power or less, the light distribution pattern becomes bright due to the power rising from the third power. Therefore, as compared with the case where the light distribution pattern becomes bright after becoming dark, it is possible to reduce the light distribution pattern from becoming dark as compared with the case before the temperature derating is performed on the light source unit, and it is possible to reduce the decrease in visibility.

Further, in the vehicular headlight according to the second aspect, when the temperature derating is performed on the light source unit after changing an intensity distribution of light in the light distribution pattern formed by the light emitted from the light source unit, the control unit may lower the power supplied to the at least a part of the light-emitting elements driven with the second power to the first power or less, and increase the power supplied to the at least a part of the light-emitting elements driven with the third power before changing the intensity distribution of light.

According to the above configuration, even when the control unit performs the temperature derating on the light source unit after changing the intensity distribution of light, the light source unit is protected from heat from the light-emitting element, but the light distribution pattern tends to be dark. Therefore, in the above configuration, when the temperature derating is performed after changing the intensity distribution of light, the control unit increases the power supplied to the at least a part of the light-emitting elements driven with the third power before changing the intensity distribution of light. As the power increases, the light distribution pattern can be brighter. Therefore, even when the control unit performs the temperature derating on the light source unit after changing the intensity distribution of light, it is possible to reduce a decrease in visibility in front as compared with a case where the power does not increase.

As described above, according to the present invention, it is possible to provide a vehicular headlight capable of reducing a decrease in visibility in front when temperature derating is performed.

DESCRIPTION OF EMBODIMENTS

Figure 1:
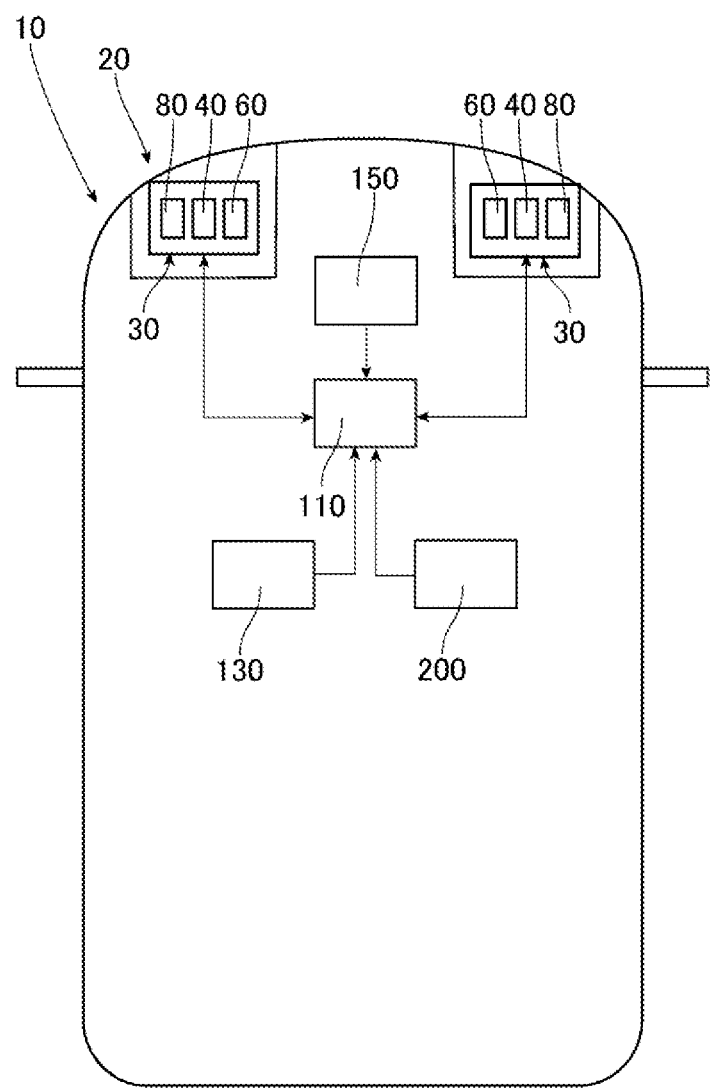
FIG. 1 is a plan view conceptually illustrating a vehicle according to a first embodiment as a first aspect of the present invention.

Hereinafter, a preferred embodiment of a vehicular headlight according to the present invention will be described in detail with reference to the drawings. The embodiments exemplified below are intended to facilitate understanding of the present invention and are not intended to limit the present invention. The present invention can be modified and improved without departing from the gist thereof. In addition, in the present invention, constituent elements in the following exemplary embodiments may be appropriately combined. In the drawings referred to below, dimensions of each member may be changed for easy understanding.

First Embodiment

A first embodiment as a first aspect of the present invention will be described. FIG. 1 is a plan view conceptually illustrating a vehicle 10 according to the first embodiment. The vehicle 10 includes a vehicular headlight 20, a detection device 150, and a light switch 200. The vehicular headlight 20 of the present embodiment is a headlight for an automobile. The vehicular headlight 20 includes a pair of lamp units 30 arranged on the left and right of the front portion of the vehicle 10, respectively, a control unit 110 that controls the pair of lamp units 30, and a recording unit 130. In the present specification, "right" means the right side in the traveling direction of the vehicle 10, and "left" means the left side in the traveling direction of the vehicle 10.

In the pair of lamp units 30, the respective lamp units 30 have the same configuration except that the shapes are substantially symmetrical in the left-right direction. Therefore, in the following, the configuration of each lamp unit 30 will be described using one lamp unit 30.

The lamp unit 30 includes a first lamp 40, a second lamp 60, and a third lamp 80 arranged in the horizontal direction. The second lamp 60 is disposed on the most center side of the vehicle 10, the third lamp 80 is disposed on the outermost side of the vehicle 10, and the first lamp 40 is disposed between the second lamp 60 and the third lamp 80. The arrangement order of the lamps 40, 60, and 80 is not particularly limited.

Figure 2:
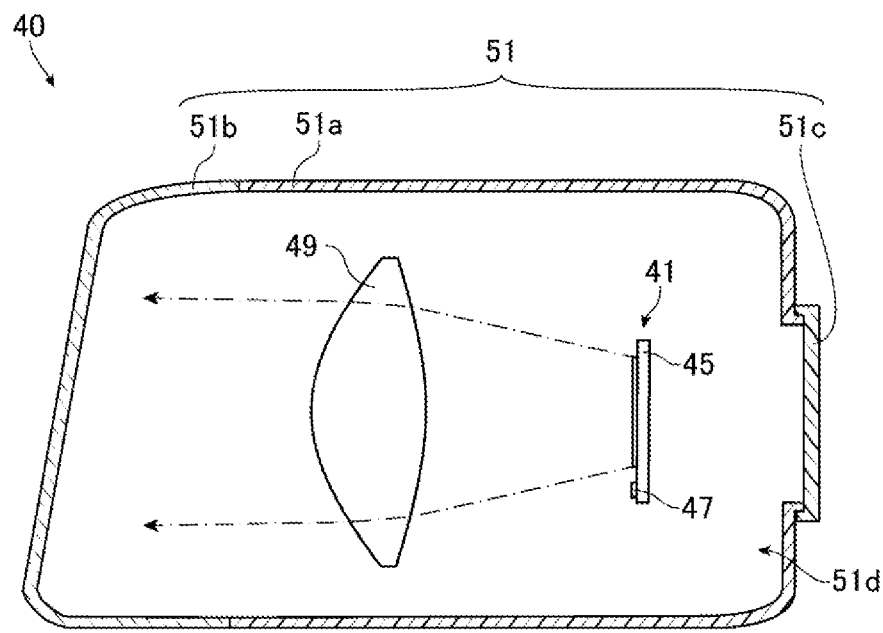
FIG. 2 is a side view schematically illustrating a first lamp of the first embodiment illustrated in FIG. 1.

Next, the first lamp 40 will be described with reference to FIG. 2. FIG. 2 is a side view schematically illustrating the first lamp 40. The first lamp 40 includes a first light source unit 41 that emits first light forward, a temperature sensor 47 disposed in the first light source unit 41, a projection lens 49 disposed in front of the first light source unit 41, and a housing 51 that houses the first light source unit 41, the temperature sensor 47, and the projection lens 49. In FIG. 2, the housing 51 is illustrated in a schematic cross section in the vertical direction of the first lamp 40.

The housing 51 includes a lamp housing 51a, a front cover 51b, and a back cover 51c. The front of the lamp housing 51a is opened, and the front cover 51b is fixed to the lamp housing 51a so as to close the opening. Further, an opening smaller than that in the front is formed behind the lamp housing 51a, and the back cover 51c is fixed to the lamp housing 51a so as to close the opening. In this way, a lamp chamber 51d surrounded by the lamp housing 51a, the front cover 51b, and the back cover 51c is formed in the housing 51. In the lamp chamber 51d, the first light source unit 41, the temperature sensor 47, and the projection lens 49 are disposed. The lamp housing 51a and the back cover 51c are made of resin, for example. The front cover 51b is made of a material having translucency, and the first light emitted from the first light source unit 41 passes through the projection lens 49 and the front cover 51b.

Figure 3:
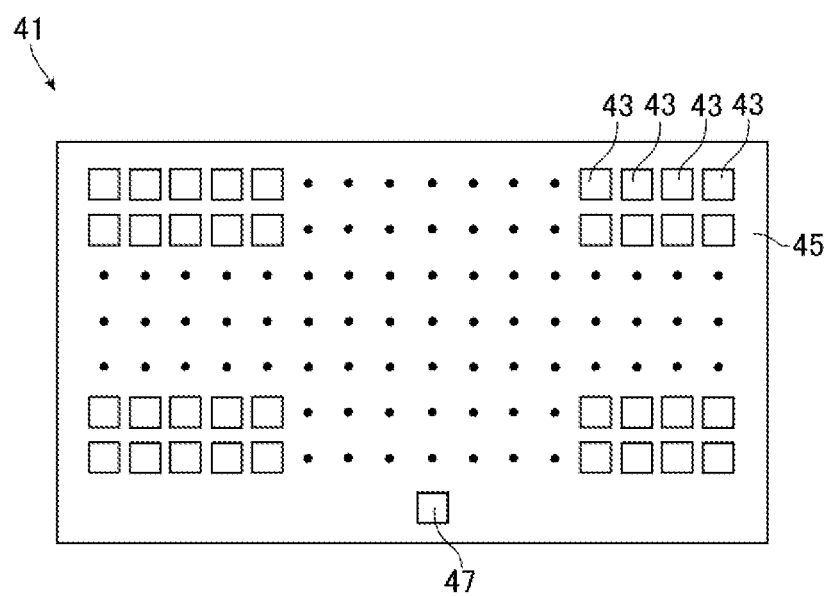
FIG. 3 is a front view schematically illustrating a first light source unit and a temperature sensor illustrated in FIG. 2.

FIG. 3 is a front view schematically illustrating the first light source unit 41 and the temperature sensor 47 illustrated in FIG. 2. As illustrated in FIGS. 2 and 3, the first light source unit 41 includes a plurality of light-emitting elements 43 that emit the first light that is white light, and a circuit board 45 on which the plurality of light-emitting elements 43 is mounted. Examples of each light-emitting element 43 can include an LED or an LD. Such light-emitting elements 43 are arranged in a matrix shape and arranged in the up-down direction and the left-right direction. The number of the light-emitting elements 43 is 96 in the left-right direction and 32 in the up-down direction, but the number is not particularly limited. These light-emitting elements 43 are microLEDs, and are preferably so-called microLED arrays. The shapes of the emission surfaces of the light-emitting elements 43 have substantially the same size and are square, but are not particularly limited. Each of the light-emitting elements 43 may be an LED or an LD that emits light of different wavelengths.

Each of the light-emitting elements 43 emits the first light when power is individually supplied from a power supply unit (not illustrated) via the circuit board 45, and generates heat when the first light is emitted. The heat of each light-emitting element 43 is transferred to the circuit board 45. As the power supplied to each of the light-emitting elements 43 increases, the light emission amount and the heat generation amount of each of the light-emitting elements 43 increase, and the temperature of the first light source unit 41 increases. Since the heat generation amount of the circuit board 45 is very small compared to the heat generation amount of the entire light-emitting elements 43, the temperature of the first light source unit 41 can be regarded as a temperature based on the heat generation amount of the entire light-emitting elements 43.

The temperature sensor 47 is mounted on the circuit board 45 and estimates the temperature of the first light source unit 41. Examples of such a temperature sensor 47 include a thermistor. The temperature sensor 47 is electrically connected to the control unit 110, and outputs a temperature signal related to the estimated temperature to the control unit 110. The temperature sensor 47 of the present embodiment is disposed away from each light-emitting element 43, and the temperature of the heat may decrease before the heat of each light-emitting element 43 is transferred to the temperature sensor 47. Therefore, the control unit 110 may estimate the temperature of the first light source unit 41 based on the temperature signal from the temperature sensor 47 and the distance between each light-emitting element 43 and the temperature sensor 47. Furthermore, the control unit 110 may estimate the temperature of the first light source unit 41 based on the amount of power of each light-emitting element 43.

The configuration and mounting position of the temperature sensor 47 are not particularly limited as long as the temperature sensor 47 can estimate the temperature of the first light source unit 41. For example, the temperature sensor 47 may be attached to each light-emitting element 43, or may be mounted on another circuit board electrically connected to the circuit board 45.

The projection lens 49 is a lens that adjusts a divergence angle of the first light incident on the projection lens 49. In the projection lens 49, the incident surface is formed into a convex shape toward the rear, and the emission surface is formed into a convex shape toward the front. A rear focal point of the projection lens 49 is located on or near the emission surface of any of the light-emitting elements 43. The first light whose divergence angle is adjusted by the projection lens 49 passes through the front cover 51b of the housing 51 and is emitted from the first lamp 40 toward the front of the vehicle 10.

Figure 4:
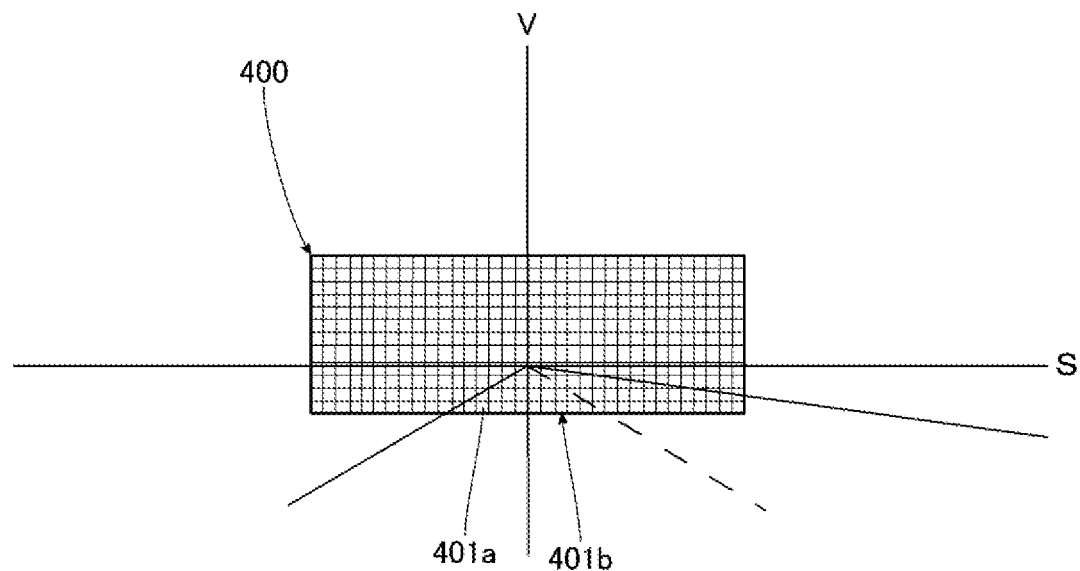
FIG. 4 is a view illustrating a first light distribution pattern of the first embodiment formed by first light emitted from the first lamp.

Next, a first light distribution pattern 400 formed by the first light emitted from the first lamp 40 will be described with reference to FIG. 4. FIG. 4 is a view illustrating the first light distribution pattern 400 formed on a virtual vertical screen disposed 25 m ahead of the vehicle 10. In FIG. 4, S represents a horizontal line, and V represents a vertical line passing through the center of the vehicle 10 in the left-right direction.

The first light distribution pattern 400 includes an irradiation region 401a irradiated with the first light emitted from each light-emitting element 43. Since the plurality of light-emitting elements 43 are arranged in a matrix shape, the irradiation region 401a is arranged in a matrix shape. Each irradiation region 401a corresponds to one light-emitting element 43. The relative position of a specific light-emitting element 43 among the plurality of light-emitting elements 43 and the relative position of a specific irradiation region 401a corresponding to the specific light-emitting element 43 among the plurality of irradiation regions 401a are reversed vertically and horizontally. In FIG. 4, for easy understanding, the number of irradiation regions 401a is smaller than the number of light-emitting elements 43. The irradiation region 401a corresponds to the shape of the emission surface of the light-emitting element 43.

In FIG. 4, for easy understanding, the adjacent irradiation regions 401a are in contact with each other but overlap each other. In FIG. 4, a region formed by all the irradiation regions 401a is illustrated as an irradiation region 401b, and the irradiation region 401b is a region where the first lamp 40 can emit the first light. The irradiation region 401b has a rectangular shape elongated in the left-right direction and overlaps the horizontal line S and the vertical line V. The upper edge of the irradiation region 401b is located above the horizontal line S and extends in the horizontal direction. Further, the lower edge of the irradiation region 401b is located below the horizontal line S and extends in the horizontal direction. The position, orientation, and the like of the light-emitting element 43 are adjusted so that the irradiation region 401b is arranged as described above.

The adjacent irradiation regions 401a may be in contact with each other or may be separated from each other to form a gap. However, it is preferable that the plurality of irradiation regions 401a are arranged in a matrix shape without a gap. The size and shape of the irradiation region 401a are not particularly limited, and the size and shape of each irradiation region 401a may be different from each other.

The size and shape of the first light distribution pattern 400 change according to the selection of the light-emitting element 43 that emits the first light. The intensity distribution of the first light in the first light distribution pattern 400 is adjusted by adjusting the light emission amount of each light-emitting element 43.

Figure 5:
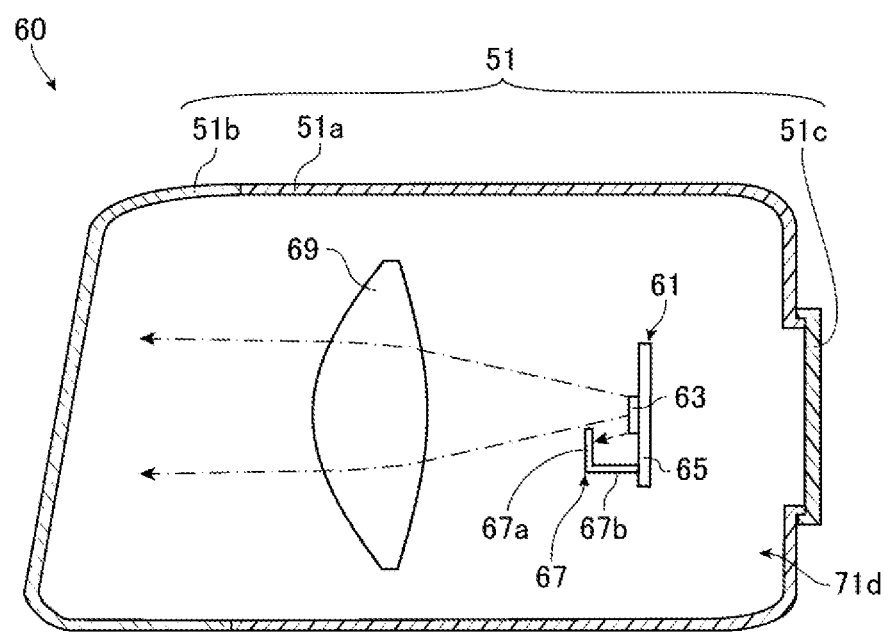
FIG. 5 is a side view schematically illustrating a second lamp of the first embodiment illustrated in FIG. 1.

Next, the second lamp 60 will be described with reference to FIG. 5. FIG. 5 is a side view schematically illustrating the second lamp 60. The second lamp 60 includes a second light source unit 61 that emits the second light toward the front, a shade 67, a projection lens 69 disposed in front of the second light source unit 61, and a housing 51 that houses the second light source unit 61, the shade 67, and the projection lens 69. In FIG. 5, the housing 51 is illustrated in a schematic cross section in the vertical direction of the second lamp 60.

Figure 6:
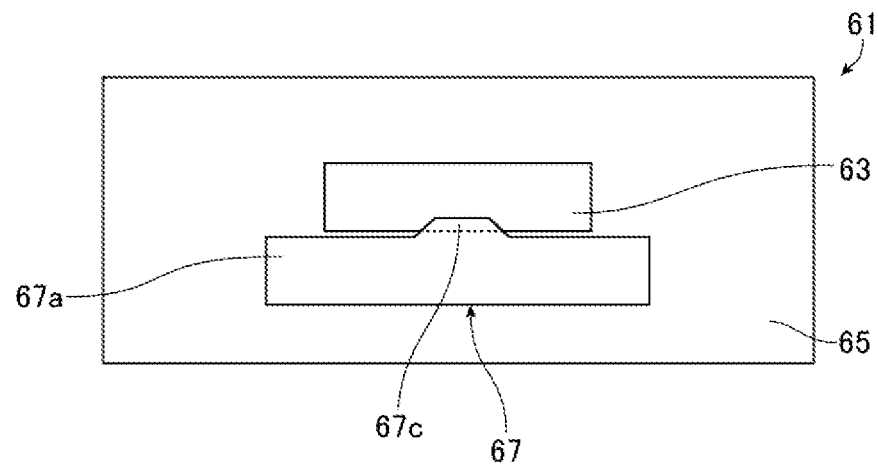
FIG. 6 is a front view schematically illustrating a second light source unit and a shade illustrated in FIG. 5.

FIG. 6 is a front view schematically illustrating the second light source unit 61 and the shade 67 illustrated in FIG. 5. As illustrated in FIGS. 5 and 6, the second light source unit 61 includes a light-emitting element 63 that emits the second light that is white light, and a circuit board 65 on which the light-emitting element 63 is mounted. Examples of the light-emitting element 63 can include an LED or an LD. The shape of the emission surface of the light-emitting element 63 is a substantially rectangular shape elongated in the left-right direction, but is not particularly limited. The emission surface is made larger than the emission surface of the light-emitting element 43 of the first light source unit 41.

The shade 67 includes a light shielding portion 67a and a fixing portion 67b which are integrally formed by bending a plate-shaped member. The light shielding portion 67a extends in the left-right direction in front of the light-emitting element 63, and the fixing portion 67b is connected to a lower end portion of the light shielding portion 67a. The fixing portion 67b extends rearward from a lower end portion of the light shielding portion 67a, and an end portion of the fixing portion 67b is fixed to the circuit board 65. The upper edge of the light shielding portion 67a is positioned below the optical axis of the light-emitting element 63. A protrusion 67c protruding upward in a substantially isosceles trapezoidal shape is provided at the center portion of the upper edge of the light shielding portion 67a in the left-right direction. Such a light shielding portion 67a shields a part of the second light emitted from the light-emitting element 63.

The projection lens 69 has the same configuration as the projection lens 49, and is a lens that is disposed in front of the shade 67 and adjusts the divergence angle of the second light incident on the projection lens 69. The rear focal point of the projection lens 69 is located at or near the upper edge of the light shielding portion 67a. As described above, a part of the second light emitted from the light-emitting element 63 is shielded by the light shielding portion 67a of the shade 67, and another part of the second light emitted from the light-emitting element 63 is incident on the projection lens 69. The second light whose divergence angle is adjusted by the projection lens 69 passes through the front cover 51b of the housing 51 and is emitted from the second lamp 60 toward the front of the vehicle 10.

Figure 7:
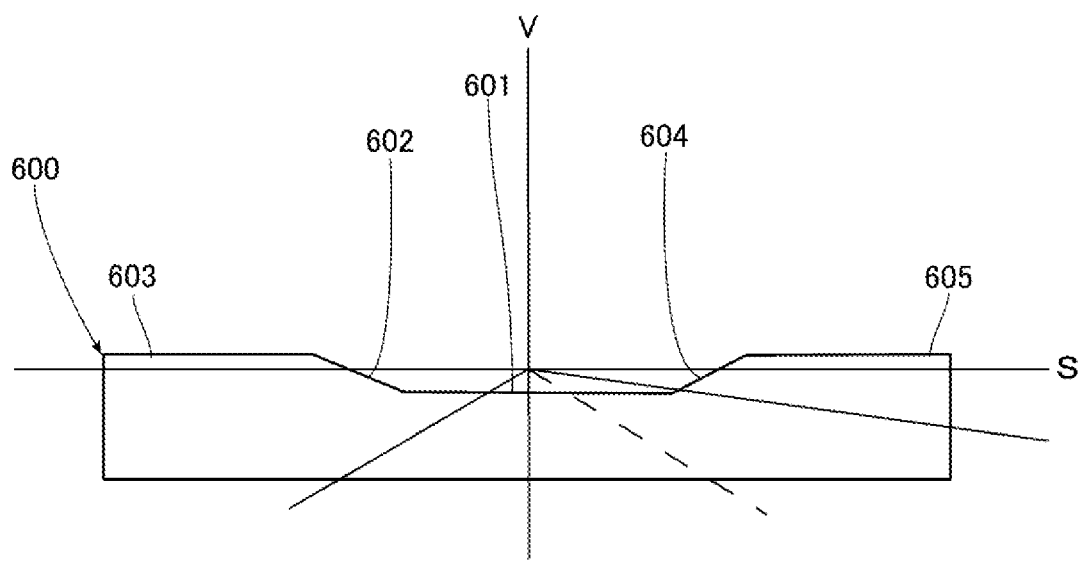
FIG. 7 is a view illustrating a second light distribution pattern of the first embodiment formed by second light emitted from the second lamp.

Next, a second light distribution pattern 600 formed by the second light emitted from the second lamp 60 will be described with reference to FIG. 7. FIG. 7 is a view illustrating the second light distribution pattern 600 formed on a virtual vertical screen disposed 25 m ahead of the vehicle 10. The shape of the second light distribution pattern 600 corresponds to the shape of the light shielding portion 67a, and is a light distribution pattern in which the light distribution pattern when a part of the second light is shielded by the light shielding portion 67a is reversed vertically and horizontally.

The second light distribution pattern 600 overlaps the horizontal line S and the vertical line V. The upper edge of the second light distribution pattern 600 corresponds to the shape of the upper edge of the light shielding portion 67a including the protrusion 67c. The upper edge of the second light distribution pattern 600 includes a first edge 601, a second edge 602, a third edge 603, a fourth edge 604, and a fifth edge 605. The first edge 601 is located below the horizontal line S and horizontally extends from the vertical line V to the right side which is one side in the horizontal direction and to the left side which is the other side in the horizontal direction. The second edge 602 extends obliquely upward to the left side from a left end of the first edge 601. An end of the second edge 602 opposite to the first edge 601 is located above the horizontal line S. The third edge 603 extends horizontally to the left side from an end of the second edge 602 opposite to the first edge 601, and is located above the horizontal line S. The fourth edge 604 and the fifth edge 605 are located substantially symmetrically with the second edge 602 and the third edge 603 with respect to the first edge 601. The lower edge of the second light distribution pattern 600 is located below the horizontal line S, intersects with the vertical line V, and extends in the horizontal direction. The left edge of the second light distribution pattern 600 extends from an end of the third edge 603 opposite to the second edge 602 toward the left end of the lower edge of the second light distribution pattern 600. The right edge of the second light distribution pattern 600 extends from an end of the fifth edge 605 opposite to the fourth edge 604 toward the right end of the lower edge of the second light distribution pattern 600.

The intensity distribution of the second light in the second light distribution pattern 600 is adjusted by adjusting the light emission amount of the light-emitting element 63.

Figure 8:
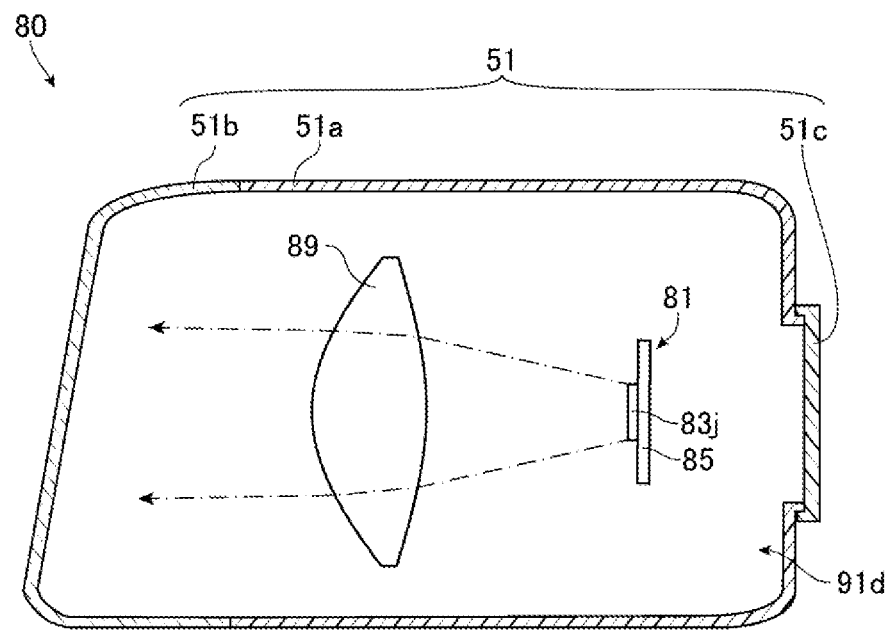
FIG. 8 is a side view schematically illustrating a third lamp of the first embodiment illustrated in FIG. 1.

Next, the third lamp 80 will be described with reference to FIG. 8. FIG. 8 is a side view schematically illustrating the third lamp 80. The third lamp 80 includes a third light source unit 81 that emits third light toward the front, a projection lens 89 disposed in front of the third light source unit 81, and the housing 51 that houses the third light source unit 81 and the projection lens 89. In FIG. 8, the housing 51 is illustrated in a schematic cross section in the vertical direction of the third lamp 80.

Figure 9:
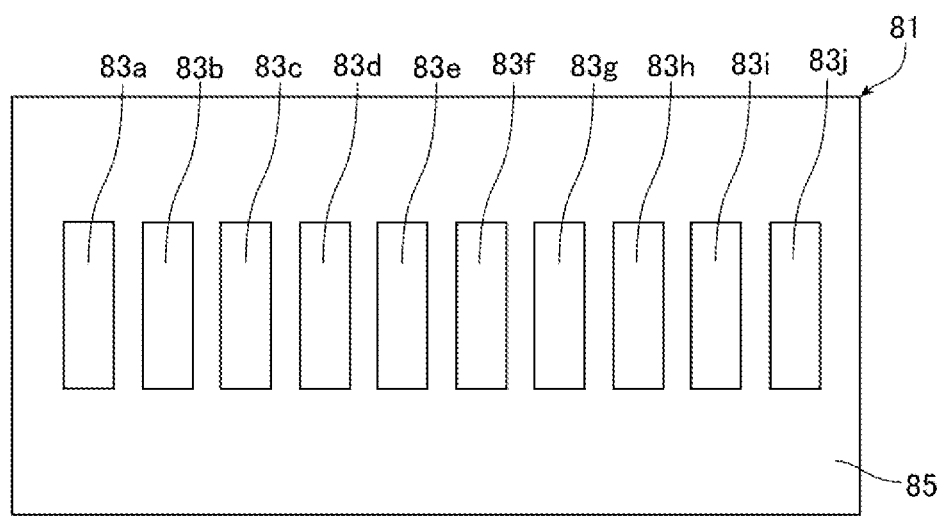
FIG. 9 is a front view schematically illustrating a third light source unit illustrated in FIG. 8.

FIG. 9 is a front view schematically illustrating the third light source unit 81 illustrated in FIG. 8. The third light source unit 81 includes a plurality of light-emitting elements 83a to 83j that emit third light that is white light, and a circuit board 85 on which the plurality of light-emitting elements 83a to 83j are mounted. Examples of each of the light-emitting elements 83a to 83j include an LED or an LD, and the light-emitting elements 83a to 83j are arranged in a row in the left-right direction in an array. The shapes of the emission surfaces of the light-emitting elements 83a to 83j have substantially the same size and are substantially rectangular shapes elongated in the up-down direction, but are not particularly limited. The emission surface is made larger than the emission surface of the light-emitting element 43 in the first light source unit 41. The number of light-emitting elements is not particularly limited as long as it is one or more. Each of the light-emitting elements 83a to 83j may be an LED or an LD that emits light of different wavelengths. The number of light-emitting elements may be two or more. Each of the light-emitting elements 83a to 83j emits the third light when power is individually supplied from a power supply unit (not illustrated) via the circuit board 85, and generates heat when the third light is emitted. As the power supplied to each of the light-emitting elements 83a to 83j increases, the light emission amount of each of the light-emitting elements 83a to 83j increases.

The projection lens 89 has the same configuration as the projection lens 49, and is a lens that adjusts the divergence angle of the third light incident on the projection lens 89. The rear focal point of the projection lens 89 is located on or near the emission surface of the light-emitting element 83f located substantially at the center on the left and right among the plurality of light-emitting elements 83a to 83j. The third light whose divergence angle is adjusted by the projection lens 89 passes through the front cover 51b of the housing 51 and is emitted from the third lamp 80 toward the front of the vehicle 10.

Figure 10:
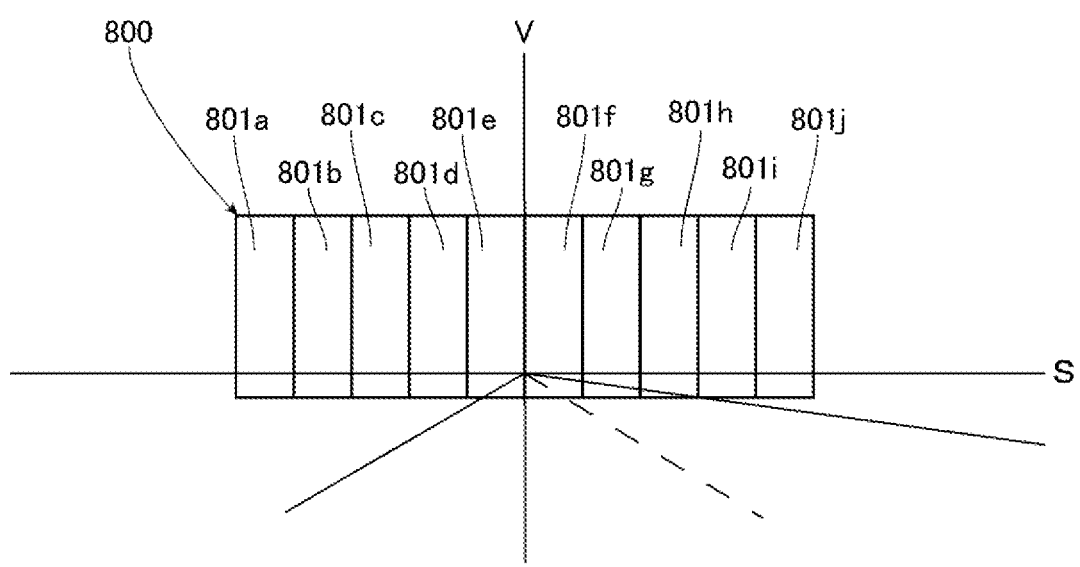
FIG. 10 is a view illustrating a third light distribution pattern of the first embodiment formed by third light emitted from the third lamp.

Next, a third light distribution pattern 800 formed by the third light emitted from the third lamp 80 will be described with reference to FIG. 10. FIG. 10 is a view illustrating the third light distribution pattern 800 formed on a virtual vertical screen disposed 25 m ahead of the vehicle 10.

The third light distribution pattern 800 includes irradiation regions 801a to 801j irradiated with the third light emitted from the light-emitting elements 83a to 83j. Since the light-emitting elements 83a to 83j are arranged in a row in the left-right direction, the irradiation regions 801a to 801j are also arranged in a row in the left-right direction. The irradiation regions 801a to 801j individually correspond to the shapes of the emission surfaces of the light-emitting elements 83a to 83j, and have substantially the same size and rectangular shapes elongated in the up-down direction. The adjacent irradiation regions are in contact with each other.

The third light distribution pattern 800 has a rectangular shape elongated in the left-right direction, the irradiation regions 801a to 801j overlap the horizontal line S, and the irradiation regions 801e and 801f are in contact with the vertical line V. The upper edge of each irradiation region, which is the upper edge of the third light distribution pattern 800, is located above the horizontal line S and extends in the horizontal direction. Further, the lower edge of each irradiation region, which is the lower edge of the third light distribution pattern 800, is located below the horizontal line S and extends in the horizontal direction. The positions, orientations, and the like of the light-emitting elements 83a to 83j are adjusted so that the irradiation regions 801a to 801j are arranged as described above.

A part of the adjacent irradiation regions may overlap each other. Alternatively, the adjacent irradiation regions may be separated from each other to form a gap. However, it is preferable that the irradiation regions 801a to 801j are arranged without a gap in the left-right direction. The sizes and shapes of the irradiation regions 801a to 801j are not particularly limited, and may be different from each other, and may be larger than the irradiation region 401a.

The size and shape of the third light distribution pattern 800 change according to the selection of the light-emitting elements 83a to 83j that emit the third light. The intensity distribution of the third light in the third light distribution pattern 800 is adjusted by adjusting the light emission amount of each of the light-emitting elements 83a to 83j.

Referring back to FIG. 1, the description of the vehicle 10 will be continued.

The detection device 150 includes a steering sensor, and the steering sensor detects a rotation direction and a rotation angle of a steering wheel of the vehicle 10, that is, a direction in which the vehicle 10 turns and a steering angle of the vehicle 10. Therefore, the steering sensor detects the right steering angle and the left steering angle while identifying the right steering angle and the left steering angle as different steering angles. The steering sensor is electrically connected to the control unit 110, and outputs a signal corresponding to a steering angle based on a time when the vehicle 10 travels straight to the control unit 110. Note that the steering sensor may be electrically connected to the control unit 110 via an electronic control unit (ECU) (not illustrated) of the vehicle 10, or may input a signal to the control unit 110 via the ECU.

The recording unit 130 is electrically connected to the control unit 110. The recording unit 130 is, for example, a non-transitory recording medium, and is preferably a semiconductor recording medium such as a random access memory (RAM) or a read only memory (ROM), but may include a recording medium of any format such as an optical recording medium or a magnetic recording medium. Note that the "non-transitory" recording medium includes all computer-readable recording media except for a transitory propagating signal, and does not exclude a volatile recording medium.

The control unit 110 includes, for example, an integrated circuit such as a microcontroller, an integrated circuit (IC), a large-scale integrated circuit (LSI), or an application specific integrated circuit (ASIC), or a numerical control (NC) device. Furthermore, in a case where the NC device is used, the control unit 110 may use a machine learning device or may not use a machine learning device. The control unit 110 may be a part of the ECU of the vehicle 10.

The light switch 200 is electrically connected to the control unit 110. The light switch 200 is a switch that selects one of emission of a low-beam, emission of a high-beam, and non-emission of light. For example, the light switch 200 outputs, to the control unit 110, a control signal indicating emission of a low-beam in a case where the emission of a low-beam is selected, and a control signal indicating emission of a high-beam in a case where the emission of a high-beam is selected. As described above, the control signal is a signal instructing start of light emission from the lamp unit 30. In addition, the light switch 200 does not output the control signal to the control unit 110 when the non-emission of light is selected. When the control signal is not input, the control unit 110 stops the driving of the lamp unit 30.

When the control signal is input from the light switch 200, the control unit 110 supplies power or stops power supply to the light-emitting elements 43, 63, 83a to 83j via the power supply unit and the circuit boards 45, 65, and 85. As a result, the light-emitting elements 43, 63, and 83a to 83j that emit light are selected, and the light distribution patterns 400, 600, and 800 formed by the light emitted from the lamp unit 30 change according to the selection. Furthermore, the control unit 110 adjusts power supplied to the light-emitting elements 43, 63, and 83a to 83j. As a result, the light emission amount of each of the light-emitting elements 43, 63, and 83a to 83j is adjusted, and the intensity distribution of light in the light distribution patterns 400, 600, and 800 is adjusted.

Next, temperature derating in the first light source unit 41 will be described.

In the first light source unit 41, since the light-emitting elements 43 are densely arranged as compared with the other light source units 61 and 81, the temperature of the first light source unit 41 is likely to rise as compared with the other light source units 61 and 81. Therefore, in the present embodiment, the control unit 110 performs temperature derating on the first light source unit 41.

The control unit 110 does not perform temperature derating when a temperature T of the first light source unit 41 estimated by the temperature sensor 47 is lower than a temperature T0, for example, 80° C., which is a predetermined value at the time of starting temperature derating. The control unit 110 performs temperature derating when the temperature T is equal to or higher than the temperature T0. When the temperature T is the temperature T0, the control unit 110 supplies power E0 smaller than the power supplied when the temperature derating is not performed to the light-emitting element 43. In this case, the control unit supplies the power E0 to the light-emitting element 43 to which power larger than the power E0 is supplied among the light-emitting elements 43, and lowers the power to be supplied to the light-emitting element 43. In addition, in a case where the temperature T is the temperature T1 higher than the temperature T0, the control unit 110 supplies the power E1 smaller than the power E0 to the light-emitting element 43. In this case, the control unit 110 supplies the power E1 to the light-emitting element 43 to which power larger than the power E1 is supplied among the plurality of light-emitting elements 43, and lowers the power to be supplied to the light-emitting element 43. When the temperature T0 is 80° C., the temperature T1 is, for example, 110° C. If the estimated temperature T is a temperature T2 higher than the temperature T1, the control unit 110 supplies power E2 lower than the power E1 to the light-emitting element 43. When the temperature T1 is 110° C., the temperature T2 is, for example, 120° C. In a case where the estimated temperature T is higher than the temperature T2, the control unit 110 supplies the power E2 to the light-emitting element 43, for example, in order to avoid turning off the light. As described above, when the temperature T is equal to or higher than the temperature T0, the control unit 110 controls the power E according to the temperature T. When the power E decreases, the light emission amount and the heat generation amount of each light-emitting element 43 decrease, and the temperature of the first light source unit 41 decreases. Note that the temperature T1 may be the same in the case of emitting a high-beam and the case of emitting a low-beam, or may be higher or lower in the case of emitting a high-beam than in the case of emitting a low-beam.

Next, an operation of the vehicular headlight 20 of the present embodiment will be described.

Figure 11:
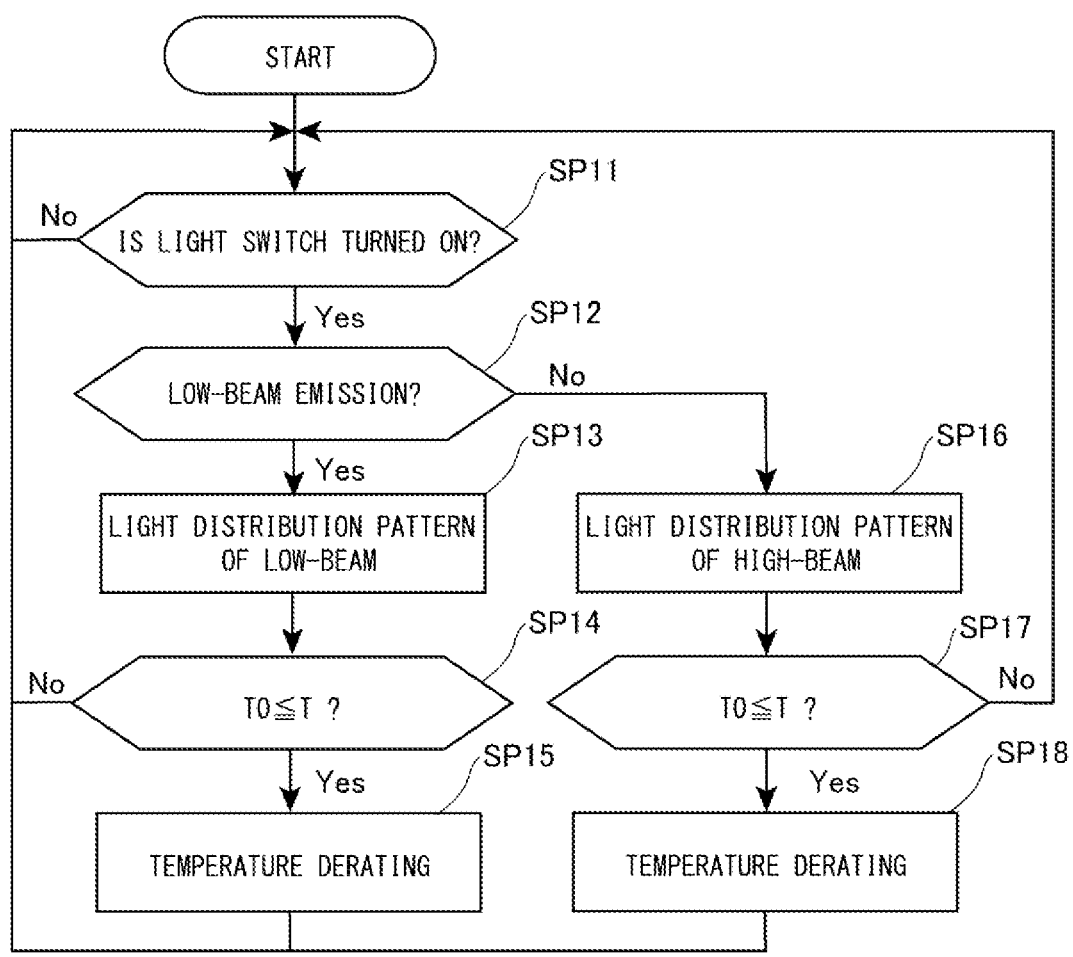
FIG. 11 is a diagram illustrating an example of a control flowchart of a control unit according to the first embodiment.

FIG. 11 is a diagram illustrating an example of a control flowchart of the control unit 110 according to the present embodiment. As illustrated in FIG. 11, the control flow of the present embodiment includes steps SP11 to SP18. Note that the control flow is not limited thereto. In the start state illustrated in FIG. 11, it is assumed that the temperature sensor 47 estimates the temperature T of the first light source unit 41, and the temperature signal is input to the control unit 110.

(Step SP11) If no control signal is input from the light switch 200, the control unit 110 does not supply power to the light-emitting elements 43, 63, and 83a to 83j, and repeats step SP11. When the light switch 200 is turned on and a control signal is input from the light switch 200, the control unit 110 advances the control flow to step SP12.

(Step SP12) In this step, when the control signal from the light switch 200 is a signal indicating emission of a low-beam, the control unit 110 advances the control flow to step SP13. When the control signal from the light switch 200 is not a signal indicating emission of a low-beam, the control unit 110 advances the control flow to step SP16.

(Step SP13)

Figure 12:
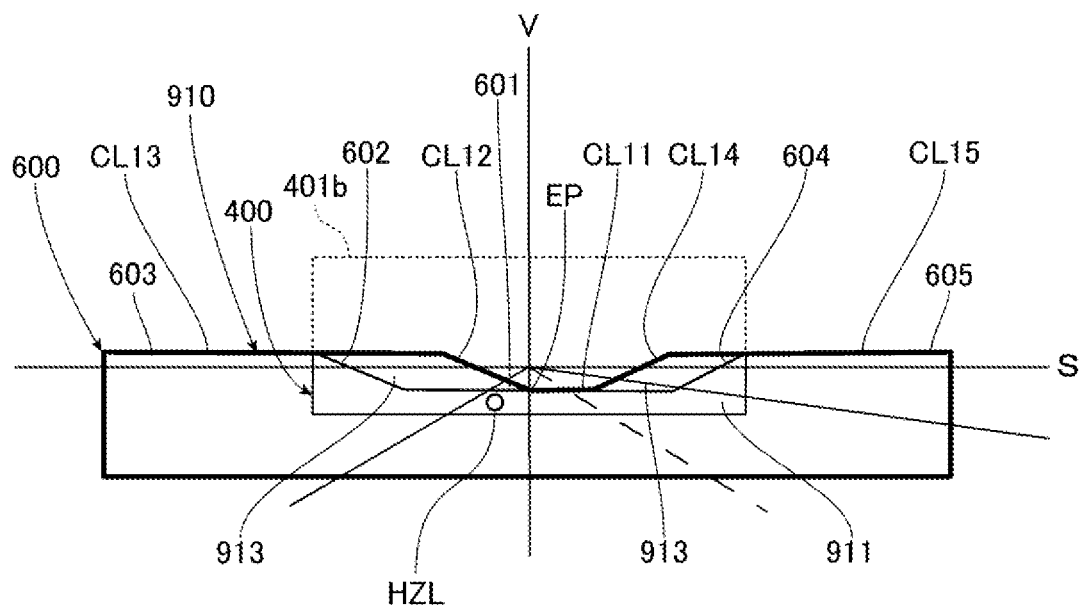
FIG. 12 is a view illustrating a light distribution pattern of a low-beam of the first embodiment.

In this step, the control unit 110 supplies power to the light-emitting elements 43 and 63 to emit the first and second lights and form a light distribution pattern of a low-beam. FIG. 12 is a view illustrating a light distribution pattern 910 of a low-beam formed on a virtual vertical screen disposed 25 m ahead of the vehicle 10. In FIG. 12, the light distribution pattern 910 is indicated by a thick line.

In the present step, the first light distribution pattern 400 is formed by the first light, and the second light distribution pattern 600 is formed by the second light. When the low-beam is emitted, the first light distribution pattern 400 is formed by the first light from a part of some of the light-emitting elements 43 instead of all the light-emitting elements 43, but may be formed by the first light from at least some of the light-emitting elements 43. In FIG. 12, the upper edge, a part of the left edge, and a part of the right edge of the irradiation region 401b in the first light distribution pattern 400 are indicated by broken lines.

The light distribution pattern 910 is formed by overlapping the first light distribution pattern 400 and the second light distribution pattern 600. Specifically, a part of the first light distribution pattern 400 overlaps at least a part of the second light distribution pattern 600. In addition, the other part of the first light distribution pattern 400 does not overlap the second light distribution pattern 600 and is located outside the second light distribution pattern 600 above the height position of the first edge 601 of the upper edge of the second light distribution pattern 600.

The light distribution pattern 910 as described above includes cutoff lines CL11 to CL15 at the upper edge. The cutoff line CL11 extends in the horizontal direction to the right side, which is one side in the left-right direction, from an elbow point EP located below the horizontal line S and on or near the vertical line V. The cutoff line CL12 extends obliquely upward from the elbow point EP to the left side which is the other side in the left-right direction. An end of the cutoff line CL12 opposite to the elbow point EP side is located above the horizontal line S. The cutoff line CL13 extends in the horizontal direction from an end of the cutoff line CL12 opposite to the elbow point EP side to the other side in the left-right direction. The cutoff line CL13 is located above the horizontal line S. The cutoff line CL14 extends obliquely upward from an end of the cutoff line CL11 opposite to the elbow point EP side to the one side in the left-right direction. An end of the cutoff line CL14 opposite to the cutoff line CL11 side is located above the horizontal line S and is located at substantially the same height position as the cutoff line CL13. The cutoff line CL15 extends in the horizontal direction from an end of the cutoff line CL14 opposite to the cutoff line CL11 side to the one side in the left-right direction. The cutoff line CL15 is located above the horizontal line S and is located at substantially the same height position as the cutoff line CL13.

The cutoff lines CL11, CL12, and CL14 of the light distribution pattern 910 are a part of the upper edge of the first light distribution pattern 400. A part of the cutoff line CL13 continuous with the cutoff line CL12 in the cutoff line CL13 is another part of the upper edge of the first light distribution pattern 400. The other part of the cutoff line CL13 is the third edge 603 at the upper edge of the second light distribution pattern 600. A part of the cutoff line CL15 continuous with the cutoff line CL14 in the cutoff line CL15 is a remaining part of the upper edge of the first light distribution pattern 400. The other part of the cutoff line CL15 is the fifth edge 605 at the upper edge of the second light distribution pattern 600. The control unit 110 controls the supply of power to the light-emitting element 43 so that the upper edge of the first light distribution pattern 400 becomes the cutoff line CL11, the cutoff line CL12, the cutoff line CL14, a part of the cutoff line CL13, and a part of the cutoff line CL15. Therefore, the first light distribution pattern 400 of the light distribution pattern 910 is formed by the first light emitted from not all the light-emitting elements 43 of the first lamp 40 but a part of the light-emitting elements 43.

The left edge, the right edge, and the lower edge of the light distribution pattern 910 are the left edge, the right edge, and the lower edge of the second light distribution pattern 600. Therefore, in the left-right direction, the second light distribution pattern 600 is made longer than the first light distribution pattern 400. The left edge of the second light distribution pattern 600 is located on the left side of the left edge of the first light distribution pattern 400, and the right edge of the second light distribution pattern 600 is located on the right side of the right edge of the first light distribution pattern 400. In the up-down direction, the lower edge of the first light distribution pattern 400 is located between the upper edge and the lower edge of the second light distribution pattern 600.

The light distribution pattern 910 includes a region 911 that is a first region in which a part of the first light distribution pattern 400 overlaps with a part of the second light distribution pattern 600, and a region 913 that is a second region in which another part of the first light distribution pattern 400 does not overlap with the second light distribution pattern 600. In the light distribution pattern 910, the region 911 is irradiated with the first light from the first lamp 40 and the second light from the second lamp 60, and the region 913 is irradiated with the first light from the first lamp 40. The region 911 is larger than the region 913. When the light amount of the second light is lower than the predetermined ratio of the peak value of the light amount, the region where the first light and the second light overlap can be regarded as the region 913. The predetermined ratio is, for example, 2%, and in this case, it can be considered that the first light and the second light do not visually overlap each other. Alternatively, a region where the second light having a luminous intensity lower than a predetermined luminous intensity of the second light forming the outer edge of the second light distribution pattern 600 such as the edge 601, 602, and 604 overlaps the first light can be regarded as the region 913. The predetermined luminous intensity is, for example, 500 cd, and it can be considered that the first light and the second light are not visually overlapped with each other.

The number of regions 913 is two. One region 913 is surrounded by the cutoff line CL12, a part of the cutoff line CL13, a part of the first edge 601 passing through the elbow point EP, and the second edge 602 on the left side of the vertical line V. The other region 913 is surrounded by the cutoff line CL14, a part of the cutoff line CL15, another part of the first edge 601 passing through the elbow point EP, and the fourth edge 604 on the right side of the vertical line V. The respective regions 913 are located apart in the left-right direction. Such a region 913 is a region of the first light distribution pattern 400 excluding the region 911, is continuous with the region 911, and is located above the region 911 outside the second light distribution pattern 600.

A hot zone HZL, which is a region having the highest intensity of light in the light distribution pattern 910, is located in the vicinity of the elbow point EP in the region 911. The light amounts of the first and second lights respectively emitted from the light-emitting elements 43 and 63 are adjusted by the control unit 110 such that the intensity of the light in the light distribution pattern 910 decreases as the distance from the hot zone HZL increases, for example.

After forming the light distribution pattern 910 of a low-beam in front of the vehicle 10, the control unit 110 advances the control flow to step SP14.

(Step SP14)

In this step, if the temperature T indicated by the temperature signal from the temperature sensor 47 is lower than the temperature TO, the control unit 110 returns the control flow to step SP11. Further, if the temperature T is equal to or higher than the temperature TO, the control unit 110 advances the control flow to step SP15.

(Step SP15)

The control unit 110 performs temperature derating on the first light source unit 41 based on the temperature of the first light source unit 41 in a state where the light distribution pattern 910 of a low-beam is formed.

In this step, the control unit 110 lowers the power to be supplied to the light-emitting element 43 that emits at least a part of the first light that irradiates at least the region 911 of the first light distribution pattern 400 in the light distribution pattern 910 as compared with that before the temperature derating. As a result, the light amount of the first light with which the region 911 is irradiated decreases as compared with that before the temperature derating. When the light amount of the first light decreases, the heat generation amount of the light-emitting element 43 decreases, and the temperature rise of the first light source unit 41 is reduced. When the temperature T of the first light source unit 41 becomes lower than the temperature TO, the control unit 110 restores the power supplied to the light-emitting element 43 to the power before the temperature derating.

when temperature derating is performed on the first light source unit 41, the control unit 110 sets the power supplied to the plurality of light-emitting elements 43 emitting the first light with which the region 913 of the first light distribution pattern 400 is irradiated to be the same as that before the temperature derating. As a result, the light amount of the first light with which the region 913 is irradiated becomes the same as that before the temperature derating, and even if the temperature derating is performed, a change in brightness in the region 913 is reduced. In addition, a change in brightness on the cutoff lines CL12, a part of CL13, CL14, and a part of CL15 in the light distribution pattern 910 is reduced.

Note that, in a case where the temperature derating is performed on the first light source unit 41, the control unit 110 may lower the power supplied to the light-emitting element 43 that emits at least a part of the first light with which the region 913 is irradiated compared to that before the temperature derating. As a result, the heat generation amount of the light-emitting element 43 decreases as compared with that before the temperature derating, and the temperature rise of the first light source unit 41 can be reduced. For example, when the region 913 is brighter than the second light distribution pattern 600 before the temperature derating, the region 913 may have the same brightness as the second light distribution pattern 600 due to the temperature derating. When the region 913 has the same brightness as the second light distribution pattern 600, an excessive change in brightness between the region 913 and the second light distribution pattern 600 can be reduced as compared with the case where the region 913 does not have the same brightness as the second light distribution pattern 600.

when temperature derating is performed on the first light source unit 41, the control unit 110 sets the power supplied to the light-emitting element 63 emitting the second light to be the same as that before the temperature derating. As a result, the light amount of the second light with which the second light distribution pattern 600 of the light distribution pattern 910 of a low-beam is irradiated becomes the same as that before the temperature derating, and even if the temperature derating is performed, a change in brightness in the second light distribution pattern 600 is reduced.

After performing the temperature derating on the first light source unit 41, the control unit 110 returns the control flow to step SP11.

(Step SP16)

Figure 13:
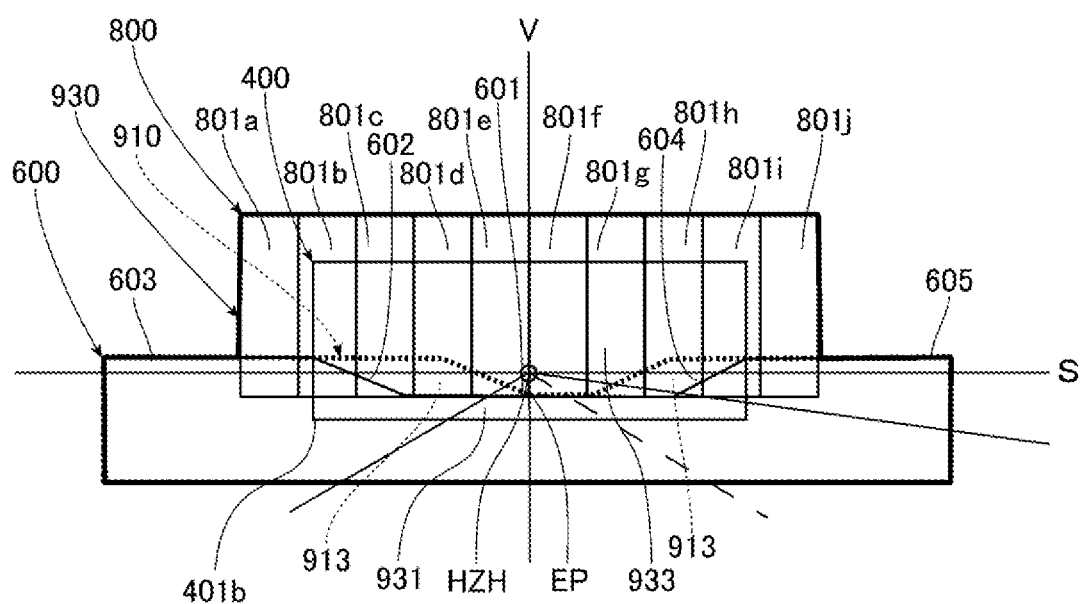
FIG. 13 is a view illustrating a light distribution pattern of a high-beam of the first embodiment.

In this step, the control signal in step SP12 becomes a signal indicating emission of a high-beam, and the control unit 110 supplies power to the light-emitting elements 43, 63, and 83a to 83j and emits the first, second, and third lights to form a light distribution pattern of a high-beam. FIG. 13 is a view illustrating a light distribution pattern 930 of a high-beam formed on a virtual vertical screen disposed 25 m ahead of the vehicle 10. In FIG. 13, the light distribution pattern 930 is indicated by a thick line, and the light distribution pattern 910 of a low-beam illustrated in FIG. 12 is indicated by a broken line.

In this step, similarly to the case where the low-beam is emitted, the light distribution patterns 400 and 600 are formed, and the third light distribution pattern 800 is formed by the third light. When the high-beam is emitted, unlike when the low-beam is emitted, the first light distribution pattern 400 is formed by the first light from all the light-emitting elements 43. Therefore, when the high-beam is emitted, the first light distribution pattern 400 is made larger than when the low-beam is emitted.

The light distribution pattern 930 is formed by overlapping the light distribution patterns 400, 600, and 800. Specifically, in the light distribution pattern 930, the third light distribution pattern 800 is aligned with the second light distribution pattern 600 in the up-down direction. In addition, a part of the third light distribution pattern 800 overlaps a part of the second light distribution pattern 600 and another part of the third light distribution pattern 800 does not overlap with the second light distribution pattern 600 and is located outside the second light distribution pattern 600. In the light distribution pattern 930, a part of the first light distribution pattern 400 overlaps only the second light distribution pattern 600, and another part of the first light distribution pattern 400 overlaps only the third light distribution pattern 800. The remaining part of the first light distribution pattern 400 overlaps with the second light distribution pattern 600 and the third light distribution pattern 800.

The second light distribution pattern 600 is made longer than the third light distribution pattern 800 in the left-right direction. The left edge of the second light distribution pattern 600 is located on the left side of the left edge of the third light distribution pattern 800, and the right edge of the second light distribution pattern 600 is located on the right side of the right edge of the third light distribution pattern 800. The lower edge of the second light distribution pattern 600 is located below the lower edge of the third light distribution pattern 800. Among the upper edge of the second light distribution pattern 600, the edges 602 to 605 are located above the lower edge of the third light distribution pattern 800. The second edge 602, a part of the third edge 603, the fourth edge 604, and a part of the fifth edge 605 are located inside the third light distribution pattern 800, and the other part of the third edge 603 and the other part of the fifth edge 605 are located outside the third light distribution pattern 800. Further, the first edge 601 overlaps a part of the lower edge of the third light distribution pattern 800. Therefore, a part of the second light distribution pattern 600 overlaps with a part of the third light distribution pattern 800, and the other part of the second light distribution pattern 600 does not overlap with the third light distribution pattern 800 and is located outside the third light distribution pattern 800.

The second light distribution pattern 600 is made longer than the first light distribution pattern 400 in the left-right direction. The left edge of the second light distribution pattern 600 is located on the left side of the left edge of the first light distribution pattern 400, and the right edge of the second light distribution pattern 600 is located on the right side of the right edge of the first light distribution pattern 400. The upper edge of the second light distribution pattern 600 crosses between the upper edge and the lower edge of the first light distribution pattern 400. The edges 601, 602, and 604 are located inside the first light distribution pattern 400, and the edges 603 and 605 are located outside the first light distribution pattern 400.

The first light distribution pattern 400 is made shorter than the third light distribution pattern 800 in the left-right direction. The left edge of the first light distribution pattern 400 is located on the right side of the left edge of the third light distribution pattern 800, and the right edge of the first light distribution pattern 400 is located on the left side of the right edge of the third light distribution pattern 800. The lower edge of the first light distribution pattern 400 is located below the lower edge of the third light distribution pattern 800 and the upper edge of the second light distribution pattern 600. The upper edge of the first light distribution pattern 400 is located below the upper edge of the third light distribution pattern 800 and above the upper edge of the second light distribution pattern 600.

The upper edge of the light distribution pattern 930 as described above is a part of the third edge 603 of the second light distribution pattern 600 located outside the third light distribution pattern 800 and a part of the left edge of the third light distribution pattern 800 located outside the second light distribution pattern 600. In addition, the upper edge of the light distribution pattern 930 is the upper edge of the third light distribution pattern 800, the right edge of the third light distribution pattern 800 located outside of the second light distribution pattern 600, and a part of the fifth edge 605 of the second light distribution pattern 600 located outside the third light distribution pattern 800. The left edge, the right edge, and the lower edge of the light distribution pattern 930 are the left edge, the right edge, and the lower edge of the second light distribution pattern 600.

The light distribution pattern 930 includes a region 931 that is a first region in which a part of the first light distribution pattern 400 overlaps with a part of the second light distribution pattern 600, and a region 933 that is a second region in which another part of the first light distribution pattern 400 does not overlap with the second light distribution pattern 600.

The region 931 is the same as the region 911 which is the first region in the light distribution pattern 910 of a low-beam, but for convenience of description, different reference numerals are used. In a part of the region 931, a part of the first light distribution pattern 400 overlaps only the second light distribution pattern 600. Further, in another part of the region 931, another part of the first light distribution pattern 400 overlaps the second light distribution pattern 600 and the third light distribution pattern 800. Therefore, the region 931 is a region where the first light distribution pattern 400 overlaps at least the second light distribution pattern 600. The part of the region 931 is made larger than the other part of the region 931. In the light distribution pattern 930, the part of the region 931 is irradiated with the first and second lights, and the other part of the region 931 is irradiated with the first to third lights.

At least a part of the region 933 includes a third region in which a remaining part of the first light distribution pattern 400 overlaps with a part of the third light distribution pattern 800. In the present embodiment, since the remaining part of the first light distribution pattern 400 overlaps with a part of the third light distribution pattern 800 in the entire region 933, the entire region 933 is also the third region. The region 933 is larger than the region 931. In the present embodiment, the region 933 includes the region 913 that is the second region in the light distribution pattern 910 of a low-beam, and is made larger than the region 913. The region 933 is continuous with the region 931 in the up-down direction, and the lower edge of the region 933 is continuous with the upper edge of the region 931. In the light distribution pattern 930, the region 933 is irradiated with the first and third lights.

A hot zone HZH, which is a region having the highest intensity of light in the light distribution pattern 930, is located on or near the intersection of the horizontal line S and the vertical line V in the region 933 where the light distribution patterns 400 and 800 overlap each other. The light amounts of the first and third lights emitted from the light-emitting elements 43, and 83*a* to 83*j* are adjusted by the control unit 110 such that the intensity of the light in the light distribution pattern 930 decreases as the distance from the hot zone HZH increases, for example.

After forming the light distribution pattern 930 of a high-beam in front of the vehicle 10, the control unit 110 advances the control flow to step SP17.

(Step SP17)

In this step, if the temperature T indicated by the temperature signal from the temperature sensor 47 is lower than the temperature TO, the control unit 110 returns the control flow to step SP11. Further, if the temperature T is equal to or higher than the temperature TO, the control unit 110 advances the control flow to step SP18.

(Step SP18)

The control unit 110 performs temperature derating on the first light source unit 41 based on the temperature of the first light source unit 41 in a state where the light distribution pattern 930 of a high-beam is formed.

In this step, the control unit 110 lowers the power to be supplied to the light-emitting element 43 that emits at least a part of the first light that irradiates at least one of the region 931 and the region 933 of the first light distribution pattern 400 in the light distribution pattern 930 as compared with that before the temperature derating. As a result, the light amount of the at least a part of the first light with which at least one of the region 931 and the region 933 is irradiated decreases as compared with that before the temperature derating. When the light amount of the first light decreases, the heat generation amount of the light-emitting element 43 decreases, and the temperature rise of the first light source unit 41 is reduced. When the temperature T of the first light source unit 41 becomes lower than the temperature TO, the control unit 110 restores the power supplied to the light-emitting element 43 to the power before the temperature derating.

In addition, when temperature derating is performed on the first light source unit 41, the control unit 110 sets the power to be supplied to the light-emitting element 63 that emits the second light and the power to be supplied to the light-emitting elements 83*a* to 83*j* that emit the third light to be the same as those before the temperature derating. As a result, the light amount of the second light with which the second light distribution pattern 600 of the light distribution pattern 930 of a high-beam is irradiated and the light amount of the third light with which the third light distribution pattern 800 is irradiated are the same as those before the temperature derating. Therefore, even when temperature derating is performed, a change in brightness in the light distribution patterns 600 and 800 are reduced.

After performing the temperature derating on the first light source unit 41, the control unit 110 returns the control flow to step SP11.

As described above, in the vehicular headlight 20 of the present embodiment, in a case where the temperature derating is performed on the first light source unit 41 in a state where the light distribution pattern 910 of a low-beam is formed, the control unit 110 controls the power to be supplied to each of the plurality of light-emitting elements 43 so that the light amount of at least a part of the first light with which at least the region 911 of the first light distribution pattern 400 is irradiated decreases as compared with that before the temperature derating.

In the vehicular headlight 20, in the light distribution pattern 910 of a low-beam, the region 911 is irradiated with the first light and the second light. Therefore, when the temperature derating is performed, in the region 911, even if the light amount of the first light decreases as described above, a decrease in brightness of the light distribution pattern 910 of a low-beam can be reduced and a decrease in visibility in front can be reduced as compared with a case where the first region is not irradiated with the second light. In addition, when the light amount of the first light decreases, the heat generation amount of the light-emitting element 43 decreases, and the temperature rise of the first light source unit 41 can be reduced.

In the vehicular headlight 20 of the present embodiment, at least a part of the region 933 includes a third region overlapping a part of the third light distribution pattern 800. In the present embodiment, the entire region 933 is the third region. In a case where the temperature derating is performed on the first light source unit 41 in a state where the light distribution pattern 930 of a high-beam is formed, the control unit 110 controls the power to be supplied to each of the plurality of light-emitting elements 43 so that the light amount of at least a part of the first light with which at least one of the region 931 and the region 933 is irradiated decreases as compared with that before the temperature derating.

In the vehicular headlight 20, in the light distribution pattern 930 of a high-beam the region 931 is irradiated with the first light, the second light, and the third light, and the region 933 is irradiated with the first light and the third light. According to the above configuration, when the temperature derating is performed, even if the light amount of the first light decreases, a decrease in brightness of the light distribution pattern 930 of a high-beam can be reduced as compared with a case where the region 931 is not irradiated with the second light and the third light and a case where the region 933 is not irradiated with the third light. Therefore, a decrease in visibility of the front can be reduced. In addition, when the light amount of the first light decreases, the heat generation amount of the light-emitting element 43 decreases, and the temperature rise of the first light source unit 41 can be reduced.

Note that, in a case where the control unit 110 performs temperature derating on the first light source unit 41 in a state where the light distribution pattern 910 of a low-beam is formed, the control unit 110 may stop the supply of power to the light-emitting element 43 that emits the first light irradiating the region 911, and the light amount of the first light may become zero. As a result, the temperature rise of the first light source unit 41 can be further reduced. When the power supply is stopped, the region 911 is irradiated with only the second light. In the region 911, even if the light amount of the first light becomes zero, a decrease in brightness of the light distribution pattern 910 of a low-beam can be reduced and a decrease in visibility in front can be reduced as compared with a case where the region 911 is not irradiated with the second light.

Also, in a case where the control unit 110 performs temperature derating on the first light source unit 41 in a state where the light distribution pattern 930 of a high-beam is formed, the control unit 110 may stop the supply of power to the light-emitting element 43, and the light amount of the first light may become zero. As a result, the temperature rise of the first light source unit 41 can be further reduced. When the power supply is stopped, a part of the region 931 is irradiated only with the second light, the other part of the region 931 is irradiated with the second light and the third light, and the region 933 is irradiated only with the third light. In the regions 931 and 933, even if the light amount of the first light becomes zero, a decrease in brightness of the light distribution pattern 930 of a high-beam can be reduced and a decrease in visibility in front can be reduced as compared with a case where the region 931 is not irradiated with the second light and the third light and a case where the region 933 is not irradiated with the third light.

In a case where the temperature derating is performed on the first light source unit 41 in a state where the light distribution pattern 910 of a low-beam is formed, the control unit 110 of the present embodiment controls the power supplied to each of the light-emitting elements 43 that emit the first light for irradiating the regions 911 and 913 as described above. However, the control of the control unit 110 on the light-emitting element 43 is not necessarily limited to the above. Hereinafter, another control of the control unit 110 on the light-emitting element 43 will be described.

In a case where the temperature derating is performed on the first light source unit 41 in a state where the light distribution pattern 910 of a low-beam is formed, the control unit 110 may control the power to be supplied to each light-emitting element 43 so that the light amount of at least a part of the first light with which the region 911 is irradiated decreases more than the light amount of at least a part of the first light with which the region 913 is irradiated. As a result, a decrease in brightness on the cutoff line CL12, a part of the cutoff line CL13, the cutoff line CL14 and a part of the cutoff line CL15 in the light distribution pattern 910 can be reduced as compared with a case where the light amount of first light with which the region 913 is irradiated decreases more than the light amount of first light with which the region 911 is irradiated. Further, when the region 911 is larger than the region 913, according to the above configuration, the temperature rise of the first light source unit 41 is reduced as compared with the case where the region 911 is smaller than the region 913. Note that the light amount of the region 911 may decrease by the same amount as the light amount of the region 913, or may decrease by less than the light amount of the region 913.

Further, in a case where the temperature derating is performed on the first light source unit 41 in a state where the light distribution pattern 910 of a low-beam is formed, the control unit 110 may control the power to be supplied to each light-emitting element 43 so that the light amount of at least a part of the first light with which the region 913 is irradiated decreases after the light amount of at least a part of the first light with which the region 911 is irradiated. As a result, the start of the decrease in brightness on the cutoff lines CL11 and CL12, a part of the cutoff line CL13, the cutoff line CL14, and a part of the cutoff line CL15 in the light distribution pattern 910 can be delayed as compared with a case where the light amount of first light with which the region 913 is irradiated decreases before the light amount of first light with which the region 911 is irradiated. Therefore, the start of the decrease in the visibility of the cutoff line can be delayed. Note that the light amount of the region 913 may decrease simultaneously with the light amount of the region 911, or may decrease before the light amount of the region 911.

In addition, when temperature derating is performed on the first light source unit 41 in a state where the light distribution pattern 910 of a low-beam is formed, the control unit 110 may control the power to be supplied to each light-emitting element 43 so that the light amount in the first light distribution pattern 400 decreases from the upper edge side of the first light distribution pattern 400 included in the region 913 toward the lower edge side of the first light distribution pattern 400 included in the region 911. As a result, a decrease in brightness on a part of the cutoff lines CL11 and CL12, and a part of the cutoff line CL13, the cutoff line CL14 and a part of the cutoff line CL15 in the light distribution pattern 910 can be reduced as compared with the case where the light amount decreases from the lower edge side toward the upper edge side of the first light distribution pattern 400. Therefore, the decrease in the visibility of the cutoff line can be suppressed. Note that the light amount in the first light distribution pattern 400 may decrease from the lower edge side of the first light distribution pattern 400 toward the upper edge side of the first light distribution pattern 400. In the above description, the control unit 110 may reduce the light amount gradually or may reduce the light amount stepwise. When the light amount gradually decreases from the upper edge side toward the lower edge side of the first light distribution pattern 400, an excessive change in brightness of the first light distribution pattern 400 that decreases from the upper edge side toward the lower edge side of the first light distribution pattern 400 can be reduced as compared with a case where the light amount does not gradually decrease.

In addition, when temperature derating is performed on the first light source unit 41 in a state where the light distribution pattern 910 of a low-beam is formed, the control unit 110 may control the power to be supplied to each light-emitting element 43 so that the light amount in the first light distribution pattern 400 decreases from the hot zone HZL side toward the peripheral edge side of the first light distribution pattern 400. The line of sight of the driver of the vehicle 10 tends to focus on the hot zone HZL side rather than the peripheral edge side of the first light distribution pattern 400. According to the above configuration, as compared with the case where the light amount decreases from the peripheral edge side of the first light distribution pattern 400 toward the hot zone HZL, it is possible to reduce a decrease in brightness on the hot zone HZL side where the line of sight of the driver is concentrated.

Further, in a case where the temperature derating is performed on the first light source unit 41, the control unit 110 may control the power to be supplied to each light-emitting element 43 so that the light amount of at least a part of the first light with which the upper edge side of the first light distribution pattern 400 is irradiated decreases after the light amount of at least a part of the first light with which the lower edge side of the first light distribution pattern 400 is irradiated. According to the above configuration, the start of the decrease in brightness on the cutoff lines CL11 and CL12, a part of the cutoff line CL13, the cutoff line CL14 and a part of the cutoff line CL15 in the light distribution pattern 910 can be delayed as compared with the case where the light amount on the upper edge side of the first light distribution pattern 400 decreases before the light amount on the lower edge side. Therefore, the start of the decrease in the visibility of the cutoff line can be delayed. Note that the light amount on the upper edge side of the first light distribution pattern 400 may decrease simultaneously with the light amount on the lower edge side of the first light distribution pattern 400, or may decrease before the light amount on the lower edge side of the first light distribution pattern 400.

In addition, when temperature derating is performed on the first light source unit 41, the control unit 110 may control the power to be supplied to each light-emitting element 43 so that the light amount in the region 911 decreases from the upper edge side toward the lower edge side of the first light distribution pattern 400.

Alternatively, when temperature derating is performed on the first light source unit 41, the control unit 110 may control the power to be supplied to each light-emitting element 43 so that the light amount in the region 913 decreases from the upper edge side toward the lower edge side of the first light distribution pattern 400.

Furthermore, the control unit 110 may control the power to be supplied to each of the plurality of light-emitting elements 43 so that the light amount of the region 913 becomes the same as the light amount of the region 911.

In a case where the temperature derating is performed on the first light source unit 41 in a state where the light distribution pattern 930 of a high-beam is formed, the control unit 110 of the present embodiment controls the power supplied to each of the light-emitting elements 43 that emit the first light for irradiating at least one of the regions 931 and 933 as described above. However, the control unit 110 on the light-emitting element 43 is not necessarily limited to the above. Hereinafter, another control of the control unit 110 on the light-emitting element 43 will be described.

For example, in a case where the temperature derating is performed on the first light source unit 41 in a state where the light distribution pattern 930 of a high-beam is formed, the control unit 110 may control the power to be supplied to each light-emitting element 43 so that the light amount of at least a part of the first light with which the region 931 is irradiated decreases more than the light amount of at least a part of the first light with which the region 933 is irradiated. Since the region 933 is located above the region 931, the line of sight of the driver tends to concentrate on the region 933 rather than the region 931. According to the above configuration, as compared with a case where the light amount of the region 931 decreases less than the light amount of the region 933, a decrease in brightness of the region 933 in which the line of sight of the driver is concentrated in the light distribution pattern of a high-beam is reduced and a decrease in visibility in front can be reduced. Note that the light amount of the region 931 may decrease by the same amount as the light amount of the region 933, or may decrease by less than the light amount of the region 933.

Further, in a case where the temperature derating is performed on the first light source unit 41 in a state where the light distribution pattern 930 of a high-beam is formed, the control unit 110 may control the power to be supplied to each light-emitting element 43 so that the light amount of at least a part of the first light with which the region 933 is irradiated decreases after the light amount of at least a part of the first light with which the region 931 is irradiated. When the light distribution pattern 930 in which the region 933 is larger than the region 931 is formed, the line of sight of the driver tends to concentrate on the region 933 rather than the region 931. In a case where the region 933 is larger than the region 931, according to the above configuration, as compared with a case where the light amount of the region 933 decreases before the light amount of the region 931, the start of the decrease in the brightness of the region 933 where the line of sight of the driver concentrates is delayed, and the decrease in the visibility in the region 933 can be reduced.

Note that the light amount of the region 933 may decrease simultaneously with the light amount of the region 931, or may decrease before the light amount of the region 931. In a case where the region 933 is larger than the region 931, when the light amount of the region 933 decreases before the light amount of the region 931, the temperature rise of the first light source unit 41 is further reduced as compared with a case where the light amount of the region 933 decreases after the light amount of the region 931.

In addition, when temperature derating is performed on the first light source unit 41 in a state where the light distribution pattern 930 of a high-beam is formed, the control unit 110 may control the power to be supplied to each light-emitting element 43 so that the light amount in the first light distribution pattern 400 decreases from the upper edge side of the first light distribution pattern 400 included in the third region toward the lower edge side of the first light distribution pattern 400 included in the region 931. When the light distribution pattern 930 is formed, the line of sight of the driver tends to concentrate on the region 933 rather than the region 931. According to the above configuration, as compared with the case where the light amount decreases from the lower edge side of the first light distribution pattern 400 toward the upper edge side of the first light distribution pattern 400, it is possible to reduce a decrease in brightness of the region 933 where the line of sight of the driver concentrates, and to reduce a decrease in visibility in the region 933. Note that the light amount in the first light distribution pattern 400 may decrease from the lower edge side of the first light distribution pattern 400 toward the upper edge side of the first light distribution pattern 400. In the above description, the control unit 110 may reduce the light amount gradually or may reduce the light amount stepwise. When the light amount gradually decreases from the upper edge side toward the lower edge side of the first light distribution pattern 400, an excessive change in brightness of the first light distribution pattern 400 that decreases from the upper edge side toward the lower edge side of the first light distribution pattern 400 can be reduced as compared with a case where the light amount does not gradually decrease.

In addition, when temperature derating is performed on the first light source unit 41 in a state where the light distribution pattern 930 of a high-beam is formed, the control unit 110 may control the power to be supplied to each light-emitting element 43 so that the light amount in the first light distribution pattern 400 decreases from the hot zone HZH side toward the peripheral edge side of the first light distribution pattern 400. The line of sight of the driver tends to concentrate on the hot zone HZH side rather than the peripheral edge side of the first light distribution pattern 400. According to the above configuration, as compared with the case where the light amount decreases from the peripheral edge side of the first light distribution pattern 400 toward the hot zone HZH, it is possible to reduce a decrease in brightness on the hot zone HZH side where the line of sight of the driver is concentrated.

Further, the control unit 110 may control the power to be supplied to each light-emitting element 43 so that the light amount of at least a part of the first light with which the upper edge side of the first light distribution pattern 400 is irradiated decreases after the light amount of at least a part of the first light with which the lower edge side of the first light distribution pattern 400 is irradiated. According to the above configuration, in a case where the region 933 is larger than the region 931, as compared to a case where the light amount on the upper edge side of the first light distribution pattern 400 decreases before the light amount on the lower edge side, the start of decrease in brightness on the upper edge side where the line of sight of the driver is concentrated in the light distribution pattern 930 is reduced. Therefore, a decrease in visibility on the upper edge side is reduced. Note that the light amount on the upper edge side of the first light distribution pattern 400 may decrease simultaneously with the light amount on the lower edge side of the first light distribution pattern 400, or may decrease before the light amount on the lower edge side of the first light distribution pattern 400.

Furthermore, the control unit 110 may control the light-emitting element 43 so that the light amount of the region 933 becomes the same as the light amount of the region 931.

Next, a first modification of the second lamp 60 will be described in detail. Note that configurations similar to those described above are denoted by the same reference numerals, and redundant description is omitted unless otherwise specified.

Figure 14:
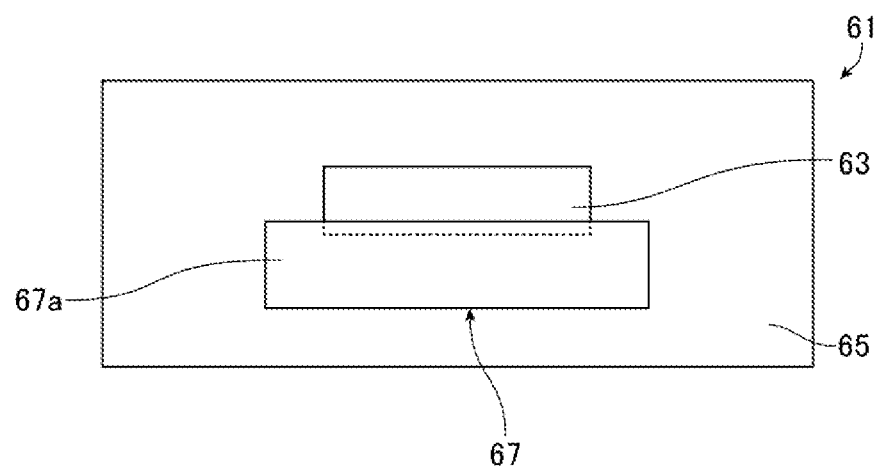
FIG. 14 is a front view schematically illustrating a second light source unit and a shade according a first modification of the first embodiment.

FIG. 14 is a front view schematically illustrating a second light source unit 61 and a shade 67 according the present modification. Unlike the upper edge of the embodiment, the upper edge of the light shielding portion 67a extends substantially in the horizontal direction. Such a light shielding portion 67a of the shade 67 shields a part of the second light from the light-emitting element 63.

Figure 15:
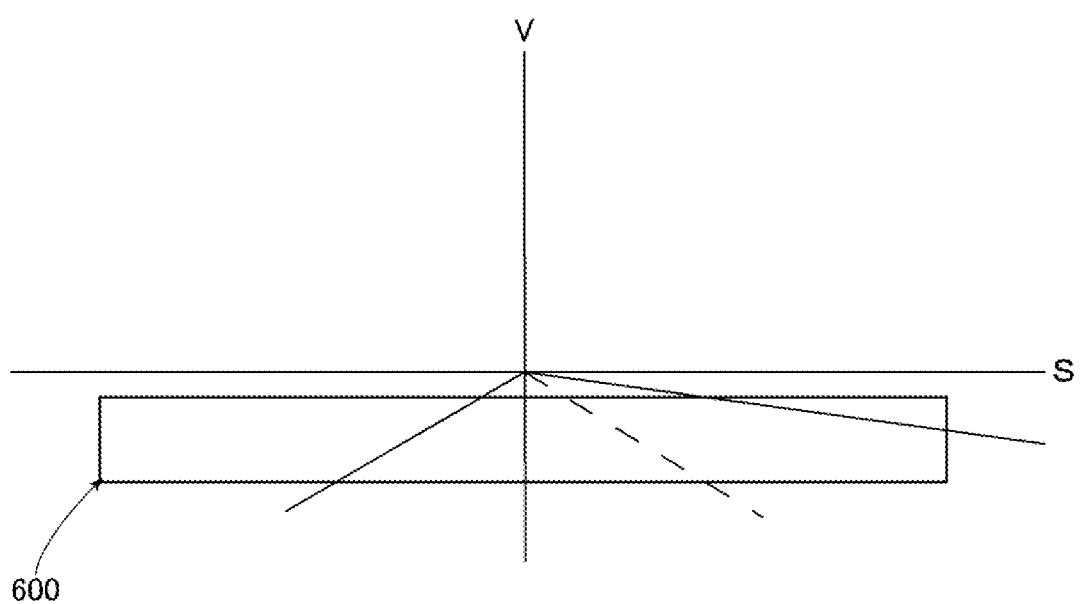
FIG. 15 is a view illustrating a second light distribution pattern formed by second light emitted from a second lamp of the first modification of the first embodiment.

FIG. 15 is a diagram illustrating a second light distribution pattern 600 of the present modification. The second light distribution pattern 600 has a rectangular shape elongated in the left-right direction and overlaps the vertical line V. The upper edge of the second light distribution pattern 600 corresponds to the shape of the upper edge of the light shielding portion 67a in the third lamp 80, is located below the horizontal line S, intersects with the vertical line V, and extends in the horizontal direction.

Figure 16:
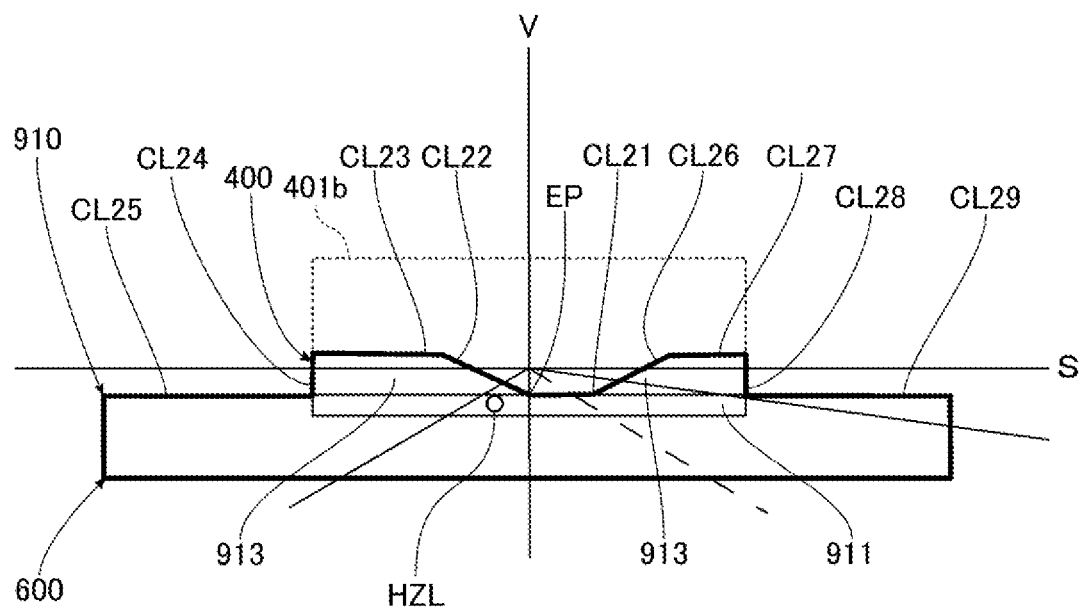
FIG. 16 is a diagram illustrating a light distribution pattern of a low-beam of the first modification of the first embodiment.

Next, a light distribution pattern 910 of a low-beam of the present modification will be described with reference to FIG. 16. FIG. 16 is a diagram illustrating the light distribution pattern 910 of a low-beam of the present modification. The relative positions of the light distribution patterns 400 and 600 of the light distribution pattern 910 of the present modification are different from the relative positions of the light distribution patterns 400 and 600 of the light distribution pattern 910 of the embodiment, and will be described below.

The light distribution pattern 910 includes cutoff lines CL21 to CL29 at the upper edge. The cutoff line CL21 extends in the horizontal direction from the elbow point EP to the right side which is one side in the left-right direction. The cutoff line CL22 extends obliquely upward from the elbow point EP to the left side which is the other side in the left-right direction. An end of the cutoff line CL22 opposite to the elbow point EP side is located above the horizontal line S. The cutoff line CL23 extends in the horizontal direction from an end of the cutoff line CL22 opposite to the elbow point EP side to the other side in the left-right direction. The cutoff line CL23 is located above the horizontal line S. The cutoff line CL24 extends downward along the vertical line V from an end of the cutoff line CL23 opposite to the cutoff line CL22 side. An end of the cutoff line CL24 opposite to the cutoff line CL23 side is located below the horizontal line S. The cutoff line CL25 extends in the horizontal direction from an end of the cutoff line CL24 opposite to the cutoff line CL23 side to the other side in the left-right direction. The cutoff line CL25 is located at substantially the same height position as the cutoff line CL21.

The cutoff line CL26 extends obliquely upward from an end of the cutoff line CL21 opposite to the elbow point EP side to one side in the left-right direction. An end of the cutoff line CL26 opposite to the cutoff line CL21 side is located above the horizontal line S and is located at substantially the same height position as the cutoff line CL23. The cutoff line CL27 extends in the horizontal direction from an end of the cutoff line CL26 opposite to the cutoff line CL21 side to one side in the left-right direction. The cutoff line CL27 is located above the horizontal line S. The cutoff line CL28 extends downward along the direction of the vertical line V from an end of the cutoff line CL27 opposite to the cutoff line CL26 side. An end of the cutoff line CL28 opposite to the cutoff line CL27 side is located below the horizontal line S. The cutoff line CL29 extends in the horizontal direction from an end of the cutoff line CL28 opposite to the cutoff line CL27 side to one side in the left-right direction. The cutoff line CL29 is located at substantially the same height position as the cutoff line CL21.

In the light distribution pattern 910 as described above, the cutoff lines CL21 to CL23, CL26, and CL27 of the light distribution pattern 910 are upper edges of the first light distribution pattern 400. Further, the cutoff line CL24 is a part of the left edge of the first light distribution pattern 400, and the cutoff line CL28 is a part of the right edge of the first light distribution pattern 400. The cutoff line CL25 is an upper edge of the second light distribution pattern 600 extending to the left side of the left edge of the first light distribution pattern 400 in the horizontal direction. Further, the cutoff line CL29 is an upper edge of the second light distribution pattern 600 extending to the right side of the right edge of the first light distribution pattern 400 in the horizontal direction. The control unit 110 controls the power to be supplied to each light-emitting element 43 so that the upper edge of the first light distribution pattern 400 becomes the cutoff lines CL21 to CL23, CL26, and CL27, a part of the left edge becomes the cutoff line CL24, and a part of the right edge becomes the cutoff line CL28. Therefore, similarly to the light distribution pattern 910 of the embodiment, the first light distribution pattern 400 of the light distribution pattern 910 of the present modification is formed by the first light emitted from not all the light-emitting elements 43 of the first lamp 40 but a part of the light-emitting elements 43.

Further, the left edge, the right edge, and the lower edge of the light distribution pattern 910 are the left edge, the right edge, and the lower edge of the second light distribution pattern 600, similarly to the light distribution pattern 910 of the embodiment. Therefore, in the left-right direction, the second light distribution pattern 600 is made longer than the first light distribution pattern 400. The left edge of the second light distribution pattern 600 is located on the left side of the left edge of the first light distribution pattern 400, and the right edge of the second light distribution pattern 600 is located on the right side of the right edge of the first light distribution pattern 400. Further, in the up-down direction, the upper edge of the second light distribution pattern 600 crosses between the upper edge and the lower edge of the first light distribution pattern 400.

The light distribution pattern 910 includes the regions 911 and 913 similarly to the light distribution pattern 910 of the embodiment. Unlike the embodiment, the region 911 is smaller than the region 913. The region 913 is located above the region 911 adjacent to the region 911.

The number of regions 913 is two. One region 913 is surrounded by the cutoff lines CL22 to CL24 on the left side of the vertical line V and a part of the upper edge of the second light distribution pattern 600 located inside the first light distribution pattern 400. The other region 913 is surrounded by the cutoff lines CL26 to CL28 on the right side of the vertical line V and another part of the upper edge of the second light distribution pattern 600 located inside the first light distribution pattern 400. The respective regions 913 are located apart in the left-right direction.

When temperature derating is performed on the first light source unit 41 in a state where the light distribution pattern 910 of a low-beam is formed, the control unit 110 controls the light-emitting elements 43 and 63 similarly to the light-emitting elements 43 and 63 in the embodiment. Therefore, the description of control of the light-emitting elements 43 and 63 is omitted.

Figure 17:
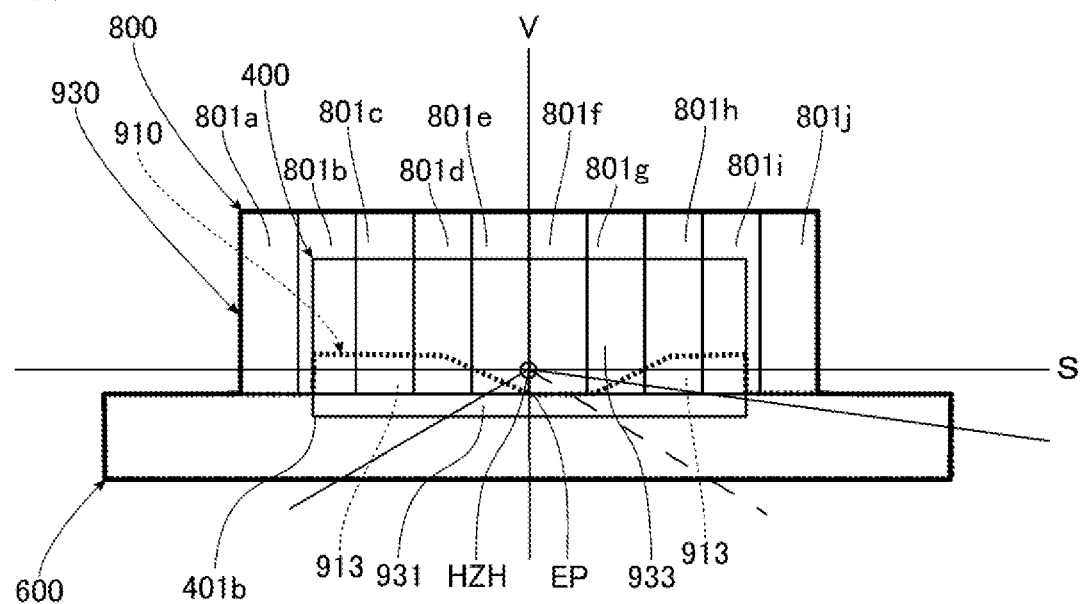
FIG. 17 is a diagram illustrating a light distribution pattern of a high-beam of the first modification of the first embodiment.

Next, the light distribution pattern 930 of a high-beam of the present modification will be described with reference to FIG. 17. FIG. 17 is a diagram illustrating the light distribution pattern 930 of a high-beam of the present modification. In FIG. 17, the light distribution pattern 910 is indicated by a thick line, and the light distribution pattern 910 of a low-beam illustrated in FIG. 16 is indicated by a broken line.

The relative positions of the light distribution patterns 400, 600, and 800 of the light distribution pattern 930 of the present modification are different from the relative positions of the light distribution patterns 400, 600, and 800 of the light distribution pattern 930 of the embodiment, and will be described below.

The third light distribution pattern 800 and the second light distribution pattern 600 are arranged without a gap in the up-down direction. Further, the lower edge of the third light distribution pattern 800 is in contact with the upper edge of the second light distribution pattern 600, and the third light distribution pattern 800 does not overlap the second light distribution pattern 600 and is located outside the second light distribution pattern 600 above the height position of the upper edge of the second light distribution pattern 600.

The upper edge of the second light distribution pattern 600 crosses between the upper edge and the lower edge of the first light distribution pattern 400.

In the light distribution pattern 930 of the present modification, the upper edge of the light distribution pattern 930 is a part of the upper edge that is not in contact with the lower edge of the third light distribution pattern 800, among the upper edges of the second light distribution pattern 600. Further, the upper edge of the light distribution pattern 930 is another part of the upper edge that is not in contact with the upper edge of the third light distribution pattern 800, among the left edge, the upper edge, and the right edge of the third light distribution pattern 800, and the upper edge of the second light distribution pattern 600. Further, the left edge, the right edge, and the lower edge of the light distribution pattern 930 of the present modification are the left edge, the right edge, and the lower edge of the second light distribution pattern 600, similarly to the light distribution pattern 930 of the embodiment.

The light distribution pattern 930 includes the regions 931 and 933 similarly to the light distribution pattern 930 of the embodiment. The embodiment is different, and the first light distribution pattern 400 overlaps only the third light distribution pattern 800 in the region 933. Therefore, in the light distribution pattern 930, the region 931 is irradiated with the first light and the second light, and the region 933 is irradiated with the first light and the third light. As described above, in the light distribution pattern 930 of the present modification, the region where the light distribution patterns 400, 600, and 800 overlap is not formed.

The hot zone HZH, which is the region having the highest intensity of light in the light distribution pattern 930, is located on or near the intersection of the horizontal line S and the vertical line V in the region 933. The light amounts of the first and third lights emitted from the light-emitting elements 43, and 83*a* to 83*j* are adjusted by the control unit 110 such that the intensity of the light in the light distribution pattern 930 decreases as the distance from the hot zone HZH increases, for example.

When the control unit 110 performs temperature derating on the first light source unit 41 in a state where the light distribution pattern 930 of a high-beam is formed, the control unit 110 controls the light-emitting elements 43, 63, and 83*a* to 83*j* similarly to the light-emitting elements 43, 63, and 83*a* to 83*j* in the embodiment. Therefore, the description of control of the light-emitting elements 43, 63, and 83*a* to 83*j* is omitted.

Next, a second modification of the second lamp 60 will be described in detail. Note that configurations similar to those described above are denoted by the same reference numerals, and redundant description is omitted unless otherwise specified.

Figure 18:
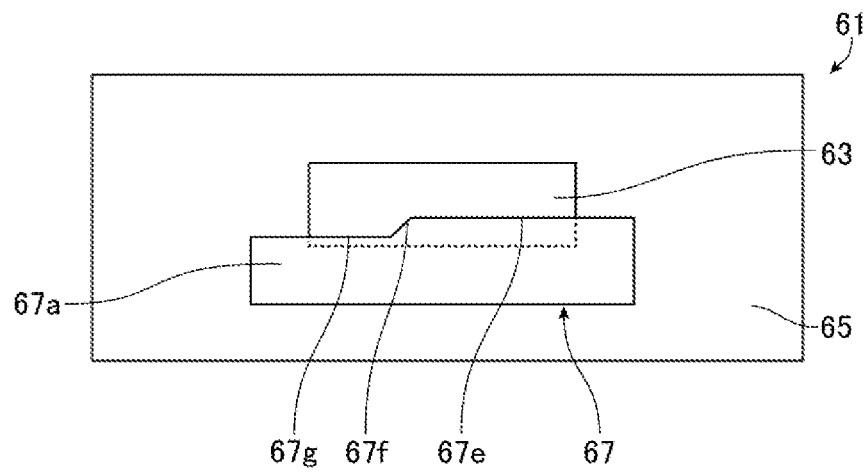
FIG. 18 is a front view schematically illustrating a second light source unit and a shade according a second modification of the first embodiment.

FIG. 18 is a front view schematically illustrating the second light source unit 61 and the shade 67 according the present modification. Unlike the upper edge of the first modification, the upper edge of the light shielding portion 67*a* includes a first edge 67*e*, a second edge 67*f*, and a third edge 67*g*. The first edge 67*e* extends substantially in the horizontal direction. The second edge 67*f* linearly extends from an end on one side of the first edge 67*e* toward the side opposite to the first edge 67*e* and downward. The third edge 67*g* extends in the substantially horizontal direction from the end of the second edge 67*f* opposite to the first edge 67*e* side toward the side opposite to the first edge 67*e*. Such a light shielding portion 67*a* of the shade 67 shields a part of the second light from the light-emitting element 63.

Figure 19:
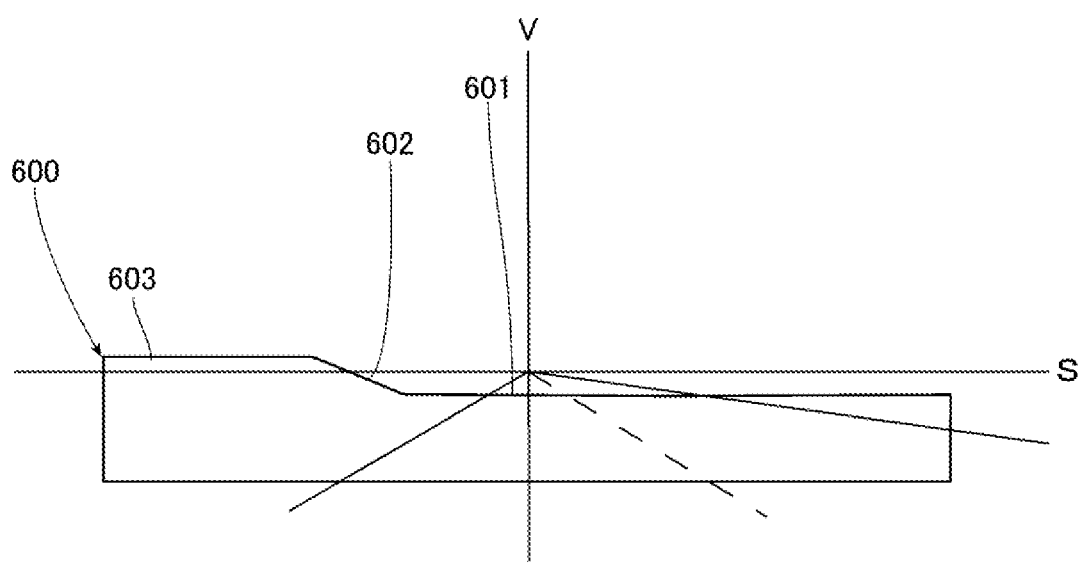
FIG. 19 is a view illustrating a second light distribution pattern formed by second light emitted from a second lamp of the second modification of the first embodiment.

FIG. 19 is a diagram illustrating the second light distribution pattern 600 of the present modification. The second light distribution pattern 600 overlaps the vertical line V. The upper edge of the second light distribution pattern 600 corresponds to the shape of the upper edge of the light shielding portion 67*a* in the third lamp 80, and includes a first edge 601, a second edge 602, and a third edge 603. The first edge 601 is located below the horizontal line S and horizontally extends from the vertical line V to the right side which is one side in the horizontal direction and to the left side which is the other side in the horizontal direction. A part of the first edge 601 extending from the vertical line V to one side in the horizontal direction is longer than the other part of the first edge 601 extending from the vertical line V to the other side in the horizontal direction.

Figure 20:
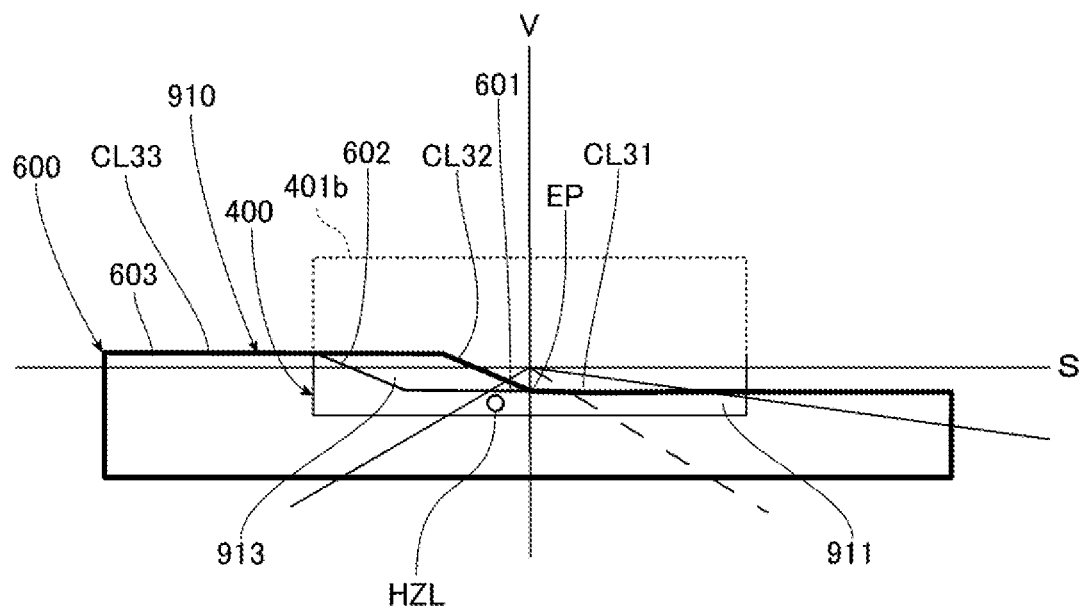
FIG. 20 is a view illustrating a light distribution pattern of a low-beam of the second modification of the first embodiment.

Next, the light distribution pattern 910 of a low-beam of the present modification will be described with reference to FIG. 20. FIG. 20 is a diagram illustrating the light distribution pattern 910 of a low-beam of the present modification. In FIG. 20, S indicates a horizontal line, V indicates a vertical line passing through the center of the vehicle 10 in the left-right direction, and the light distribution pattern 910 formed on a virtual vertical screen disposed 25 m ahead of the vehicle 10 is indicated by a thick line.

The light distribution pattern 910 includes cutoff lines CL31 to CL33 at the upper edge. The cutoff line CL31 extends in the horizontal direction from the elbow point EP to the right side which is one side in the left-right direction. The cutoff line CL32 extends obliquely upward from the elbow point EP to the left side which is the other side in the left-right direction. An end of the cutoff line CL32 opposite to the elbow point EP side is located above the horizontal line S. The cutoff line CL33 extends in the horizontal direction from an end of the cutoff line CL32 opposite to the elbow point EP side to the other side in the left-right direction. The cutoff line CL33 is located above the horizontal line S.

In the light distribution pattern 910 as described above, the cutoff line CL31 of the light distribution pattern 910 is a part of the upper edge of the first light distribution pattern 400 and a part of the first edge 601 of the second light distribution pattern 600 extending to the right side of the right edge of the first light distribution pattern 400 in the horizontal direction. The cutoff line CL32 is another part of the upper edge of the first light distribution pattern 400. The cutoff line CL33 is the remaining part of the upper edge of the first light distribution pattern 400 and the third edge 603 of the second light distribution pattern 600 extending to the left side of the left edge of the first light distribution pattern 400 in the horizontal direction. The control unit 110 controls the supply of power to the light-emitting element 43 so that the upper edge of the first light distribution pattern 400 becomes a part of the cutoff line CL31, the cutoff line CL32, and a part of the cutoff line CL33. Therefore, similarly to the light distribution pattern 910 of the first modification, the first light distribution pattern 400 of the light distribution pattern 910 of the present modification is formed by the first light emitted from not all the light-emitting elements 43 of the first lamp 40 but a part of the light-emitting elements 43.

Further, the left edge, the right edge, and the lower edge of the light distribution pattern 910 of the present modification are the left edge, the right edge, and the lower edge of the second light distribution pattern 600, similarly to the light distribution pattern 910 of the first modification. Further, similarly to the light distribution pattern 910 of the first modification, in the up-down direction, the lower edge of the first light distribution pattern 400 is located between the upper edge and the lower edge of the second light distribution pattern 600.

The light distribution pattern 910 includes the regions 911 and 913 similarly to the light distribution pattern 910 of the first modification. Similarly to the embodiment, the region 911 is larger than the region 913.

The region 913 is surrounded by the cutoff line CL32, a part of the cutoff line CL33, a part of the first edge 601, and the second edge 602 on the left side of the vertical line V.

When temperature derating is performed on the first light source unit 41 in a state where the light distribution pattern 910 of a low-beam is formed, the control unit 110 controls the light-emitting elements 43 and 63 similarly to the light-emitting elements 43 and 63 in the embodiment. Therefore, the description of control of the light-emitting elements 43 and 63 is omitted.

Figure 21:
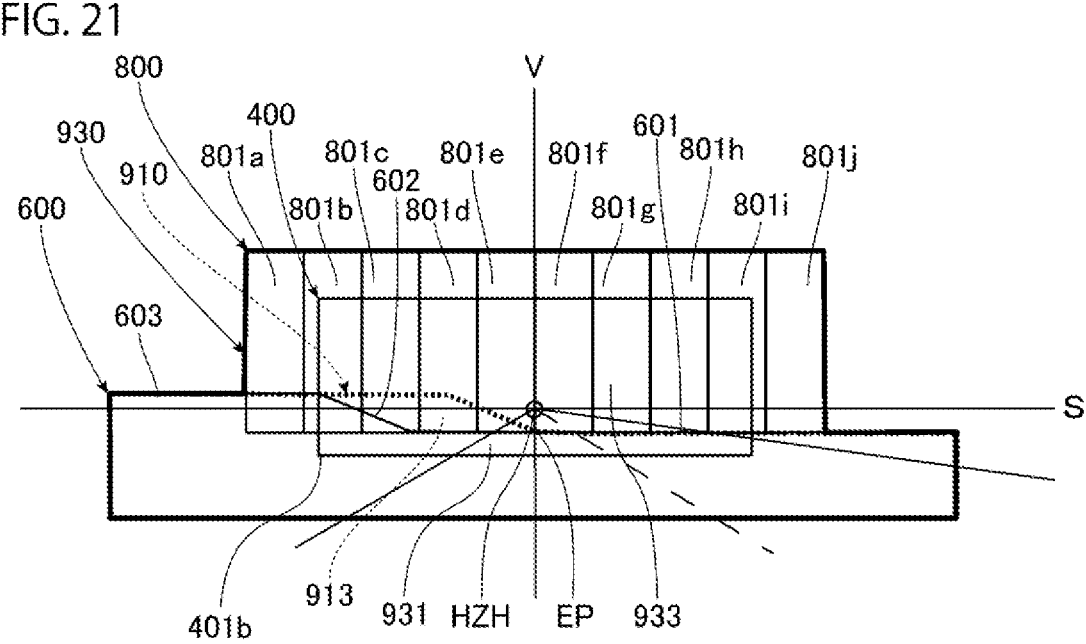
FIG. 21 is a view illustrating a light distribution pattern of a high-beam of the second modification of the first embodiment.

Next, the light distribution pattern 930 of a high-beam of the present modification will be described with reference to FIG. 21. FIG. 21 is a diagram illustrating the light distribution pattern 930 of a high-beam of the present modification. In FIG. 21, the light distribution pattern 910 is indicated by a thick line, and the light distribution pattern 910 of a low-beam illustrated in FIG. 20 is indicated by a broken line.

The relative positions of the light distribution patterns 400, 600, and 800 of the light distribution pattern 930 of the present modification are different from the relative positions of the light distribution patterns 400, 600, and 800 of the light distribution pattern 930 of the first modification, and will be described below.

In the left-right direction, the second light distribution pattern 600 is made longer than the third light distribution pattern 800. The left edge of the second light distribution pattern 600 is located on the left side of the left edge of the third light distribution pattern 800, and the right edge of the second light distribution pattern 600 is located on the right side of the right edge of the third light distribution pattern 800. The lower edge of the second light distribution pattern 600 is located below the lower edge of the third light distribution pattern 800. Among the upper edges of the second light distribution pattern 600, a part of the first edge 601 overlaps a part of the lower edge of the third light distribution pattern 800, and the other part of the first edge 601 is located outside the third light distribution pattern 800. Further, among the upper edges of the second light distribution pattern 600, the second edge 602 and the third edge 603 are located above the lower edge of the third light distribution pattern 800. The second edge 602 and a part of the third edge 603 are located inside the third light distribution pattern 800, and the other part of the third edge 603 is located outside the third light distribution pattern 800. Therefore, a part of the second light distribution pattern 600 overlaps with a part of the third light distribution pattern 800, and the other part of the second light distribution pattern 600 does not overlap with the third light distribution pattern 800 and is located outside the third light distribution pattern 800.

Among the upper edges of the second light distribution pattern 600, a part of the first edge 601 and the second edge 602 are located inside the first light distribution pattern 400. Further, among the upper edges of the second light distribution pattern 600, the third edge 603 and the other part of the first edge 601 are located outside the first light distribution pattern 400.

In the light distribution pattern 930 of the present modification, the upper edge of the light distribution pattern 930 is a part of the third edge 603 that is located outside the third light distribution pattern 800, among the upper edges of the second light distribution pattern 600. Further, the upper edge of the light distribution pattern 930 is a part of the left edge of the third light distribution pattern 800 located outside the second light distribution pattern 600, and the upper edge and the right edge of the third light distribution pattern 800. Further, the upper edge of the light distribution pattern 930 is a part of the first edge 601 that is located outside the third light distribution pattern 800, among the upper edges of the second light distribution pattern 600. The left edge, the right edge, and the lower edge of the light distribution pattern 930 are the left edge, the right edge, and the lower edge of the second light distribution pattern 600, similarly to the light distribution pattern 930 of the first modification.

The light distribution pattern 930 includes the regions 931 and 933 similarly to the light distribution pattern 930 of the first modification. The configurations of the regions 931 and 933 are the same as the configurations of the regions 931 and 933 of the first modification.

When the control unit 110 performs temperature derating on the first light source unit 41 in a state where the light distribution pattern 930 of a high-beam is formed, the control unit 110 controls the light-emitting elements 43, 63, and 83a to 83j similarly to the light-emitting elements 43, 63, and 83a to 83j in the embodiment. Therefore, the description of control of the light-emitting elements 43, 63, and 83a to 83j is omitted.

As described above, the first aspect of the present invention has been described by taking the first embodiment and the modifications as examples, but the present aspect is not limited thereto.

The configuration of the first lamp 40 is not particularly limited to the above. The configuration of the first lamp 40 may be, for example, a configuration in which light emitted from a light source is scanned using a micro electro mechanical system (MEMS), a galvanometer mirror, or the like and the light is emitted forward. The configuration of the first lamp 40 may be a configuration in which light emitted from a light source is diffracted using liquid crystal on silicon (LCOS), a diffraction grating, or the like to form a desired light distribution pattern and the light is emitted forward.

Note that the configurations of the second lamp 60 and the third lamp 80 are not particularly limited, and may be the same as the configurations of other lamps. Therefore, the second light source unit 61 may be a microLED array like the first light source unit 41, or may be an LED array like the third light source unit 81. Also, the third light source unit 81 may be a microLED array like the first light source unit 41. The first lamp 40 and the third lamp 80 may be, for example, parabolic lamps or direct lens lamps.

One of the region 911 and the region 913 may have the same size as the other or may be smaller than the other.

The light distribution pattern 930 may include only the region 933.

In the light distribution pattern 930, the first edge 601 of the second light distribution pattern 600 may be in contact with a part of the lower edge of the third light distribution pattern 800, or may be located above or below a part of the lower edge of the third light distribution pattern 800 while crossing the first light distribution pattern 400.

In the light distribution pattern 930, the lower edge of the first light distribution pattern 400 may be in contact with a part of the lower edge of the third light distribution pattern 800, may overlap the lower edge of the third light distribution pattern 800, or may be located above the lower edge of the third light distribution pattern 800.

In the light distribution pattern 930, the upper edge of the first light distribution pattern 400 may be in contact with the upper edge of the third light distribution pattern 800, may overlap the upper edge of the third light distribution pattern 800, or may be located above the upper edge of the third light distribution pattern 800.

In the light distribution pattern 930 of the first modification, the lower edge of the third light distribution pattern 800 may overlap the lower edge of the second light distribution pattern 600 or may be located below the lower edge of the second light distribution pattern 600. In the light distribution pattern 930 of the embodiment and the second modification, a part of the lower edge of the third light distribution pattern 800 may be in contact with the first edge 601 of the second light distribution pattern 600, and the lower edge of the third light distribution pattern 800 may be located above or below the first edge 601.

Further, in the light distribution pattern 930, a gap may be formed between the third light distribution pattern 800 and the second light distribution pattern 600 in the up-down direction. In this case, the first light distribution pattern 400 may be formed so as to overlap the gap, the third light distribution pattern 800, and the second light distribution pattern 600.

Second Embodiment

A second embodiment as a second aspect of the present invention will be described. Note that the same or equivalent components as those of the first embodiment are denoted by the same reference numerals and redundant description is omitted unless otherwise specified.

In each of the pair of lamp units 30, three lamps 40, 60, and 80 are provided in the first embodiment, but in the present embodiment, only the first lamp 40 is provided, and the configuration of the first light source unit 41 of the first lamp 40 is different from that of the first embodiment. The first lamp 40 of the present embodiment emits a low-beam or a high-beam to the front of the vehicle 10.

Figure 22:
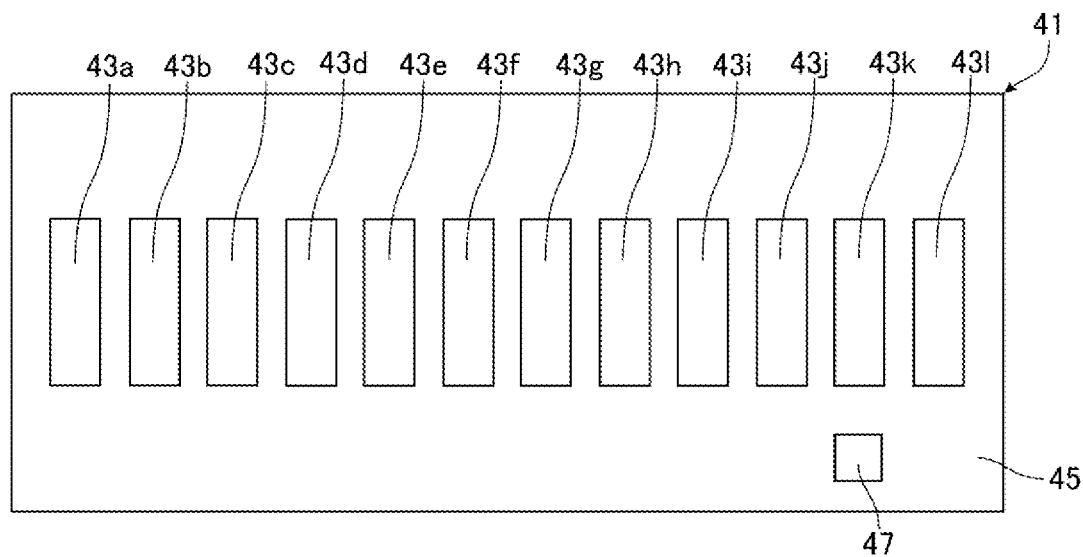
FIG. 22 is a front view schematically illustrating a light source unit and a temperature sensor according to a second embodiment as the second aspect of the present invention.

FIG. 22 is a front view schematically illustrating the first light source unit 41 and the temperature sensor 47 of the present embodiment. In FIG. 22, the light-emitting elements 43 in the first light source unit 41 are illustrated as light-emitting elements 43a to 43l, respectively. The light-emitting elements 43a to 43l have the same configuration as the light-emitting elements 83a to 83j of the third lamp 80 of the first embodiment, and are arrayed in a row in the left-right direction, and are a so-called LED array. The emission surface of each of the light-emitting elements 43a to 43l emits, for example, white light and has a substantially rectangular shape elongated in the up-down direction.

The control unit 110 supplies power or stops the supply of power to each of the light-emitting elements 43a to 43l via the power supply unit and the circuit board 45. As a result, the light-emitting elements 43a to 43l that emit light are selected, and the size and shape of the light distribution pattern formed by the light emitted from the first light source unit 41 change according to the selection. Furthermore, the control unit 110 adjusts power supplied to the light-emitting elements 43a to 43l. For example, the control unit 110 may adjust the power by pulse width modulation (PWM) control. In this case, the control unit 110 adjusts the power to be supplied to each of the light-emitting elements 43a to 43l by adjusting the duty ratio of each of the light-emitting elements 43a to 43l, and adjusts the light emission amount of each of the light-emitting elements 43a to 43l by adjusting the power. As the duty ratio increases, the power applied to the light-emitting element 43 increases. By adjusting the light emission amount, the intensity distribution of light in the light distribution pattern formed by the light emitted from the first light source unit 41 is adjusted. Note that the control unit 110 may adjust the light emission amount of each of the light-emitting elements 43a to 43l by adjusting the current supplied to each of the light-emitting elements 43b to 43l.

Figure 23:
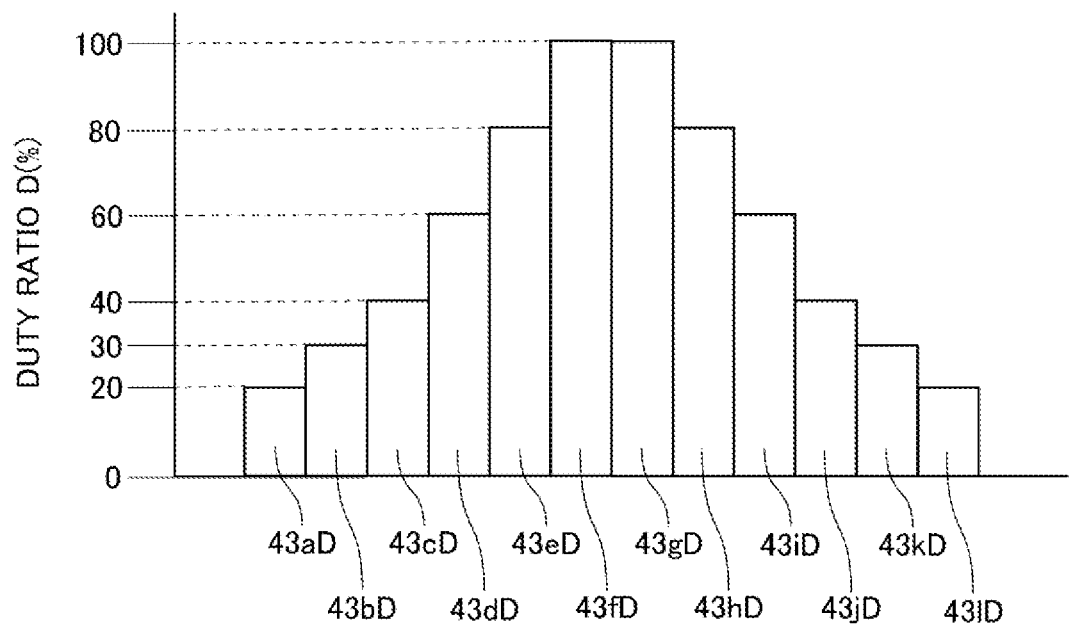
FIG. 23 is a view illustrating an example of a duty ratio of each light-emitting element in a state where the vehicle travels straight.

Next, the duty ratios 43aD to 43lD of the light-emitting elements 43a to 43l when the vehicular headlight 20 emits a high-beam in a state where the steering angle is equal to or less than the reference angle will be described. The reference angle is, for example, 5°, and in this case, the vehicle 10 is in a straight traveling state. FIG. 23 is a diagram illustrating an example of the duty ratios 43aD to 43lD in a state where the vehicle 10 travels straight, and in FIG. 23, values of the duty ratios 43aD to 43lD are represented by heights of rectangles illustrated in FIG. 23. The duty ratios 43aD to 43lD illustrated in FIG. 23 are duty ratios in a case where temperature derating is not performed.

In the present embodiment, the control unit 110 sequentially sets the duty ratios 43aD to 43lD of the light-emitting elements 43a to 43f to 20%, 30%, 40%, 60%, 80%, and 100%. Further, the control unit 110 sequentially sets the duty ratios 43lD to 43gD of the light-emitting elements 43l to 43g to 20%, 30%, 40%, 60%, 80%, and 100% similarly to the above description. The values of the duty ratios 43aD to 43lD are recorded in the recording unit 130, and the control unit 110 reads the values from the recording unit 130 and controls the duty ratios 43aD to 43lD as described above. The value of the duty ratio is not particularly limited.

When the control unit 110 controls the duty ratios 43aD to 43lD as described above, the light emission amounts of the light-emitting elements 43f and 43g located on the center side in the left-right direction become the largest. In addition, the light emission amount decreases in the order from the light-emitting element 43f to the light-emitting element 43a and in the order from the light-emitting element 43g to the light-emitting element 43l. In the light-emitting elements 43a to 43l, the light emission amount is the same as long as the duty ratio is the same, and thus the light emission amount is symmetrical between the left and right light-emitting elements with respect to the light-emitting elements 43f and 43g. As a result, the hot zone, which is the region having the highest light intensity in the light distribution pattern of a high-beam, is located substantially at the center of the light distribution pattern of the high-beam in the left-right direction.

Each of the light-emitting elements 43a to 43l generates heat when emitting light at the above-described duty ratio. The temperature of the first light source unit 41 associated with the heat generation of each of the light-emitting elements 43a to 43l is estimated by the temperature sensor 47 as described above, and the temperature sensor 47 outputs a temperature signal to the control unit 110. The control unit 110 performs temperature derating on each of the light-emitting elements 43a to 43l based on the temperature signal.

Figure 24:
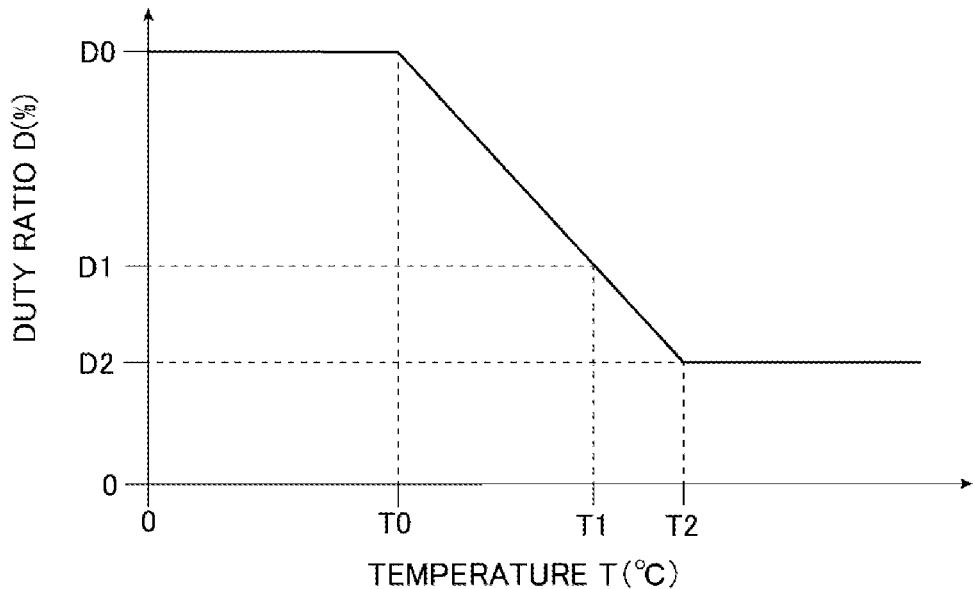
FIG. 24 is a diagram illustrating a relationship between a temperature and a duty ratio of the light source unit.

Next, temperature derating in the first light source unit 41 according to the present embodiment will be described. FIG. 24 is a diagram illustrating a relationship between the temperature T (° C.) of the first light source unit 41 estimated by the temperature sensor 47 and the duty ratio D (%) of the light-emitting element 43. In FIG. 24, the horizontal axis represents the temperature T, and the vertical axis represents the duty ratio D. In FIG. 24, the temperatures T0, T1, and T2 are, for example, 80° C., 110° C., and 120° C. The temperature T0 is a temperature at which the control unit 110 starts temperature derating. When the temperature T is lower than the temperature T0, the temperature derating is not performed, and when the temperature T is equal to or higher than the temperature T0, the temperature derating is performed. The duty ratio D0 corresponding to a temperature lower than the temperature T0 is set to 100%, and the duty ratios D1 and D2 corresponding to the temperatures T1 and T2 are set to, for example, 50% and 30%. In the duty ratio D2, the decrease amount of the duty ratio in a case where the temperature derating is performed is maximized. The relationship between the temperature T and the duty ratio D, the values of the temperatures T0, T1, and T2, and the values of the duty ratios D1 and D2 are recorded in the recording unit 130. Note that these values are not particularly limited.

when temperature derating is performed on the first light source unit 41, the control unit 110 sets the duty ratio D serving as a reference according to the temperature equal to or higher than the temperature T0. For example, when the temperature T is the temperature T1, the control unit 110 sets the duty ratio D serving as a reference to the duty ratio D1. When the temperature T is equal to or higher than the temperature T2, the control unit 110 sets the duty ratio D as a reference to the duty ratio D2 in order to avoid turning off the light. In the temperature derating of the present embodiment, when the temperature T is equal to or higher than the temperature T0, the control unit 110 lowers at least a part of the duty ratio higher than the duty ratio D as a reference corresponding to the temperature T among the duty ratios 43aD to 43lD. When the duty ratio decreases, the light emission amount and the heat generation amount of each light-emitting element 43 decreases, and the temperature of the first light source unit 41 decreases. The control unit 110 performs the temperature derating as described above based on the duty ratio, but may perform the temperature derating based on the current flowing through each of the light-emitting elements 43b to 43l. Therefore, the control unit 110 may perform temperature derating based on the power supplied to each of the light-emitting elements 43b to 43l.

Next, an operation of the vehicular headlight 20 of the present embodiment will be described.

Figure 25:
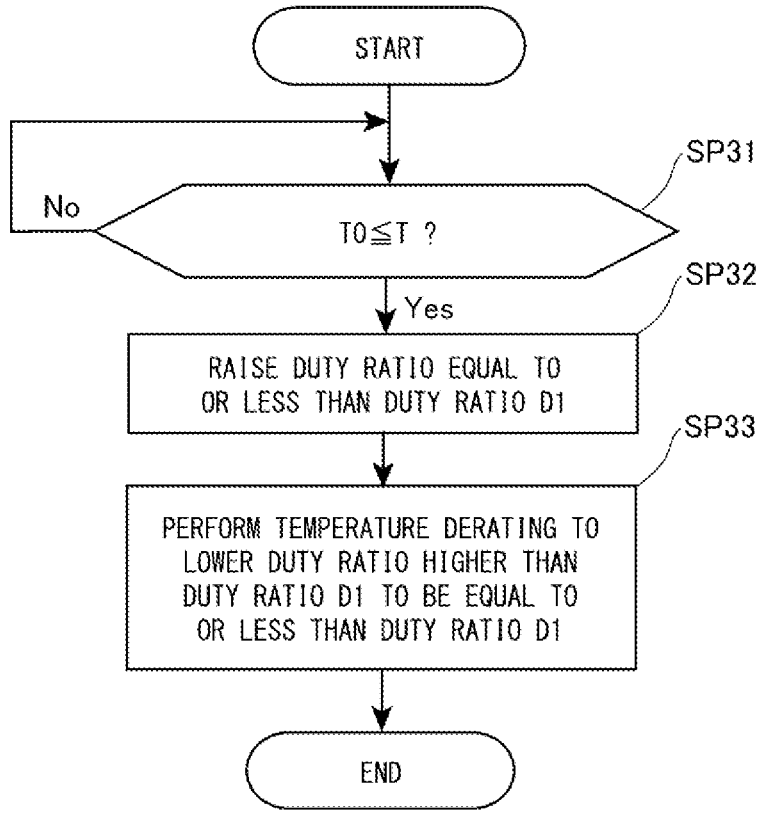
FIG. 25 is a diagram illustrating an example of a control flowchart of a control unit according to the second embodiment.

FIG. 25 is a diagram illustrating an example of a control flowchart of the control unit 110 according to the present embodiment. As illustrated in FIG. 25, the control flow of the present embodiment includes steps SP31 to SP33. Note that the control flow is not limited thereto. In the starting state illustrated in FIG. 25, it is assumed that the vehicle 10 travels straight and a light distribution pattern of a high-beam is formed. The duty ratios 43aD to 43lD of the light-emitting elements 43a to 43l are as illustrated in FIG. 23. Further, in the start state, it is assumed that the temperature sensor 47 estimates the temperature of the first light source unit 41, and the temperature signal is input to the control unit 110.

(Step SP31)

In this step, if the temperature T indicated by the temperature signal from the temperature sensor 47 is lower than the temperature TO, the control unit 110 repeats the step SP31. Further, if the temperature T is equal to or higher than the temperature TO, the control unit 110 advances the control flow to step SP32.

When the temperature T is equal to or higher than the temperature TO, the control unit 110 performs temperature derating on the first light source unit 41. when temperature derating is performed on the first light source unit 41, the control unit 110 controls the duty ratio of the light-emitting element 43 based on the duty ratio corresponding to the temperature T. Such control of the duty ratio will be described using the temperature T in step SP31 being, for example, the temperature T1, and the duty ratio D1 corresponding to the temperature T1 as an example of the duty ratio serving as a reference in temperature derating, in steps SP32 and SP33.

(Step SP32)

Figure 26:
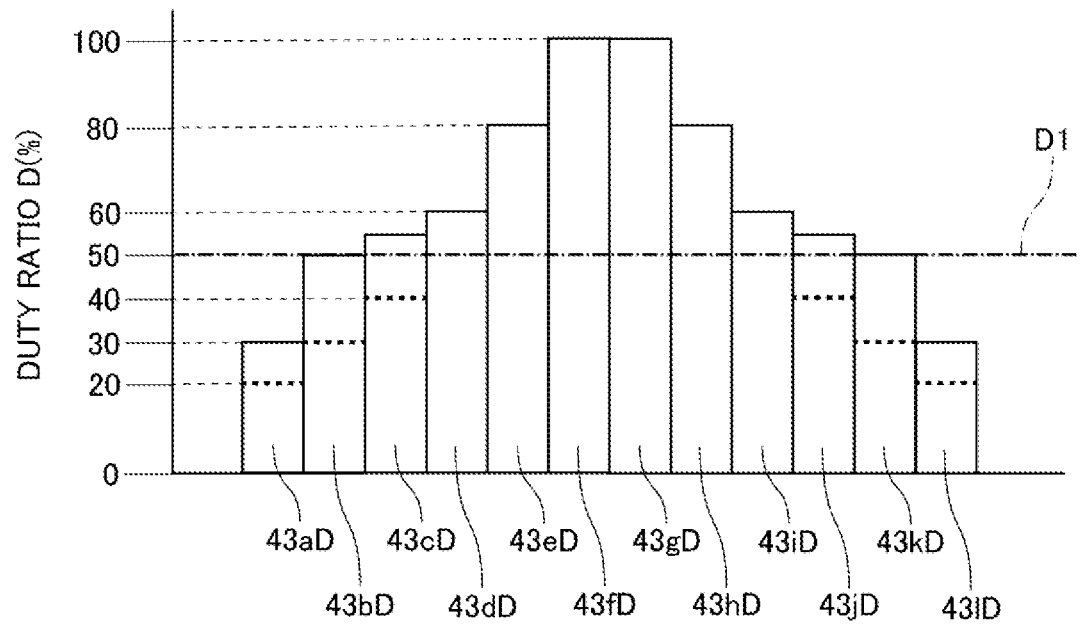
FIG. 26 is a view illustrating an example of a duty ratio of each light-emitting element in step SP32 in a state where the vehicle travels straight.

In this step, before the temperature derating, the control unit 110 increases the duty ratio of at least a part of the light-emitting elements 43 driven at the duty ratio equal to or less than the duty ratio D1. FIG. 26 is a diagram illustrating an example of the duty ratio 43aD to 43lD in this step. In FIG. 26, in order to compare with the duty ratio 43aD to 43lD illustrated in FIG. 23, a portion of the duty ratio 43aD to 43lD illustrated in FIG. 23 before being increased is indicated by a broken line. Since the duty ratio D1 is 50%, the duty ratios equal to or less than the duty ratio D1 are duty ratios 43aD to 43cD and 43jD to 43lD of the light-emitting elements 43a to 43c and 43j to 43l. Therefore, for example, the control unit 110 increases the duty ratios 43aD to 43cD and 43jD to 43lD from the state illustrated in FIG. 23. In this step, for example, the control unit 110 increases the duty ratios 43aD and 43lD to duty ratios larger than the duty ratios 43aD and 43lD illustrated in FIG. 23 and smaller than the duty ratio D1. The control unit 110 increases the duty ratios 43bD and 43kD to the duty ratio D1, and increases the duty ratios 43cD and 43jD to be higher than the duty ratio D1. In this case, the control unit 110 sets the duty ratios 43aD and 43lD to 30%, the duty ratios 43bD and 43kD to 50%, and the duty ratios 43cD and 43jD to 55%, for example. When the duty ratios 43aD to 43cD and 43jD to 43lD increase, the light emission amount of the first light source unit 41 increases, and the light distribution pattern becomes bright.

The control unit 110 is only required to raise at least one of the duty ratios 43aD to 43cD and 43jD to 43lD as described above, and how to raise the duty ratios 43aD to 43cD and 43jD to 43lD is not limited to the above. For example, the control unit 110 may preferentially increase a duty ratio having a large difference from the duty ratio D1 among duty ratios equal to or less than the duty ratio D1 as described above over other duty ratios. Alternatively, the control unit 110 may preferentially increase the duty ratio having a small difference as described above over other duty ratios. Alternatively, the control unit 110 may increase the duty ratio having a large difference to be larger or smaller than the duty ratio having a small difference. Alternatively, the control unit 110 may increase a plurality of duty ratios equal to or less than the duty ratio D1 by the same amount. The control unit 110 may not increase any one of the duty ratios 43aD to 43cD and 43jD to 43lD.

When the light-emitting element 43 is driven at the duty ratio D1, the power supplied to the light-emitting element 43 is set to the first power. In this case, the second power larger than the first power is supplied to the light-emitting element 43 driven at the duty ratio larger than the duty ratio D1, and the third power equal to or less than the first power is supplied to the light-emitting element 43 driven at the duty ratio equal to or less than the duty ratio D1. In step SP32, the control unit 110 increases the power supplied to at least a part of the light-emitting elements 43a to 43c and 43j to 43l driven with the third power equal to or less than the first power.

In addition, in step SP32, in a case where the temperature derating is performed on the first light source unit 41, the control unit 110 increases the power supplied to at least a part of the light-emitting elements 43a to 43c and 43j to 43l to the first power or higher than the first power. In a case where the power increases to the first power, the light-emitting elements to be targeted in FIG. 26 are the light-emitting elements 43b and 43k, and the light distribution pattern becomes brighter than that in a case where the power does not increase to the first power, and a decrease in visibility in front can be reduced. In addition, in a case where the power increases to be higher than the first power, the light-emitting elements to be targeted in FIG. 26 are the light-emitting elements 43c and 43j, and the light distribution pattern becomes further brighter than that in a case where the power does not increase to the first power, and a decrease in visibility in front can be further reduced.

Note that, in step SP32, the control unit 110 may raise the power supplied to at least a part of the light-emitting elements 43a to 43c and 43j to 43l driven with the third power to be higher than the first power, and after a certain period of time has elapsed, lower the power supplied to the light-emitting elements to the first power or less. The value for the certain period of time is, for example, 5 minutes. In FIG. 26, target light-emitting elements in this case are the light-emitting elements 43c and 43j. If the power remains higher than the first power, the temperature of the first light source unit 41 increases. According to the above configuration, since the power decreases to the first power or less when a certain period of time elapses, the temperature of the first light source unit 41 decreases, and the temperature rise of the first light source unit 41 can be reduced. Note that the control unit 110 may not lower the power to the first power or less after a certain period of time has elapsed.

In addition, the fourth power is supplied to the light-emitting element 43 driven at a duty ratio that is smaller than the duty ratio D1 and is a duty ratio when the third power is supplied. The fourth power is a power smaller than the first power and larger than the third power. In a case where the temperature derating is performed on the first light source unit 41, the control unit 110 may raise the power supplied to at least a part of the light-emitting elements 43a to 43c and 43j to 43l to the fourth power larger than the third power and smaller than the first power in step SP32. In FIG. 26, target light-emitting elements in this case are the light-emitting elements 43a and 43l.

When the duty ratios 43aD to 43cD and 43jD to 43lD are increased, the control unit 110 advances the control flow to step SP33.

(Step SP33)

Figure 27:
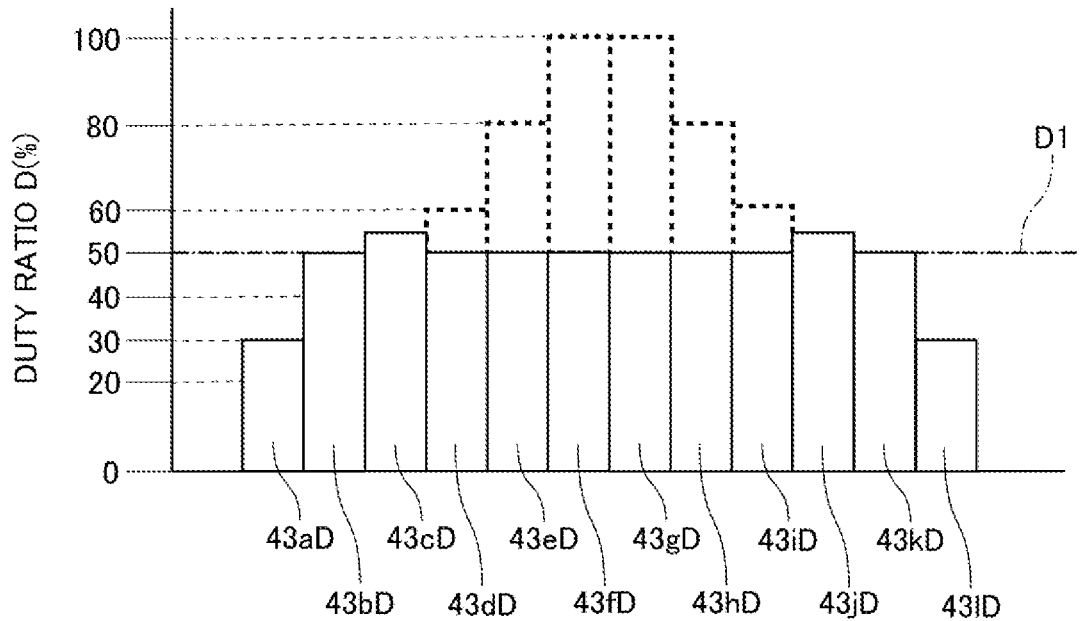
FIG. 27 is a view illustrating an example of a duty ratio of each light-emitting element in step SP33 in a state where the vehicle travels straight.

In this step, the control unit 110 performs temperature derating on the first light source unit 41. The control unit 110 performs the temperature derating, for example, one second after the end of the control of the duty ratio in step SP32, but may perform the temperature derating at the same time as the end of the control, and the timing of performing the temperature derating is not particularly limited. In the temperature derating, the control unit 110 lowers the duty ratio of at least a part of the light-emitting elements 43 driven at the duty ratio larger than the duty ratio D1 to the duty ratio D1 or less. FIG. 27 is a diagram illustrating an example of the duty ratios 43aD to 43lD in this step. In FIG. 27, in order to compare with the duty ratios 43aD to 43lD illustrated in FIG. 26, a portion of the duty ratios 43aD to 43lD illustrated in FIG. 26 before being decreased is indicated by a broken line. Since the duty ratio D1 is 50%, the duty ratios larger than the duty ratio D1 are the duty ratios 43cD to 43jD of the light-emitting elements 43c to 43j. Therefore, in this step, for example, the control unit 110 lowers the duty ratios 43dD to 43iD of the light-emitting elements 43d to 43i to the duty ratio D1 and sets the duty ratios to 50%. When the duty ratios 43dD to 43iD decrease, the light emission amount and the heat generation amount of the first light source unit 41 decrease, and the temperature of the first light source unit 41 decreases.

In this step, the duty ratio larger than the duty ratio D1 is set to the duty ratios 43cD to 43jD larger than the duty ratio D1 at the time point illustrated in FIG. 26, but the duty ratio is not limited to the above. For example, the duty ratio larger than the duty ratio D1 may be set to the duty ratios 43dD to 43iD larger than the duty ratio D1 at the start of the control flow. In this case, the control unit 110 maintains the duty ratios 43cD and 43jD illustrated in FIG. 27.

Further, the control unit 110 is only required to lower at least one of the duty ratios 43dD to 43iD as described above, and how to lower the duty ratios 43dD to 43iD is not limited to the above. For example, the control unit 110 may preferentially lower a duty ratio having a large difference from the duty ratio D1 among duty ratios larger than the duty ratio D1 as described above over other duty ratios. Alternatively, the control unit 110 may preferentially lower the duty ratio having a small difference as described above over other duty ratios. Alternatively, the control unit 110 may lower the duty ratio having a large difference to be larger or smaller than the duty ratio having a small difference. Alternatively, the control unit 110 may lower the plurality of duty ratios larger than the duty ratio D1 by the same amount. In addition, the control unit 110 may lower the duty ratio of at least a part of the light-emitting elements among the light-emitting elements 43f and 43g driven at the duty ratio that is largest than the duty ratio D1 to the duty ratio D1 or less.

As described above, the second power larger than the first power is supplied to the light-emitting elements 43 driven at the duty ratio larger than the duty ratio D1. In the light-emitting elements 43 to which the second power is supplied, in step SP33, the control unit 110 lowers the power supplied to at least a part of the light-emitting elements 43d to 43i driven with the second power larger than the first power from the second power to the first power or less.

Note that the control unit 110 may increase in advance the increase amount in the power supplied to at least a part of the light-emitting elements 43a to 43c and 43j to 43l driven with the third power in step SP32 as the decrease amount in the power supplied to at least a part of the light-emitting elements 43d to 43i driven with the second power in step SP33 increases. According to the above configuration, the light distribution pattern can be brighter as compared to a case in which the increase amount of the power is smaller as the decrease amount of the power is larger. Note that the control unit 110 may not increase the amount of increase in the power supplied to at least a part of the light-emitting elements 43a to 43c and 43j to 43l as the amount of decrease in the power supplied to at least a part of the light-emitting elements 43d to 43i is larger.

When the duty ratios 43dD to 43iD are decreased, the control unit 110 ends the control flow.

As described above, in a case where the temperature derating is performed on the first light source unit 41, the control unit 110 lowers the power supplied to at least a part of the light-emitting elements 43d to 43i from the second power to the first power or less in step SP33. In addition, in a case where the temperature derating is performed on the first light source unit 41, in step SP32, the control unit 110 increases the power supplied to at least a part of the light-emitting elements 43a to 43c and 43j to 43l driven with the third power equal to or less than the first power.

According to the above configuration, when the control unit 110 performs the temperature derating on the first light source unit 41, the power of at least a part of light-emitting elements 43d to 43i driven by the second power decreases from the second power to the first power or less. Therefore, the first light source unit 41 is protected from heat from the light-emitting elements 43, but the light distribution pattern formed by the light emitted from the first light source unit 41 tends to be dark. Therefore, in the above configuration, when temperature derating is performed on the first light source unit 41, the control unit 110 increases the power supplied to at least a part of light-emitting elements 43a to 43c and 43j to 43l driven with the third power. As the power increases, the light distribution pattern can be brighter. Therefore, a decrease in visibility of the front can be reduced.

In addition, in a case where the temperature derating is performed on the first light source unit 41, before the power supplied to at least a part of the light-emitting elements 43d to 43i driven with the second power is lowered from the second power to the first power or less in step SP33, the control unit 110 increases the power supplied to at least a part of the light-emitting elements 43a to 43c and 43j to 43l in step SP32.

According to the above configuration, before the light distribution pattern becomes dark due to the power lowering from the second power to the first power or less, the light distribution pattern becomes bright due to the power rising from the third power. Therefore, as compared with the case where the light distribution pattern becomes bright after becoming dark, it is possible to reduce the light distribution pattern from becoming dark as compared with the case before the temperature derating is performed on the first light source unit 41, and it is possible to reduce the decrease in visibility.

Note that the control unit 110 may simultaneously perform step SP32 and step SP33. Therefore, the control unit 110 may lower the power supplied to at least a part of the light-emitting elements 43d to 43i driven with the second power from the second power to the first power or less, and simultaneously increase the power supplied to at least a part of the light-emitting elements 43a to 43c and 43j to 43l. Alternatively, the control unit 110 may advance the control flow in the order of step SP33 and step SP32. Therefore, the control unit may lower the power supplied to at least a part of the light-emitting elements 43d to 43i driven with the second power from the second power to the first power or less, and then increase the power supplied to at least a part of the light-emitting elements 43a to 43c and 43j to 43l. In this case, the control unit 110 may increase the power supplied to at least a part of the light-emitting elements 43a to 43c and 43j to 43l, for example, one second after the power is lowered to the first power or less, or at the same time when the power is lowered to the first power or less.

(First Modification)

Figure 28:
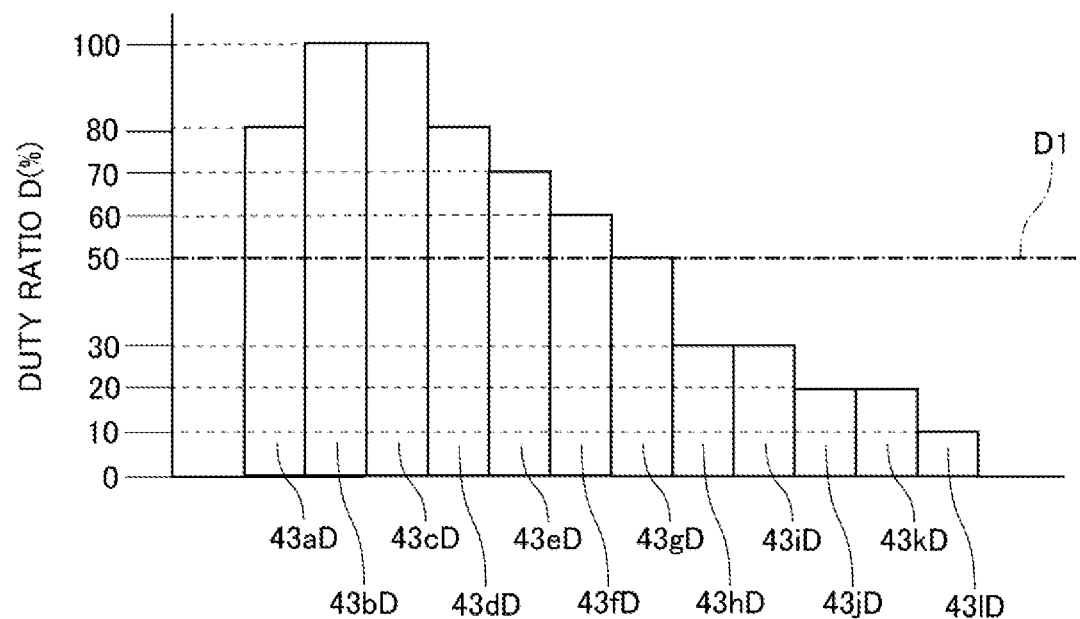
FIG. 28 is a diagram illustrating an example of a duty ratio of each light-emitting element in a state where the vehicle turns left.

Next, a first modification of the present embodiment will be described. In the above embodiment, the control of the duty ratios 43aD to 43lD of the light-emitting elements 43a to 43l when the vehicle 10 travels straight has been described. On the other hand, in the present modification, the control of the duty ratios 43aD to 43lD when the vehicle 10 turns is described. In the present modification, the description is made with an assumption that the steering angle exceeds the reference angle and changes to the steering angle to the left, and the vehicle 10 turns left. FIG. 28 is a diagram illustrating an example of duty ratios 43aD to 43lD in a state where the vehicle 10 turns left.

In the vehicular headlight 20 of the present modification, when the steering angle indicated by the signal input from the steering sensor to the control unit 110 is the left steering angle, the control unit 110 sets the duty ratios 43bD and 43cD of the light-emitting elements 43b and 43c to 100%. Further, the control unit 110 sets the duty ratios 43aD and 43dD of the light-emitting elements 43a and 43d to 80%, the duty ratio 43eD of the light-emitting element 43e to 70%, and the duty ratio 43fD of the light-emitting element 43f to 60%. In addition, the control unit 110 sets the duty ratio 43gD of the light-emitting element 43g to 50%, and sets the duty ratios 43hD and 43iD of the light-emitting elements 43h and 43i to 30%. Further, the control unit 110 sets the duty ratios 43jD and 43kD of the light-emitting elements 43j and 43k to 20%, and sets the duty ratio 43lD of the light-emitting element 43l to 10%. Also, in the present modification, the values of the duty ratios 43aD to 43lD are recorded in the recording unit 130, and the control unit 110 reads the values from the recording unit 130 and controls the duty ratios 43aD to 43lD as described above. The value of the duty ratio is not particularly limited.

When the control unit 110 controls the duty ratio 43aD to 43lD as described above, the hot zone in the light distribution pattern of the high-beam when the vehicle 10 turns left is shifted to the left side as compared with the case where the vehicle 10 travels straight. In addition, the intensity distribution of light in the light distribution pattern of the high-beam when the vehicle 10 turns left changes as compared with the case where the vehicle 10 travels straight such that the left region of the light distribution pattern of the high-beam is brighter than the right region.

By the way, even when the vehicle 10 turns left, the operation of the vehicular headlight 20 is the same as that in the above embodiment, the control flow includes steps SP31 to SP33, and the temperature derating is performed on the first light source unit 41.

Figure 29:
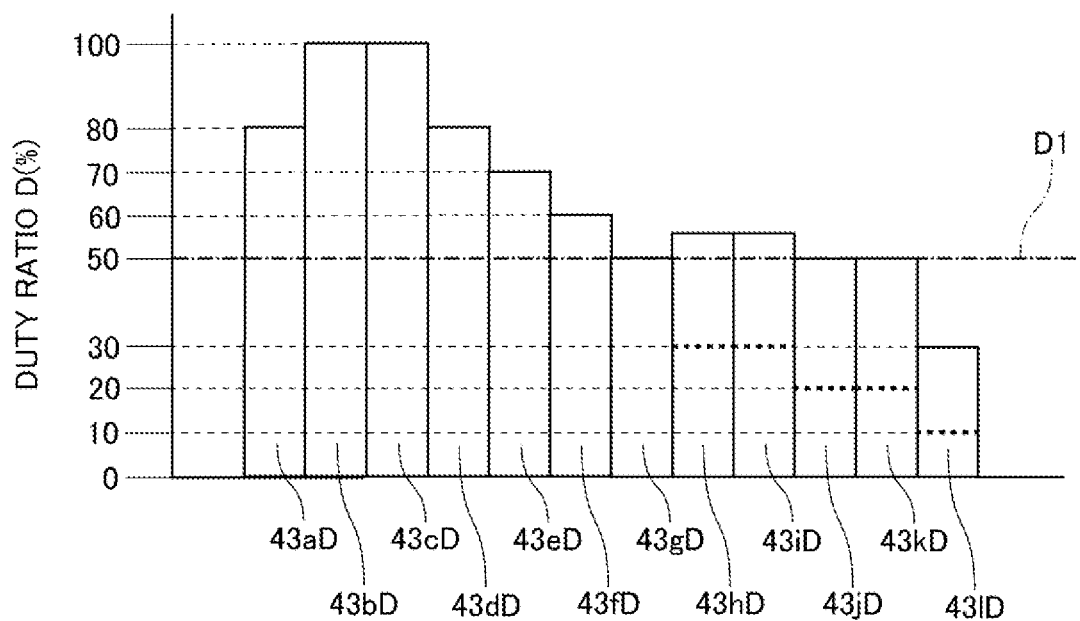
FIG. 29 is a view illustrating an example of a duty ratio of each light-emitting element in step SP32 in a state where the vehicle turns left.

FIG. 29 is a diagram illustrating an example of the duty ratios 43aD to 43lD in step SP32. In order to compare the duty ratios 43aD to 43lD in FIGS. 28 and 29, a portion before the duty ratio is increased in FIG. 28 is indicated by a broken line in FIG. 29. In the present modification, similarly to the above embodiment, the temperature T input from the temperature sensor 47 to the control unit 110 is the temperature T1, and the duty ratio D1 corresponding to the temperature T1 is described as an example of the duty ratio serving as a reference in temperature derating. In this step, the control unit 110 increases the duty ratios 43hD to 43lD of the light-emitting elements 43h to 43l from the state illustrated in FIG. 28. For example, the control unit 110 increases the duty ratios 43hD and 43iD to be higher than the duty ratio D1, and increases the duty ratios 43jD and 43kD to be the duty ratio D1. The control unit 110 increases the duty ratio 43lD to a duty ratio larger than the duty ratio 43lD illustrated in FIG. 28 and smaller than the duty ratio D1. In this case, the control unit 110 sets the duty ratios 43hD and 43iD to 55%, the duty ratios 43jD and 43kD to 50%, and the duty ratio 43lD to 30%, for example. When the duty ratios 43hD to 43lD increase, the light emission amount of the first light source unit 41 increases, and the light distribution pattern becomes bright.

When the duty ratios 43hD to 43lD are increased, the control unit 110 advances the control flow to step SP33.

Figure 30:
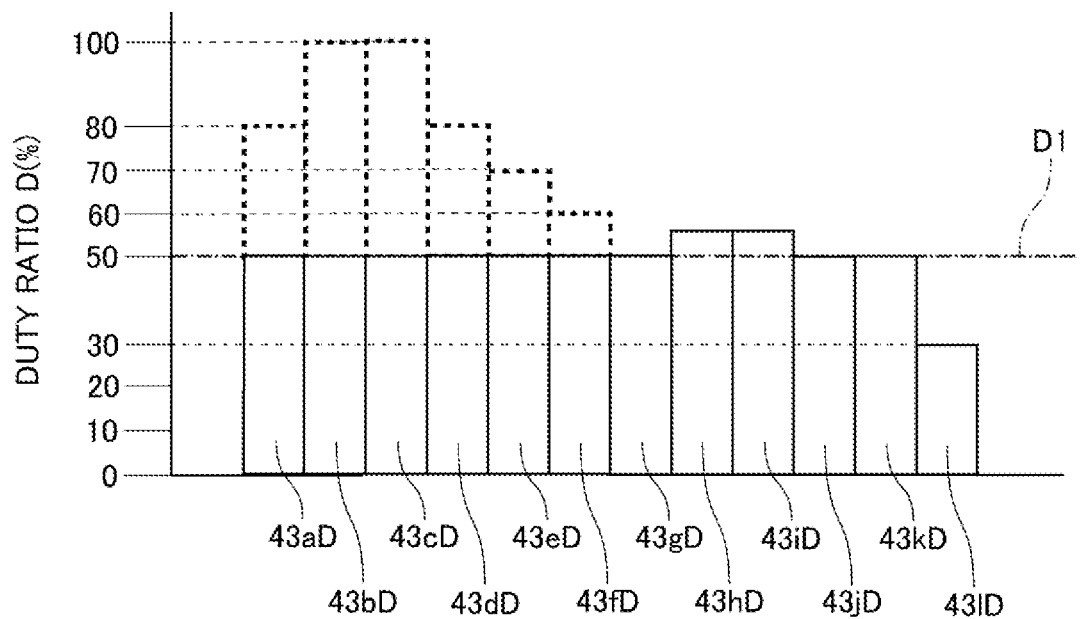
FIG. 30 is a view illustrating an example of a duty ratio of each light-emitting element in step SP33 in a state where the vehicle turns left.

In step SP33, the control unit 110 performs temperature derating on the first light source unit 41. In the temperature derating, the control unit 110 lowers the duty ratio of at least a part of the light-emitting elements 43 driven at the duty ratio larger than the duty ratio D1 to the duty ratio D1 or less. FIG. 30 is a diagram illustrating an example of the duty ratios 43aD to 43lD in this step. In FIG. 30, in order to compare with the duty ratio 43aD to 43lD illustrated in FIG. 29, a portion of the duty ratio 43aD to 43lD illustrated in FIG. 29 before being decreased is indicated by a broken line. In this step, for example, the control unit 110 lowers the duty ratios 43aD to 43fD of the light-emitting elements 43a to 43f to the duty ratio D1 and sets to 50%. When the duty ratios 43aD to 43fD decrease, the light emission amount and the heat generation amount of the first light source unit 41 decrease, and the temperature of the first light source unit 41 decreases.

In the present modification, when the duty ratios 43aD to 43lD are decreased, the control unit 110 ends the control flow. Note that in the present modification, the control unit 110 controls the light-emitting element 43 as described above by the duty ratio, but can also control the light-emitting element 43 as described above by the power supplied to the light-emitting element 43 driven at the duty ratio as in the embodiment.

(Second Modification)

Next, a second modification of the present embodiment will be described. The present modification describes the duty ratios 43aD to 43lD of the light-emitting elements 43a to 43l in a case where the vehicle 10 is switched from a state of traveling straight to a state of turning left and the intensity distribution of light in the light distribution pattern is changed. In the present modification, as in the above embodiment, the duty ratio D1 will be described as an example of a duty ratio serving as a reference in temperature derating.

Figure 31:
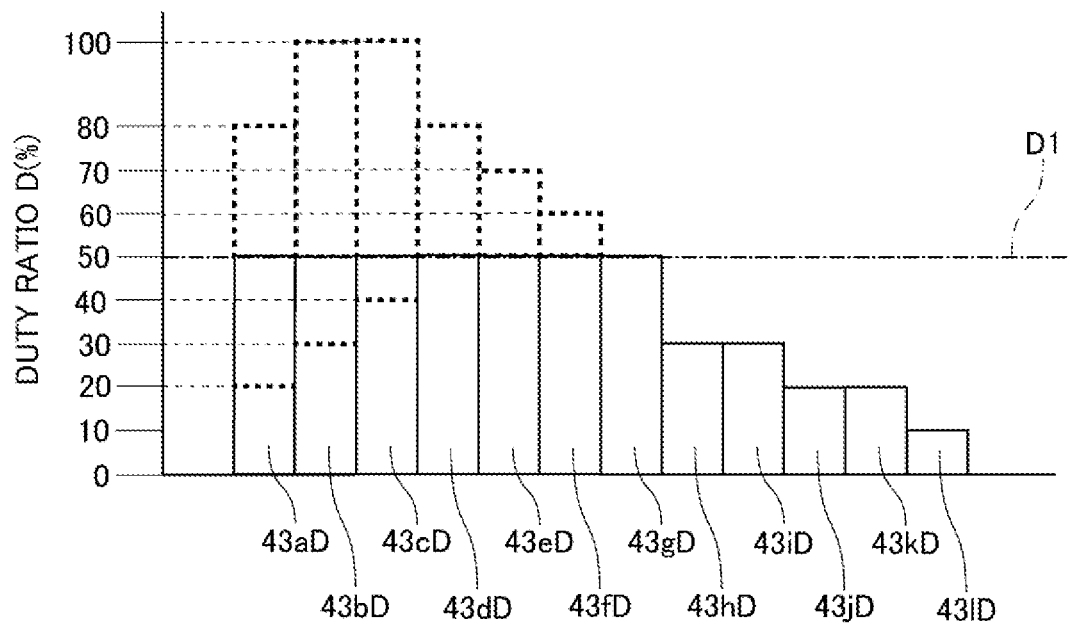
FIG. 31 is a diagram illustrating an example of the duty ratio of each light-emitting element after temperature derating in a case where the intensity distribution of light in the light distribution pattern is changed by switching from the state in which the vehicle travels straight to the state in which the vehicle turns left.

In the present modification, the steering angle exceeds the reference angle and changes to the steering angle to the left, and the steering sensor outputs a signal related to the steering angle to the control unit 110. FIG. 31 is a diagram illustrating an example of duty ratios 43*a*D to 43*l*D of the light-emitting elements 43*a* to 43*l* after temperature derating in a case where the state where the vehicle 10 travels straight is switched to the state where the vehicle turns left and the intensity distribution of light in the light distribution pattern is changed. In FIG. 31, in order to compare with the duty ratios 43*a*D to 43*l*D illustrated in FIG. 28, the portion of the duty ratios 43*a*D to 43*l*D illustrated in FIG. 28 before the decrease is indicated by a dotted line. The control unit 110 lowers the duty ratios 43*a*D to 43*f*D of the light-emitting elements 43*a* to 43*f* larger than the duty ratio D1 among the light-emitting elements 43*a* to 43*l*. For example, the control unit 110 lowers the duty ratios 43*a*D to 43*f*D to the duty ratio D1, and sets the duty ratio 43*a*D to 43*f*D to 50%. Note that the control unit 110 may lower the duty ratio of at least a part of the light-emitting elements among the light-emitting elements 43*a* to 43*f* driven at the duty ratio larger than the duty ratio D1 to the duty ratio D1 or less. In addition, the control unit 110 maintains the duty ratios 43*g*D to 43*l*D of the light-emitting elements 43*g* to 43*l* driven at the duty ratio less than or equal to the duty ratio D1 in the state illustrated in FIG. 28.

Further, in this modification, the control unit 110 increases duty ratios 43*a*D to 43*c*D illustrated in FIG. 31 as compared with duty ratios 43*a*D to 43*c*D of light-emitting elements 43*a* to 43*c* illustrated in FIG. 23. In FIG. 31, in order to compare with the duty ratios 43*a*D to 43*c*D illustrated in FIG. 23, the portion of the duty ratios 43*a*D to 43*c*D illustrated in FIG. 23 before being increased is indicated by a broken line. Therefore, when temperature derating is performed on the first light source unit 41 after changing the intensity distribution of light in the light distribution pattern, the control unit 110 increases the duty ratios 43*a*D to 43*c*D, which are equal to or less than the duty ratio D1, before changing the intensity distribution of light. In this case, for example, the control unit 110 increases the duty ratios 43*a*D to 43*c*D to the duty ratio D1, and sets the duty ratios 43*a*D to 43*c*D to 50%. Note that the control unit 110 may increase the duty ratio of at least a part of light-emitting elements 43*a* to 43*c* as described above.

In the present modification, the control unit 110 controls the light-emitting element 43 as described above by the duty ratio, but can also control the light-emitting element 43 as described above by the power supplied to the light-emitting element 43 driven at the duty ratio. Therefore, control of the light-emitting element 43 using power will be described below. In the present modification, when temperature derating is performed after changing the intensity distribution of light as illustrated in FIG. 31, the control unit 110 lowers the power supplied to at least a part of the light-emitting elements 43*a* to 43*f* driven with the second power larger than the first power to the first power or less. Furthermore, in the present modification, in a case where the temperature derating is performed after changing the intensity distribution of light as illustrated in FIG. 31, the control unit 110 increases the power supplied to at least a part of the light-emitting elements 43*a* to 43*c* driven with the third power equal to or less than the first power described above before changing the intensity distribution of light as illustrated in FIG. 23. In the present modification, the control unit 110 increases the power to the first power as described above.

As described above, when temperature derating is performed on the first light source unit 41 after changing the intensity distribution of light, the control unit 110 lowers the power supplied to at least a part of the light-emitting elements 43*a* to 43*f* driven with the second power to the first power or less. Furthermore, when temperature derating is performed on the first light source unit 41 after changing the intensity distribution of light, the control unit 110 increases the power supplied to at least a part of the light-emitting elements 43*a* to 43*c* driven with the third power before changing the intensity distribution of light.

According to the above configuration, even when the control unit 110 performs temperature derating on the first light source unit 41 after changing the intensity distribution of light, the first light source unit 41 is protected from heat from the light-emitting element 43, but the light distribution pattern tends to be dark. Therefore, in the above configuration, when temperature derating is performed after changing the intensity distribution of light, the control unit 110 increases the power supplied to at least a part of the light-emitting elements 43*a* to 43*c* driven with the third power before changing the intensity distribution of light. As the power increases, the light distribution pattern can be brighter. Therefore, even when the control unit 110 performs the temperature derating on the first light source unit 41 after changing the intensity distribution of light, it is possible to reduce a decrease in visibility in front as compared with a case where the power does not increase. In addition, when the power increases, a decrease in visibility can be further reduced at night.

Note that the control unit 110 may set the sum of the decrease amounts of the duty ratios 43*a*D to 43*f*D to the duty ratio D1 illustrated in FIG. 31 to be larger than, smaller than, or equal to the sum of the decrease amounts of the duty ratios 43*d*D to 43*i*D to the duty ratio D1 illustrated in FIG. 27. The duty ratios 43*a*D to 43*c*D of the light-emitting elements 43*a* to 43*c* illustrated in FIG. 31 are higher than the duty ratios 43*a*D to 43*c*D illustrated in FIG. 27. In this case, the control unit 110 sets the sum of the increase amounts of the duty ratios 43*a*D to 43*c*D to the duty ratio D1 illustrated in FIG. 31 to be smaller than the sum of the decrease amounts of the duty ratios 43*d*D to 43*i*D to the duty ratio D1 illustrated in FIG. 27, but may set the sum to be equal to or larger than the sum of the decrease amounts of the duty ratios 43*d*D to 43*i*D.

(Third Modification)

Next, a third modification of the present embodiment will be described. The control of the duty ratios 43*a*D to 43*l*D of the light-emitting elements 43*a* to 43*l* in a case where the vehicle 10 is switched from a state of traveling straight to a state of turning left and the intensity distribution of light in the light distribution pattern is changed is not limited to the above. In the present modification, as in the embodiment, the duty ratio D1 will be described as an example of a duty ratio serving as a reference in temperature derating.

Figure 32:
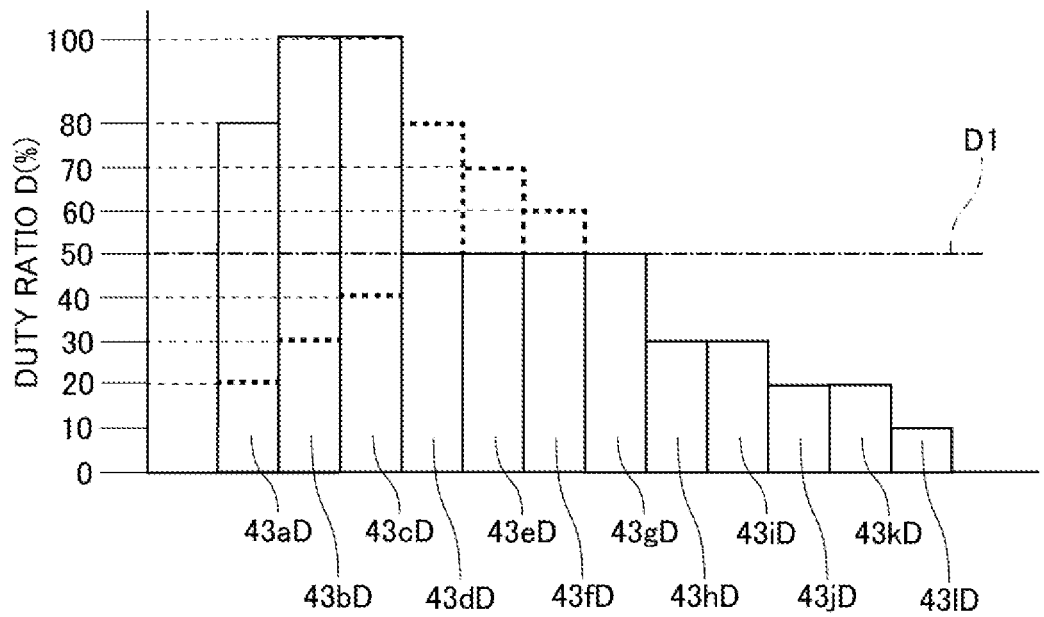
FIG. 32 is a diagram illustrating another example of the duty ratio of each light-emitting element after temperature derating in a case where the intensity distribution of light in the light distribution pattern is changed by switching from the state in which the vehicle travels straight to the state in which the vehicle turns left.

FIG. 32 is a diagram illustrating another example of duty ratios 43*a*D to 43*l*D of the light-emitting elements 43*a* to 43*l* in a case where the state where the vehicle 10 travels straight is switched to the state where the vehicle turns left and the intensity distribution of light in the light distribution pattern is changed. In FIG. 32, in order to compare with the duty ratios 43*a*D to 43*l*D illustrated in FIG. 28, the portion of the duty ratios 43*a*D to 43*l*D illustrated in FIG. 28 before the decrease is indicated by a dotted line.

Similarly to the second modification, in the present modification, the control unit 110 lowers the duty ratios 43*d*D to 43*f*D of the light-emitting elements 43*d* to 43*f* larger than the duty ratio D1 among the light-emitting elements 43*a* to 43*l*. For example, the control unit 110 lowers the duty ratios 43*d*D to 43*f*D to the duty ratio D1, and sets the duty ratio 43*a*D to 43*f*D to 50%.

Further, the control unit 110 increases duty ratios 43*a*D to 43*c*D illustrated in FIG. 32 as compared with duty ratios 43*a*D to 43*c*D illustrated in FIG. 23. In FIG. 32, in order to compare with the duty ratios 43*a*D to 43*c*D illustrated in FIG. 23, the portion of the duty ratios 43*a*D to 43*c*D illustrated in FIG. 23 before being increased is indicated by a broken line. Therefore, when temperature derating is performed on the first light source unit 41 after changing the intensity distribution of light in the light distribution pattern, the control unit 110 increases the duty ratios 43*a*D to 43*c*D, which are equal to or less than the duty ratio D1, to be higher than the duty ratio D1 before changing the intensity distribution of light. In this case, for example, the control unit 110 sets the duty ratios 43*a*D to 43*c*D to 80%, 100%, and 100%. Note that the control unit 110 may increase the duty ratio of at least a part of light-emitting elements 43*a* to 43*c* as described above.

In the present modification, the control unit 110 controls the light-emitting element 43 as described above by the duty ratio, but can also control the light-emitting element 43 as described above by the power. Therefore, control of the light-emitting element 43 using power will be described below. In the present modification, in a case where the temperature derating is performed after changing the intensity distribution of light as illustrated in FIG. 32, the control unit 110 increases the power supplied to at least a part of the light-emitting elements 43*a* to 43*c* driven with the third power equal to or less than the first power described above to be higher than the first power before changing the intensity distribution of light.

According to the above configuration, as compared with the case where the power is not increased to the first power, the light distribution pattern becomes further brighter, and a decrease in visibility in front can be further reduced.

Note the control unit 110 may increase at least a part of the duty ratios 43*a*D to 43*c*D to be higher than the duty ratio D1 and after a lapse of a certain period of time, lower the duty ratio to be equal to or lower than the duty ratio D1. Therefore, in a case where the temperature derating is performed on the first light source unit 41 after changing the intensity distribution of light, the control unit 110 may increase the power supplied to at least a part of the light-emitting elements 43*a* to 43*c* driven with the third power to be higher than the first power before changing the intensity distribution of light, and after a certain period of time has elapsed, the control unit may lower the power supplied to at least a part of the light-emitting elements 43*a* to 43*c* to be equal to or lower than the first power. If the power of the light-emitting elements 43*a* to 43*c* remains higher than the first power, the temperature of the first light source unit 41 increases. According to the above configuration, since the power decreases to the first power or less when a certain period of time elapses, the temperature of the first light source unit 41 decreases, and the temperature rise of the first light source unit 41 can be reduced.

In addition, the control unit 110 may increase the increase amount in the power supplied to at least a part of the light-emitting elements 43*a* to 43*c* driven with the third power as the decrease amount in the power supplied to at least a part of the light-emitting elements 43*d* to 43*f* driven with the second power is larger. According to the above configuration, the light distribution pattern can be brighter as compared to a case in which the increase amount of the power is smaller as the decrease amount of the power is larger. Note that the control unit 110 may not increase the increase amount in the power supplied to at least a part of the light-emitting elements 43*a* to 43*c* as the decrease amount in the power supplied to at least a part of the light-emitting elements 43*d* to 43*f* is larger.

In addition, in a state where the vehicle 10 illustrated in FIG. 32 turns left, the control unit 110 sets the sum of the increase amounts of the duty ratios 43*a*D to 43*c*D to be larger than the sum of the decrease amounts of the duty ratios 43*d*D to 43*f*D, but is not particularly limited. The control unit 110 may set the sum of the increase amount to be equal to the sum of the decrease amount or to be smaller than the sum of the decrease amount.

Third Embodiment

Nest, a third embodiment of the second aspect of the present invention will be described in detail. Note that the same or equivalent components as those of the second embodiment of the second aspect are denoted by the same reference numerals and redundant description is omitted unless otherwise specified.

A configuration of a vehicle 10 of the present embodiment is the same as the configuration of the vehicle 10 of the first embodiment except for a detection device 150. The detection device 150 of the present embodiment detects a preceding vehicle located in front of the vehicle 10. The detection device 150 mainly includes, for example, a camera, a detection unit, a calculation unit, a determination unit, and the like (not illustrated).

The camera is attached to a front portion of the vehicle 10, and captures an image of the front of the vehicle 10 at predetermined time intervals, for example, ⅓₀ second intervals. The captured image captured by the camera includes at least a part of a region irradiated with light emitted from the pair of lamp units 30. Examples of the camera include a complementary metal oxide semiconductor (CMOS) camera and a charged coupled device (CCD) camera.

The detection unit detects, from the captured image captured by the camera, information such as presence of a preceding vehicle in the captured image, a presence position of the preceding vehicle in the captured image, a proportion of the preceding vehicle in the captured image, and a temporal change amount of a size of the preceding vehicle in the captured image. In a case where the vehicle 10 away from the preceding vehicle approaches the preceding vehicle after a lapse of time, the change amount in size of the preceding vehicle in the captured image decreases. In addition, in a case where the vehicle 10 moves forward and the vehicle 10 close to the preceding vehicle further approaches the preceding vehicle as time elapses, the change amount in size of the preceding vehicle becomes larger. The size of the preceding vehicle indicates, for example, a proportion of the preceding vehicle in the captured image, a width of the preceding vehicle in the captured image, and the like. In the captured image, a pair of red light spots due to light emitted from the tail light of the preceding vehicle is reflected. The detection unit detects a preceding vehicle based on the light. When the preceding vehicle is detected from the captured image, the detection unit outputs a signal indicating information such as the captured image, the presence of the preceding vehicle in the captured image, the presence position of the preceding vehicle in the captured image, the proportion of the preceding vehicle in the captured image, and the temporal change amount of the size of the preceding vehicle in the captured image to the calculation unit. On the other hand, when the preceding vehicle is not detected from the captured image, the detection unit does not output a signal to the calculation unit. In addition, the detection device 150 outputs the captured image to the recording unit 130, and the recording unit 130 records the captured image. Examples of the configuration of the detection unit include the same configuration as the control unit 110.

The calculation unit calculates the distance between the vehicle 10 and the preceding vehicle based on the information from the detection unit. The calculation unit calculates the distance based on the proportion and the change amount in the information from the detection unit. Note that the calculation unit may calculate the distance by another method. For example, in the captured image, a pair of red light spots due to light emitted from the tail light of the preceding vehicle is reflected. The calculation unit calculates the distance between the vehicle 10 and the preceding vehicle based on the distance between the pair of red light spots and the like. The calculation unit outputs a signal indicating the calculated distance to the determination unit. Examples of the configuration of the calculation unit include the same configuration as the control unit 110.

When the signal indicating the distance between the vehicle 10 and the preceding vehicle is input from the calculation unit to the determination unit, the determination unit reads a predetermined requirement from the recording unit 130 and determines whether or not the distance satisfies the predetermined requirement. The determination unit outputs a signal indicating that the distance satisfies the predetermined requirement to the control unit 110 if the distance satisfies the predetermined requirement, and does not output the signal to the control unit 110 if the distance does not satisfy the predetermined requirement. Note that the signal from the determination unit may be input to the control unit 110 via the ECU. The state in which the predetermined requirement is satisfied indicates, for example, a state in which the distance between the vehicle 10 and the preceding vehicle is less than a predetermined distance. In this manner, the determination unit determines whether the distance satisfies the predetermined requirement according to the signal input from the calculation unit. The predetermined distance is, for example, 130 m, and the numerical value of the distance is recorded in the recording unit 130 as a threshold. The numerical value may be appropriately changeable according to a traveling status of the vehicle 10 such as daytime and nighttime. Examples of the configuration of the determination unit include the same configuration as the control unit 110.

The objects detected by the detection device 150, the number of types of objects, the configuration of the detection device 150, and the method of detecting a preceding vehicle by the detection device 150 are not particularly limited. In addition, a method of calculating the distance from the vehicle 10 to the preceding vehicle, information detected by the detection unit, and information input from the calculation unit to the determination unit are also not particularly limited. For example, the detection device 150 may further include an image processing unit that performs image processing on the captured image captured by the camera. The detection unit may detect information such as the presence of the preceding vehicle in the captured image, the presence position of the preceding vehicle in the captured image, the proportion of the preceding vehicle in the captured image, and the temporal change amount of the size of the preceding vehicle in the captured image, from the information subjected to the image processing by the image processing unit. The detection device 150 may further include a millimeter-wave radar, Lidar, or the like capable of detecting an object located in front of the vehicle 10. The detection unit may detect the presence of a preceding vehicle located in front of the vehicle 10, the position of the preceding vehicle with respect to the vehicle 10, and the distance from the vehicle 10 to the preceding vehicle based on the captured image captured by the camera and a signal input from the millimeter wave radar, the Lidar, or the like.

Figure 33:
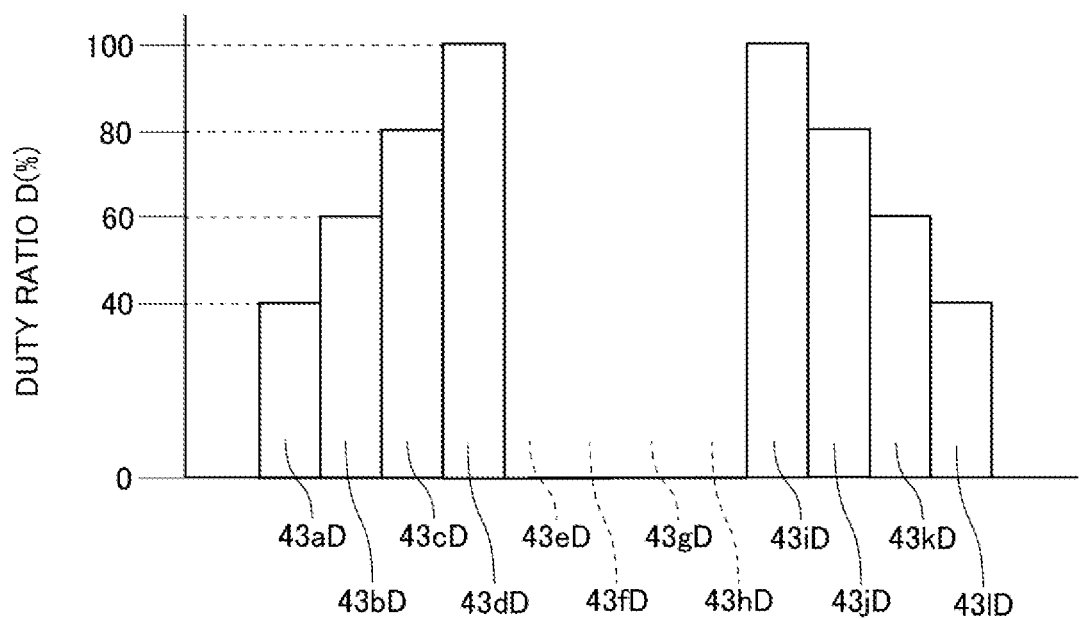
FIG. 33 is a diagram illustrating an example of a duty ratio of each light-emitting element of a third embodiment as the second aspect of the present invention in a state where a distance between a vehicle and a preceding vehicle is less than a predetermined distance.

Next, the duty ratios 43aD to 43lD of the light-emitting elements 43a to 43l when the vehicular headlight emits a high-beam in a state where the distance between the vehicle 10 and the preceding vehicle is less than a predetermined distance will be described. FIG. 33 is a diagram illustrating an example of duty ratios 43aD to 43lD in a state where the distance between the vehicle 10 and the preceding vehicle is less than a predetermined distance. The duty ratios 43aD to 43lD illustrated in FIG. 33 are duty ratios in a case where temperature derating is not performed. Note that when no signal is input from the determination unit to the control unit 110, the duty ratios 43aD to 43lD are as illustrated in FIG. 23.

In the vehicular headlight 20 of the present embodiment, when a signal is input from the determination unit to the control unit 110, the control unit 110 sets the duty ratios 43eD to 43hD of the light-emitting elements 43e to 43h to 0%, and the duty ratios 43dD and 43iD of the light-emitting elements 43d and 43i to 100%. In FIG. 33, since the duty ratios 43eD to 43hD is 0%, the description of rectangles in the light-emitting elements 43e to 43h is omitted. Further, the control unit 110 sets the duty ratios 43cD and 43jD of the light-emitting elements 43c and 43j to 80%, the duty ratios 43bD and 43kD of the light-emitting elements 43b and 43k to 60%, and the duty ratios 43aD and 43lD of the light-emitting elements 43a and 43l to 40%. The values of the above-described duty ratios 43aD to 43lD are recorded in the recording unit 130, and the control unit 110 reads the values from the recording unit 130 and controls the duty ratios 43aD to 43lD as described above. The value of the duty ratio is not particularly limited.

When the control unit 110 controls the duty ratios 43aD to 43lD as described above, the light-emitting elements 43e to 43h are turned off, the light emission amount decreases in the order from the light-emitting element 43d to the light-emitting element 43a and the order from the light-emitting element 43i to the light-emitting element 43l, and the light emission amount is symmetrical between the left and right light-emitting elements. As a result, the region overlapping the preceding vehicle in the light distribution pattern of the high-beam becomes a non-projection region where light is not projected, and the irradiation of the preceding vehicle with the high-beam is prevented. In addition, light is projected onto a region other than the non-projection region in the light distribution pattern of the high-beam. Note that the values of the duty ratios 43aD to 43lD are not particularly limited as long as the region overlapping the preceding vehicle in the light distribution pattern becomes dark. Therefore, the control unit 110 does not need to set the duty ratio 43eD to 43hD to 0%.

Meanwhile, as described above, even when the distance between the vehicle 10 and the preceding vehicle is less than the predetermined distance, the control unit 110 performs temperature derating on the first light source unit 41. Similarly to the first embodiment, the temperature derating of the present embodiment will be described using the duty ratio D1 as an example of a duty ratio serving as a reference at the time of temperature derating.

Figure 34:
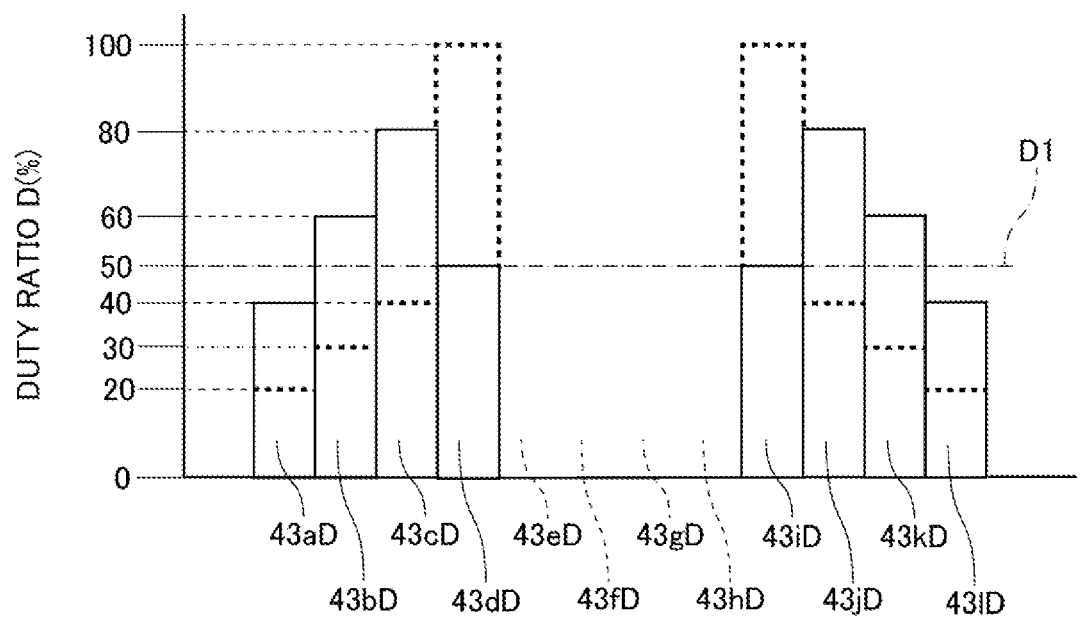
FIG. 34 is a diagram illustrating an example of a duty ratio of each light-emitting element after temperature derating in a state where a distance between the vehicle and the preceding vehicle is less than a predetermined distance.

FIG. 34 is a diagram illustrating an example of duty ratios 43aD to 43lD of the light-emitting elements 43a to 43l after temperature derating in a state where the distance between the vehicle 10 and the preceding vehicle is less than the predetermined distance. In FIG. 34, in order to compare with the duty ratios 43aD to 43lD illustrated in FIG. 33, the portion of the duty ratios 43aD to 43lD illustrated in FIG. 33 before the decrease is indicated by a dotted line.

The control unit 110 lowers the duty ratios 43dD and 43iD of some light-emitting elements 43d and 43i among the light-emitting elements 43b to 43d and 43i to 43k driven at the duty ratio larger than the duty ratio D1 to the duty ratio D1 and sets the duty ratios to 50%. In addition, the control unit 110 maintains the duty ratios 43bD, 43cD, 43jD, and 43kD of the remaining some light-emitting elements 43b, 43c, 43j, and 43k in the state illustrated in FIG. 33. Note that the control unit 110 may lower the duty ratio of at least a part of the light-emitting elements 43b to 43d and 43i to 43k driven at the duty ratio that is larger than the duty ratio D1 to the duty ratio D1 or less. In addition, the control unit 110 maintains the duty ratios 43aD, 43eD to 43hD, and 43lD of the light-emitting elements 43a, 43e to 43h, and 43l driven at the duty ratio less than or equal to the duty ratio D1 among the light-emitting elements 43a to 43l in the state illustrated in FIG. 33.

When the duty ratios 43dD and 43iD decrease, the light emission amount and the heat generation amount of the first light source unit 41 decrease, and the temperature of the first light source unit 41 decreases.

Next, control of the duty ratios 43aD to 43lD of the light-emitting elements 43a to 43l in a case where the vehicle 10 travels straight and the distance between the vehicle 10 and the preceding vehicle is switched from a state where the distance is equal to or greater than a predetermined distance to a state where the distance between the vehicle 10 and the preceding vehicle is less than the predetermined distance and the intensity distribution of light in the light distribution pattern is changed will be described.

The control unit 110 increases duty ratios 43aD to 43cD and 43jD to 43lD illustrated in FIG. 34 as compared with duty ratios 43aD to 43cD and 43jD to 43lD illustrated in FIG. 23. In FIG. 34, in order to compare with the duty ratios 43aD to 43cD and 43jD to 43lD illustrated in FIG. 23, the portion of the duty ratios 43aD to 43cD and 43jD to 43lD illustrated in FIG. 23 before being increased is indicated by a broken line. The control unit 110 increases the duty ratios 43aD and 43lD to duty ratios smaller than the duty ratio D1 and sets the duty ratios to 40%. Therefore, when temperature derating is performed after changing the intensity distribution of light in the light distribution pattern, the control unit 110 increases some duty ratios 43aD and 43lD smaller than the duty ratio D1 to duty ratios larger than the duty ratios 43aD and 43lD and smaller than the duty ratio D1 before changing the intensity distribution of light.

In the present modification, the control unit 110 controls the light-emitting element 43 as described above by the duty ratio, but can also control the light-emitting element 43 as described above by the power supplied to the light-emitting element 43 driven at the duty ratio. Therefore, control of the light-emitting element 43 using power will be described below. In the present modification, in a case where the temperature derating is performed after changing the intensity distribution of light as illustrated in FIG. 34, the control unit 110 increases the power supplied to at least a part of the light-emitting elements 43a and 43l driven with the third power equal to or less than the first power described above to the fourth power higher than the third power and smaller than the first power before changing the intensity distribution of light.

According to the above configuration, as compared with the case where the power is not increased to the fourth power after the control unit 110 changes the intensity distribution of the light, the light emission amount of the first light source unit 41 increases and the light distribution pattern can be brighter.

In addition, for example, the control unit 110 increases the duty ratios 43bD, 43cD, 43jD, and 43kD illustrated in FIG. 34 as compared with the duty ratios 43bD, 43cD, 43jD, and 43kD of the light-emitting elements 43b, 43c, 43j, and 43k illustrated in FIG. 23. For example, the control unit 110 increases the duty ratios 43bD, 43cD, 43jD, and 43kD to be higher than the duty ratio D1. In this case, for example, the control unit 110 sets the duty ratios 43bD, 43cD, 43jD, and 43kD to 60%, 80%, 80%, and 60%. Therefore, in a case where the temperature derating is performed after the intensity distribution of light is changed, the control unit 110 increases the duty ratios 43bD, 43cD, 43jD, and 43kD of the remaining parts smaller than the duty ratio D1 when the temperature derating is performed before the intensity distribution of light is changed to be higher than the duty ratio D1. Note that the control unit 110 may increase at least a part of the duty ratios 43bD, 43cD, 43jD, and 43kD to be equal to or higher than the duty ratio D1. That is, in a case where the temperature derating is performed after changing the intensity distribution of light as illustrated in FIG. 34, the control unit 110 increases the power supplied to at least a part of the light-emitting elements 43b, 43c, 43j and 43k driven with the third power equal to or less than the first power described above to be higher than the first power before changing the intensity distribution of light.

With the above configuration, after the control unit 110 changes the intensity distribution of light of the light distribution pattern, the light emission amount of the first light source unit 41 further increases, the light distribution pattern becomes brighter, and a decrease in visibility in front can be reduced.

In addition, when the duty ratios 43aD to 43cD and 43jD to 43lD are increased as described above, the region of the light distribution pattern excluding the non-projection region is brighter than the case where the vehicle 10 travels straight, and a decrease in driver's visibility is reduced. The duty ratios 43aD to 43cD and 43jD to 43lD may be increased to the duty ratio D1.

(Modification)

Next, a modification of the present embodiment will be described. The configuration of the vehicle 10 of the present modification is the same as the configuration of the vehicle 10 of the first embodiment except for a detection device 150. In the present modification, the detection device 150 detects raindrops.

The detection device 150 of the present modification mainly includes a rain sensor that detects raindrops attached to the front window of the vehicle 10. The rain sensor includes an LED which is a light-emitting element that emits infrared rays, a photodiode which is a light receiving element, and a detection unit. Infrared rays emitted from the vehicle interior side to the outside of the vehicle by the LEDs are totally reflected by the front window, but when raindrops are attached to the surface of the front window, a part of the infrared rays transmits the raindrops and is emitted to the outside. Therefore, the reflection amount of infrared rays on the front window decreases, and the light amount of infrared rays entering the photodiode as the light receiving element decreases. The detection unit detects the presence or absence of raindrops on the surface of the front window and the amount of attached raindrops based on the decrease amount in the light amount. Alternatively, the rain sensor may mainly include a camera that captures an image of the front window of the vehicle 10, and a detection unit that detects raindrops attached to the front window from the captured image of the front window captured by the camera. The configuration of the detection unit is the same as the configuration of the control unit 110. The configuration of the rain sensor and the attachment position of the rain sensor are not particularly limited as long as raindrops can be detected. The rain sensor is electrically connected to the control unit 110, and outputs a signal indicating that raindrops are attached and an amount of attached raindrops to the control unit 110. Note that the rain sensor does not output a signal to the control unit 110 when no raindrop is detected. The signal from the rain sensor may be input to the control unit 110 via the ECU. The rain sensor may detect snow.

Figure 35:
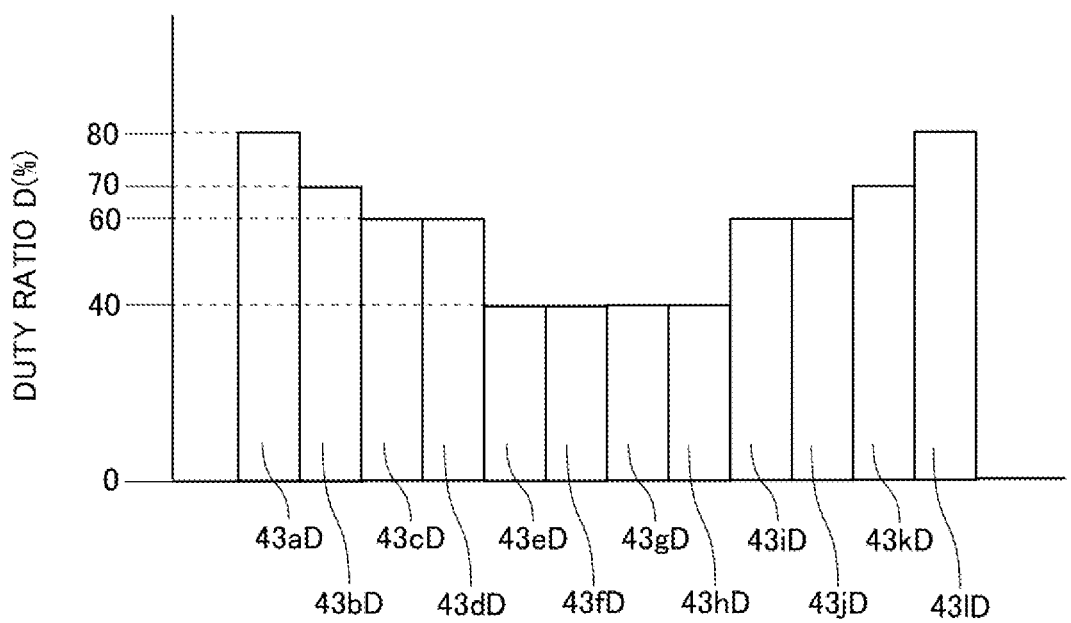
FIG. 35 is a view illustrating an example of a duty ratio of each light-emitting element in a state where the vehicle is in rain.

Next, the duty ratios 43aD to 43lD of the light-emitting elements 43a to 43l when the vehicular headlight 20 emits a high-beam in a state where the vehicle 10 is in rain will be described. FIG. 35 is a diagram illustrating an example of duty ratios 43aD to 43lD in a state where the vehicle 10 is in rain. The duty ratios 43aD to 43lD illustrated in FIG. 35 are duty ratios in a case where temperature derating is not performed. Note that when no signal is input from the rain sensor to the control unit 110, the duty ratios 43aD to 43lD are as illustrated in FIG. 23.

In the vehicular headlight 20 of the present embodiment, when a signal is input from the rain sensor, the control unit 110 sets the duty ratios 43aD and 43lD of the light-emitting elements 43a and 43l to 80%, and the duty ratios 43bD and 43kD of the light-emitting elements 43b and 43k to 70%. In addition, the control unit 110 sets the duty ratios 43cD, 43dD, 43iD, and 43jD of the light-emitting elements 43c, 43d, 43i, and 43j to 60%, and sets the duty ratios 43eD to 43hD of the light-emitting elements 43e to 43h to 40%. The values of the duty ratios 43aD to 43lD are recorded in the recording unit 130, and the control unit 110 reads these values from the recording unit 130 and controls the duty ratios 43aD to 43lD as described above. The value of the duty ratio is not particularly limited.

When the control unit 110 controls the duty ratios 43aD to 43lD as described above, the light emission amounts of the light-emitting elements 43e and 43h located on the center side in the left-right direction become the smallest. In addition, the light emission amount increases in the order from the light-emitting element 43d to the light-emitting element 43a and in the order from the light-emitting element 43i to the light-emitting element 43l, and the light emission amount is symmetrical between the left and right light-emitting elements. As a result, the regions on the left and right ends of the light distribution pattern of the high-beam are brighter than the central region. The value of the duty ratio in this case is not particularly limited as long as the regions on the left and right ends of the light distribution pattern of the high-beam are brighter than the central region.

Meanwhile, even when the vehicle 10 is in rain as described above, the control unit 110 performs temperature derating on the first light source unit 41. Similarly to the first embodiment, the temperature derating of the present modification will be described using the duty ratio D1 as an example of a duty ratio serving as a reference at the time of temperature derating.

Figure 36:
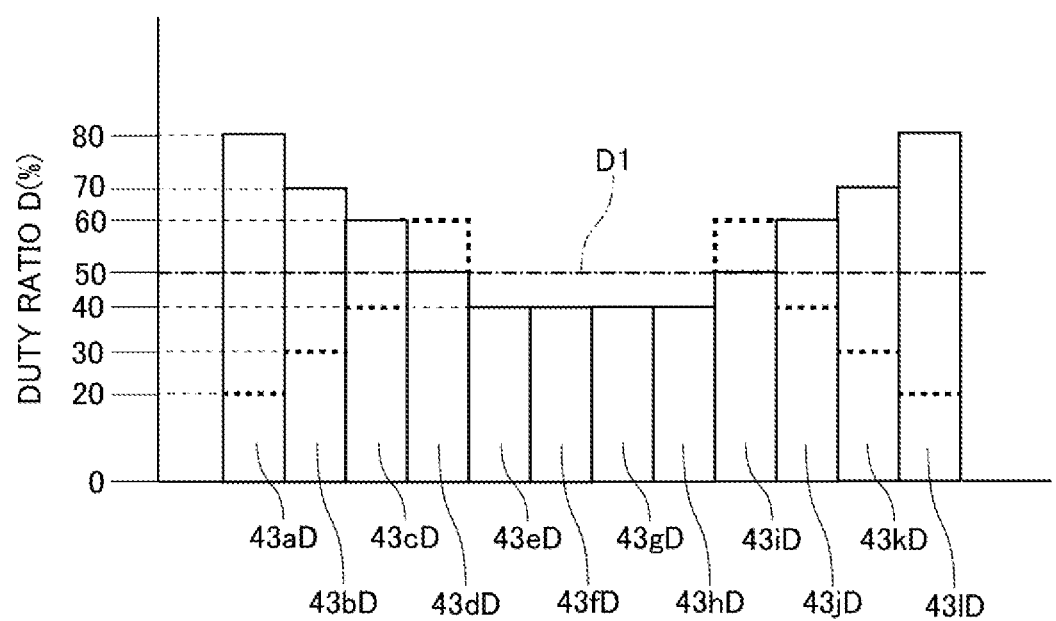
FIG. 36 is a diagram illustrating an example of a duty ratio of each light-emitting element after temperature derating in a state where the vehicle is in rain.

FIG. 36 is a diagram illustrating an example of duty ratios 43aD to 43lD of the light-emitting elements 43a to 43l after temperature derating in a state where the vehicle 10 is in rain. In FIG. 36, in order to compare with the duty ratios 43aD to 43lD illustrated in FIG. 35, the portion of the duty ratios 43aD to 43lD illustrated in FIG. 35 before the decrease is indicated by a dotted line.

The control unit 110 lowers the duty ratios 43dD and 43iD of some light-emitting elements 43d and 43i among the light-emitting elements 43a to 43d and 43i to 43l driven at the duty ratio larger than the duty ratio D1 to the duty ratio D1 and sets the duty ratios to 50%. In addition, the control unit 110 maintains the duty ratios 43aD to 43cD and 43jD to 43lD of the remaining some light-emitting elements 43a to 43c and 43j to 43l among the light-emitting elements 43a to 43d and 43i to 43l in the state illustrated in FIG. 35. Note that the control unit 110 may lower the duty ratio of at least a part of the light-emitting elements 43a to 43d and 43i to 43l driven at the duty ratio that is larger than the duty ratio D1 to the duty ratio D1 or less. In addition, the control unit 110 maintains the duty ratios of the light-emitting elements 43e to 43h driven at the duty ratio less than or equal to the duty ratio D1 among the light-emitting elements 43a to 43l in the state illustrated in FIG. 35.

When the duty ratios 43dD and 43iD decrease, the light emission amount and the heat generation amount of the first light source unit 41 decrease, and the temperature of the first light source unit 41 decreases.

Next, control of the duty ratios 43aD to 43lD of the light-emitting elements 43a to 43l in a case where the vehicle 10 travels straight and the state where the vehicle 10 is not in the rain is switched to the state where the vehicle 10 is in the rain and the intensity distribution of light in the light distribution pattern is changed will be described.

As compared with the duty ratios 43aD to 43cD and 43jD to 43lD of the light-emitting elements 43a to 43c and 43j to 43l illustrated in FIG. 23, the control unit 110 increases the duty ratios 43aD to 43cD and 43jD to 43lD of the light-emitting elements 43a to 43c and 43j to 43l illustrated in FIG. 36 to be higher than the duty ratio D1. In FIG. 36, in order to compare with the duty ratios 43aD to 43cD and 43jD to 43lD illustrated in FIG. 23, the portion of the duty ratios 43aD to 43cD and 43jD to 43lD illustrated in FIG. 23 before being increased is indicated by a broken line. The control unit 110 sets the duty ratios 43aD and 43lD to 80%, the duty ratios 43bD and 43kD to 70%, and the duty ratios 43cD and 43jD to 90%. Therefore, when temperature derating is performed after changing the intensity distribution of light, the control unit 110 increases the duty ratios 43aD to 43cD and 43jD to 43lD smaller than the duty ratio D1 to be higher than the duty ratio D1 before changing the intensity distribution of light. Note that the control unit 110 may increase at least a part of the duty ratios 43aD to 43cD and 43jD to 43lD as described above. That is, in a case where the temperature derating is performed after changing the intensity distribution of light as illustrated in FIG. 36, the control unit 110 increases the power supplied to at least a part of the light-emitting elements 43a to 43c and 43j to 43l driven with the third power equal to or less than the first power described above to be higher than the first power before changing the intensity distribution of light.

With the above configuration, after the control unit 110 changes the intensity distribution of light of the light distribution pattern, the light emission amount of the first light source unit 41 further increases, the light distribution pattern becomes brighter, and a decrease in visibility in front can be further reduced.

As described above, the second aspect of the present invention has been described by taking the second and third embodiments and the modifications as examples, but the present aspect is not limited thereto.

Although the control of the duty ratio has been described using the light distribution pattern of the high-beam, the light distribution pattern of the low-beam may also be controlled in the same manner as the light distribution pattern of the high-beam.

The control unit 110 controls the duty ratio of the light-emitting element 43 in each of the left and right first lamps 40 based on the temperature of the first light source unit 41 by the temperature sensor 47 of each of the left and right first lamps 40, but is not limited thereto. For example, the temperature sensor 47 may be disposed on one of the left and right first lamps 40, and the control unit 110 may control the duty ratio of the light-emitting element in each of the left and right first lamps 40 based on the temperature of the first light source unit 41 in one lamp.

According to the present invention, there is provided a vehicular headlight capable of reducing a decrease in visibility in front when temperature derating is performed, and the vehicular headlight can be used in the field of vehicular headlights of automobiles and the like.

The invention claimed is:

1. A vehicular headlight comprising:
a first light source unit including a plurality of light-emitting elements, the plurality of light-emitting elements being arranged such that irradiation regions of first light emitted forward from the plurality of light-emitting elements are arranged in a matrix shape;
a second light source unit that emits second light; and
a control unit, wherein
a light distribution pattern of a low-beam is formed by a first light distribution pattern formed by at least a part of the first light and a second light distribution pattern formed by the second light,
the light distribution pattern of the low-beam includes a first region in which a part of the first light distribution pattern overlaps a part of the second light distribution pattern, and a second region in which another part of the first light distribution pattern does not overlap the second light distribution pattern and which is continuous with the first region and located above the first region,
the control unit performs low-beam temperature derating on the first light source unit based on the temperature of the first light source unit in a state where the light distribution pattern of the low-beam is formed by controlling a power to be supplied to each of the plurality of light-emitting elements so that a light amount of at least a part of the first light with which at least the first region is irradiated in the first light distribution pattern decreases as compared with the light amount of the at least a part of the first light before the temperature derating, and the light amount of the at least the part of the first light with which the first region is irradiated decreases more than the light amount of the at least a part of the first light with which the second region is irradiated.

2. The vehicular headlight according to claim 1, wherein the control unit performs the low-beam temperature derating by controlling the power to be supplied to each of the plurality of light-emitting elements so that the light amount of the at least a part of the first light with which the second region is irradiated is less than the light amount of the at least a part of the first light with which the first region is irradiated.

3. The vehicular headlight according to claim 1, wherein the control unit performs the low-beam temperature derating by controlling the power to be supplied to each of the plurality of light-emitting elements such that the light amount in the first light distribution pattern decreases from an upper edge side of the first light distribution pattern included in the second region toward a lower edge side of the first light distribution pattern included in the first region.

4. The vehicular headlight according to claim 1, wherein the control unit performs the low-beam temperature derating by controlling the power to be supplied to each of the plurality of light-emitting elements so that the light amount in the first light distribution pattern decreases from a hot zone of the light distribution pattern of the low-beam toward a peripheral edge side of the first light distribution pattern.

5. The vehicular headlight according to claim 1, further comprising:
a third light source unit that emits third light, wherein
a light distribution pattern of a high-beam is formed by the first light distribution pattern, the second light distribution pattern, and a third light distribution pattern formed by the third light,
in the light distribution pattern of the high-beam, at least a part of the second region overlaps a part of the third light distribution pattern, and
wherein the control unit performs high-beam temperature derating in a state where the light distribution pattern of the high-beam is formed by controlling the power to be supplied to each of the plurality of light-emitting elements such that a light amount of at least a part of the first light with which at least one of a third region overlapping the part of the third light distribution pattern in the second region and the first region is irradiated decreases as compared to the light amount of the at least a part of the first light before the temperature derating.

6. The vehicular headlight according to claim 5, wherein the control unit performs the high-beam temperature derating by controlling the power to be supplied to each of the plurality of light-emitting elements such that the light amount of the at least a part of the first light with which the first region is irradiated decreases more than the light amount of the at least a part of the first light with which the third region is irradiated.

7. The vehicular headlight according to claim 5, wherein the control unit performs the low-beam temperature derating by controlling the power to be supplied to each of the plurality of light-emitting elements such that the light amount of the at least a part of the first light with which the third region is irradiated decreases after the light amount of the at least a part of the first light with which the first region is irradiated.

8. The vehicular headlight according to claim 5, wherein the control unit performs the low-beam temperature derating by controlling the power to be supplied to each of the plurality of light-emitting elements such that the light amount in the first light distribution pattern decreases from an upper edge side of the first light distribution pattern included in the third region toward a lower edge side of the first light distribution pattern included in the first region.

9. The vehicular headlight according to claim 5, wherein the control unit performs the low-beam temperature derating by controlling the power to be supplied to each of the plurality of light-emitting elements so that the light amount in the first light distribution pattern decreases from a hot zone of the light distribution pattern of the high-beam toward a peripheral edge side of the first light distribution pattern.

* * * * *